US012623184B2

(12) United States Patent
Pan et al.

(10) Patent No.: US 12,623,184 B2
(45) Date of Patent: May 12, 2026

(54) MICROFLUIDIC DEVICE DESIGN FOR EXTRACTION AND PHASE SEPARATION FOR ORGANIC SOLVENT PURIFICATION

(71) Applicant: University of Southern California, Los Angeles, CA (US)

(72) Inventors: Bin Pan, Los Angeles, CA (US); Noah Malmstadt, Altadena, CA (US)

(73) Assignee: University of Southern California, Los Angeles, CA (US)

( * ) Notice: Subject to any disclaimer, the term of this patent is extended or adjusted under 35 U.S.C. 154(b) by 364 days.

(21) Appl. No.: 18/389,017

(22) Filed: Nov. 13, 2023

(65) Prior Publication Data

US 2024/0157288 A1 May 16, 2024

Related U.S. Application Data

(60) Provisional application No. 63/424,244, filed on Nov. 10, 2022.

(51) Int. Cl.
  B01D 53/02 (2006.01)
  B01D 53/22 (2006.01)
  B01D 71/02 (2006.01)

(52) U.S. Cl.
  CPC ......... B01D 53/228 (2013.01); B01D 71/022 (2013.01); *B01D 2256/16* (2013.01); *B01D 2313/06* (2013.01); *B01D 2313/10* (2013.01); *B01D 2313/12* (2013.01); *B01D 2313/13* (2013.01); *B01D 2319/04* (2013.01)

(58) Field of Classification Search
  CPC ........... B01D 2256/16; B01D 2313/06; B01D 2313/10; B01D 2313/12; B01D 2313/13; B01D 2319/04; B01D 53/228; B01D 71/022
  See application file for complete search history.

(56) References Cited

U.S. PATENT DOCUMENTS

| | | | | |
|---|---|---|---|---|
| 2002/0012588 A1* | 1/2002 | Matsunaga | ............. | F04D 25/04 |
| | | | | 415/232 |
| 2009/0173061 A1* | 7/2009 | Vitse | .................... | F01N 3/2066 |
| | | | | 60/287 |
| 2010/0059389 A1* | 3/2010 | Ottaviani | ................ | C25B 11/02 |
| | | | | 451/28 |
| 2015/0314241 A1* | 11/2015 | Hester | ...................... | B32B 3/30 |
| | | | | 210/322 |
| 2019/0291046 A1* | 9/2019 | Nakanishi | ............. | C07C 229/12 |
| 2020/0276539 A1* | 9/2020 | Weisshaar | ............ | B01D 63/107 |
| 2022/0344678 A1* | 10/2022 | De Bock | ............. | H01M 8/0263 |

* cited by examiner

*Primary Examiner* — Christopher P Jones
(74) *Attorney, Agent, or Firm* — Brooks Kushman P.C.

(57) ABSTRACT

A purification system for ionic liquid solvents includes an ionic liquid source that includes a first flow controller configured to provide a first flow stream at a first flow rate where the first flow stream including an ionic liquid requiring purification. An extraction liquid source provides a second flow stream including an extraction liquid that is immiscible with the ionic liquid. A mixing component is configured to mix the first flow stream and the second flow stream and output a mixed flow stream that includes a retentate phase and a permeate phase. A separator assembly includes a separation membrane interposed between a first flow channel assembly and a second channel assembly.

28 Claims, 21 Drawing Sheets

(a)

(b)

(c)

(d)

Separation-prioritized

Extraction-prioritized

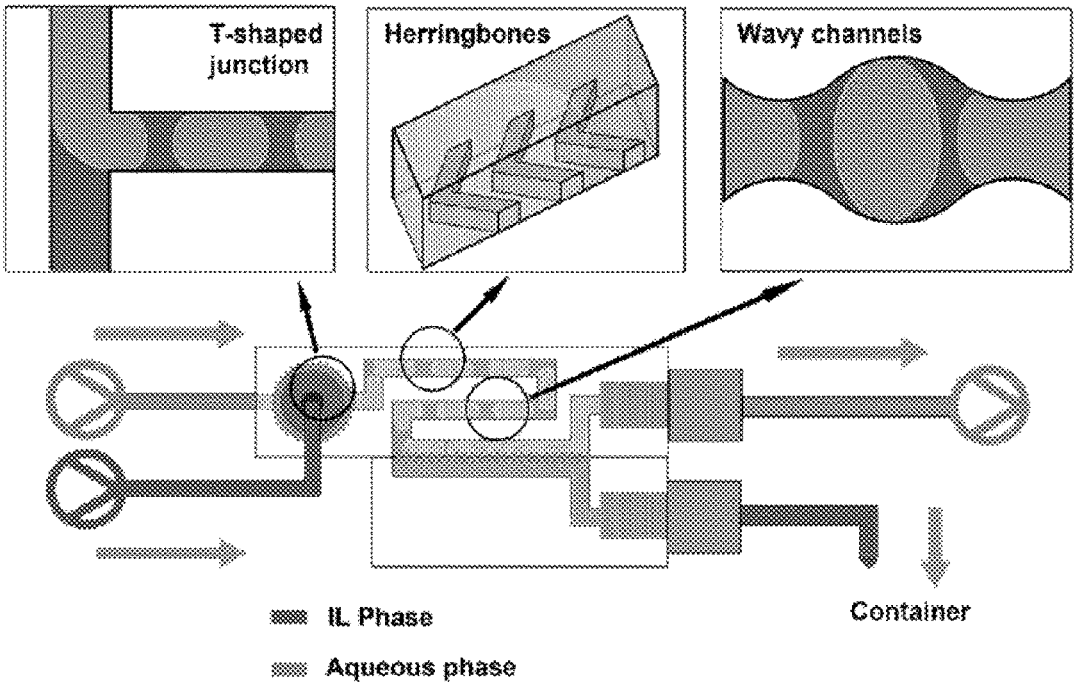
Fig. 10A
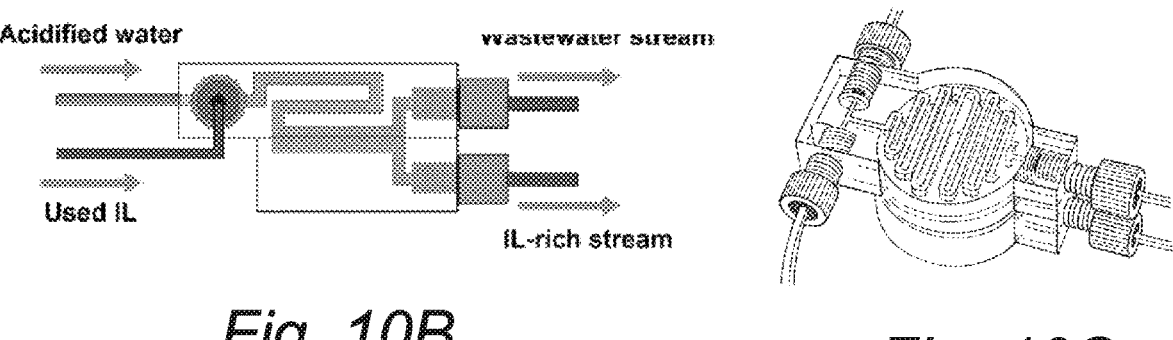
Fig. 10B
Fig. 10C

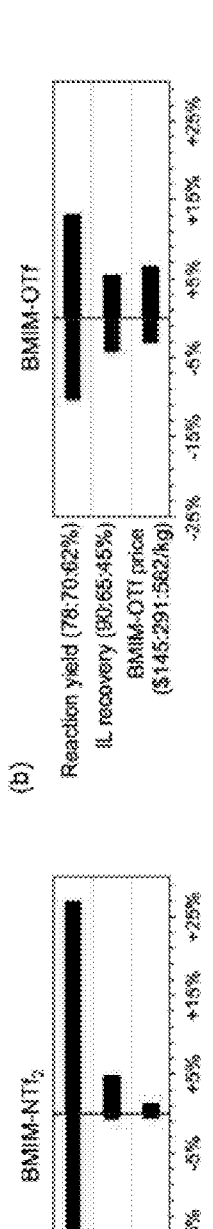
*Fig. 14A*
*Fig. 14B*
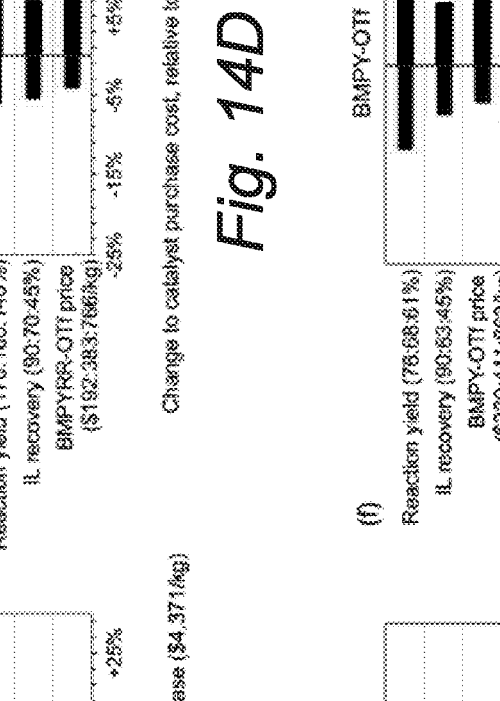
*Fig. 14C*
*Fig. 14D*
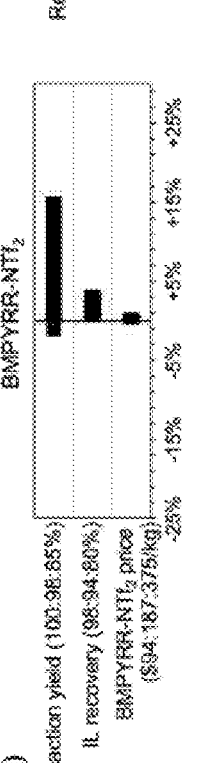
*Fig. 14E*
*Fig. 14F*

OTf⁻ IL

NTf₂⁻ IL

Water

Water

Retentate
Product

OTf⁻ IL

Permeate
Product

NTf₂⁻ IL

NTf₂⁻ IL

MICROFLUIDIC DEVICE DESIGN FOR EXTRACTION AND PHASE SEPARATION FOR ORGANIC SOLVENT PURIFICATION

CROSS-REFERENCE TO RELATED APPLICATIONS

This application claims the benefit of U.S. provisional application Ser. No. 63/424,244 filed Nov. 10, 2022, the disclosure of which is hereby incorporated in its entirety by reference herein.

STATEMENT REGARDING FEDERALLY SPONSORED RESEARCH OR DEVELOPMENT

This invention was made with government support under Grant No(s). CMMI-1728649, awarded by the National Science Foundation (NSF). The government has certain rights in the invention.

TECHNICAL FIELD

In at least one aspect, the present invention relates to microfluidic devices for purifying solvent, and in particular for purifying ionic solvents.

BACKGROUND

Ionic liquids (ILs) are molten salts consisting of organic or inorganic anions and organic cations with melting points below 100° C. and often below room temperature.[1] ILs have gained significant attention as sustainable alternatives to traditional volatile organic compounds (VOCs) because they are non-flammable and have negligible vapor pressures, mitigating their emissions into the atmosphere and ultimately decreasing their environmental impact.[2] ILs are widely employed in a variety of synthetic chemistries,[3-7] including as solvents for inorganic nanoparticle syntheses.[8-12] ILs are also known to exhibit an extraordinary ability to extract metal ions for extraction and recovery processes.[13-17] However, the relatively high cost of ILs over traditional organic solvents greatly hinders their practical application in industrial processes.[18] It is therefore essential to reuse or recycle ILs; techniques for IL recycling without degradation of IL quality have been a topic of considerable research. Oliveira and coworkers reported that 1-butyl-3-methylimidazolium bis(trifluoromethylsulfonyl)imide (BMIM-NTf$_2$) or 1-butyl-3-methylimidazolium hexafluorophosphate (BMIM-PF$_6$) used as solvents for Fe$_3$O$_4$ magnetic nanoparticle synthesis could be recycled for more than 20 successive reactions.[19] Karadaghi and coworkers succeeded in obtaining a constant quality of colloidal Pt nanoparticles using 5× recycled BMIM-NTf$_2$ as solvent, and through a techno-economic analysis they demonstrated that the total cost of using recycled ILs can be as low as 10% of the cost of using a conventional organic solvent.[20]

While batch procedures for IL recycling are well understood, they often suffer from being labor-intensive, time-consuming, and highly variable. Flow methods have the potential to overcome these disadvantages, affording high reproducibility, speed, high throughput, and reduced environmental risks.[21] One of the most advantageous features of continuous processes is that they enable automation to minimize human intervention and errors, and can be easily integrated with computer-aided optimization algorithms to maximize the output of interest. Self-optimizing, continuous flow techniques have typically been applied to synthetic chemistry operations;[22-26] however, there are very few studies applying self-optimizing, feedback-enabled approaches to work-up processes such as the liquid-liquid extraction and separation needed for IL solvent recycling. Note that in this report we use the term "extraction" to describe the mass transfer of metal ions between the liquid phases and the term "separation" to describe the physical removal of one phase from the other. Other reports in the literature use the term "stripping" to refer to the transfer of metal ions out of the IL phase; our use of the term "extraction" is equivalent.

Biphasic liquid-liquid separation for non-IL based systems has been broadly studied and utilized in microfluidics or millifluidics via configurations consisting of conventional gravity-based separators,[27] direct Y-shaped branched outlets,[28,29] capillaries,[30-33] membrane separators,[34-39] and other customized setups.[38,40] Membrane separation, which harnesses Laplace pressure and differential wettability determined by the membrane materials to effectively separate immiscible liquids is widely used because of its versatility, relative ease of design and assembly, and superior separation performance.[30] Although membrane separators have already showcased the power to separate diverse solvents (e.g., toluene[37] and water), their ability to tackle ionic liquids remains untapped.

SUMMARY

In at least one aspect, a purification system for ionic liquid solvents is provided. The purification system includes an ionic liquid source that includes a first flow controller configured to provide a first flow stream at a first flow rate. The first flow stream includes an ionic liquid requiring purification. An extraction liquid source includes a second flow controller configured to provide a second flow stream at a second flow rate. The second flow stream includes an extraction liquid that is immiscible with the ionic liquid. A mixing component is configured to mix the first flow stream and the second flow stream and output a mixed flow stream. A separator assembly includes a housing having a first flow channel assembly, a second flow channel assembly, an inlet, a first outlet, and a second outlet. The inlet is configured to receive the mixed-flow stream. The first outlet is configured to output a retentate output flow stream. The separator assembly also includes a separation membrane interposed between the first flow channel assembly and the second channel assembly. The separation membrane has a first face that contacts ionic liquid in the first flow channel assembly from the mixed flow stream and a second face contacting a permeate waste stream in the second flow channel assembly that is outputted from the second outlet.

In another aspect, the purification system further includes an output flow controller configured adjust flow of the retentate output flow stream to a third flow rate. A flow detector measures the homogeneity of the retentate output flow after separation (i.e., separation performance). A spectrometer system is configured to monitor concentrations of impurities in the retentate output flow stream. A computing device is in electrical communication with the first flow controller, the second flow controller, the flow detector, and the spectrometer system. The spectrometer system provides feedback to the computing device about concentrations of impurities in the retentate output flow stream such that the first flow rate, the second flow rate, and the third flow rate are adjustable to increase the purity of the retentate output flow stream.

In another aspect, a purification system for ionic liquid solvents is provided. The purification system includes an ionic liquid source that includes a first flow controller configured to provide a first flow stream at a first flow rate. The first flow stream includes an ionic liquid requiring purification. A separator assembly includes a housing having a first flow channel assembly, a second flow channel assembly, an inlet, a first outlet, and a second outlet. The inlet is configured to receive the first flow stream. The first outlet is configured to output a retentate output flow stream. The separator assembly also includes a separation membrane interposed between the first flow channel assembly and the second channel assembly. The separation membrane has a first face that contacts ionic liquid in the first flow channel assembly from the first flow stream and a second face contacting a permeate waste stream in the second flow channel assembly that is outputted from the second outlet. An output flow controller is configured adjust flow of the retentate output flow stream to a third flow rate. A flow detector measures the homogeneity of the retentate output flow after separation (i.e., separation performance). A spectrometer system is configured to monitor concentrations of impurities in the retentate output flow stream. A computing device in electrical communication with the first flow controller, the flow detector, and the spectrometer system. The spectrometer system provides feedback to the computing device about concentrations of impurities in the retentate output flow stream such that the first flow rate and the third flow rate are adjustable to increase the purity of the retentate output flow stream.

In another aspect, a separator assembly for a purification system is provided. The separator assembly includes a first flow channel assembly including herringbone flow channel and a waved flow channel downstream of the herringbone flow channel. The first flow channel assembly also includes an inlet and a first outlet. The inlet is configured to receive a first flow stream that includes an ionic liquid. The first outlet is configured to output a retentate output flow stream. A second flow channel assembly includes a second outlet and a zigzagging flow channel upstream of the second outlet. A separation membrane is positioned between the first flow channel assembly and second flow channel assembly. The separation membrane has a first face that contacts ionic liquid in the first flow channel assembly and a second face contacting a permeate waste stream in the second flow channel assembly that is outputted from the second outlet.

In another aspect, a continuous microfluidic process where extraction to wash a metal ion-loaded IL and subsequent phase separation is provided. As proof of concept, deionized (DI) water was used to extract Fe(III) ions from BMIM-NTf$_2$. The post-extraction biphasic slug flow was separated via an in-house, 3D-printed membrane separator to produce a purified IL in a model recycling process. Design of experiments, self-optimization (Nelder-Mead simplex) and feedback control were introduced to control the recycling process, enabled by inline spectrophotometric monitoring. We also performed Nd(III) ion extraction from the IL trihexyl(tetradecyl)phosphonium bis(2,4,4-trimethyl-pentyl)phosphinate (Cyphos 104) by a two-step wash with an acidified aqueous solution, further demonstrating that the extraction and separation processes can be generalized for systems using different ILs and metal ions.

Industrial applications of ionic liquids (ILs)-solvents that can serve as green alternatives to volatile organic compounds—are often hampered by the high cost. Solvent recycling provides a feasible pathway to recover IL solvents to reduce lifecycle costs. Herein, we demonstrate a continuous microfluidic process to purify metal ion-loaded IL solvents, wherein Fe(III) ions are extracted from a prototypical IL, 1-butyl-3-methylimidazolium bis(trifluoromethylsulfonyl)imide (BMIM-NTf$_2$) to deionized (DI) water with subsequent membrane separation of the IL and aqueous phases. Inline analytical tools, design of experiments statistical optimization, and a self-optimizing, modified Nelder-Mead simplex algorithm facilitate locating the best parametric operating conditions to optimize both ion extraction and physical phase separation. This process was then adapted to a more challenging purification application: recovery of the IL trihexyl(tetradecyl)phosphonium bis(2,4, 4-trimethyl-pentyl)phosphinate (Cyphos 104) from the rare earth metal Nd(III). This application demonstrated that optimized conditions obtained from a single stage could be applied across a multistage process. Together, these results demonstrate that statistical and inline optimization tools can be used to identify working parameters for different flow systems with a variety of governing fluid properties, e.g., viscosity and interfacial tension.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein:

FIGS. 10A, 10B, and 10C. Continuous flow process for used IL solvent extraction and separation. (A) Schematic drawing for recycling of the water-immiscible TL solvents with $NTf_2^-$ anions. The used TL and acidified water streams are infused to the recycler by two syringe pumps and form slug flows in a T-shaped junction. Extraction occurs by mass transfer in herringbone-patterned channels and wavy channels downstream. The liquid-liquid biphasic flow is next separated by a membrane separator. The wastewater stream is collected by a syringe pump in withdrawal mode, while the purified IL stream is collected for reuse. (B) Partial schematic for washing the water-miscible IL solvents with $OTf^-$ anions. A single-phase flow is formed in the T-junction. After co-flow, the IL-rich product stream is separated downstream by transport across an TL-impregnated membrane. (C) Photograph of the 3D-printed recycler.

FIGS. 14A, 14B, 14C, 14D, 14E, and 14F. Tornado plot showing the results of the sensitivity analysis on the cost of 0.5% NP-Pt/C using (A) $BMIM-NTf_2$, (B) BMIM-OTf, (C) $BMPYRR-NTf_2$, (D) BMPYRR-OTf, (E) $BMPY-NTf_2$, and (F) BMPY-OTf.

DETAILED DESCRIPTION

Figure 1A:
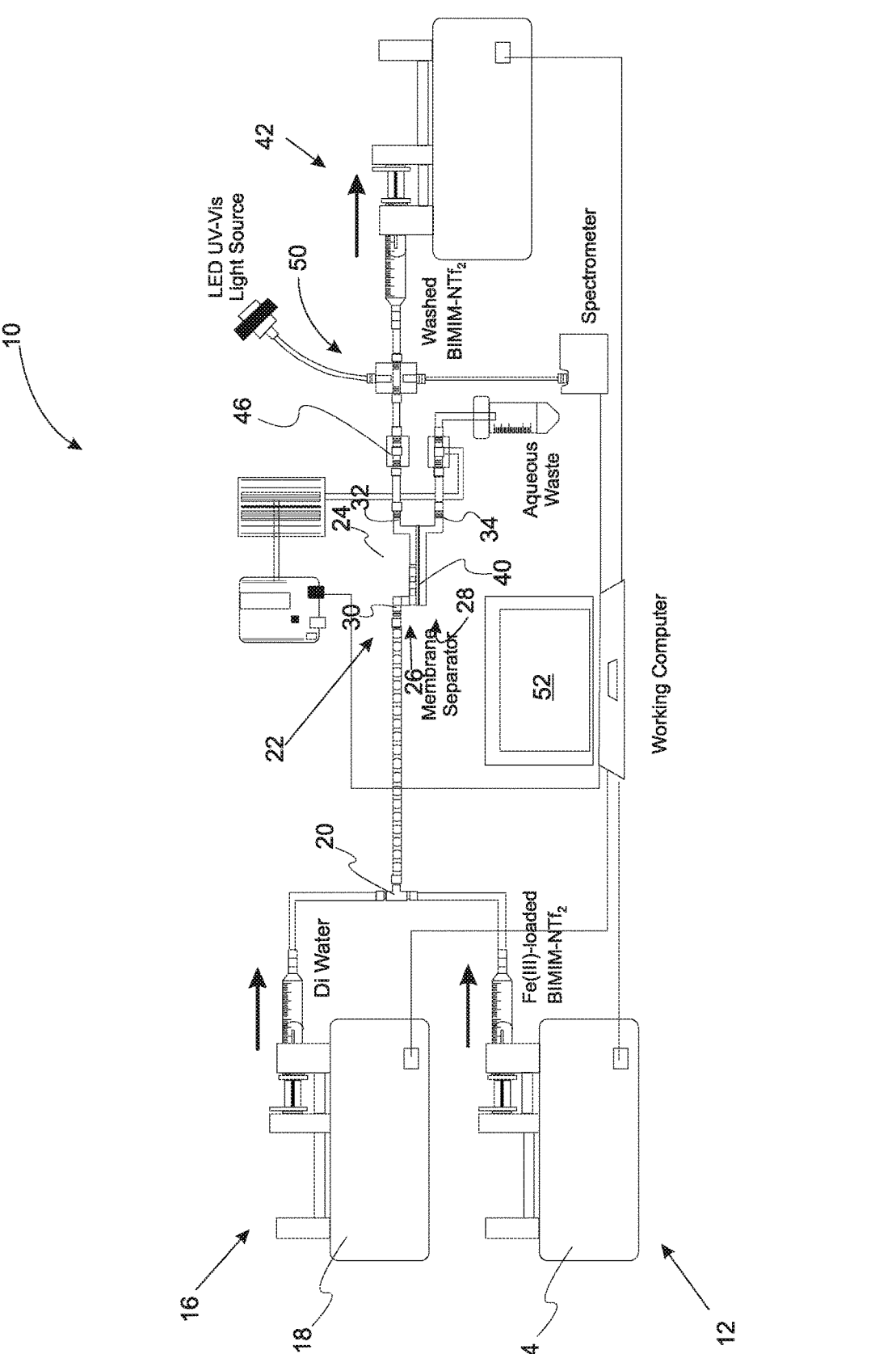
FIG. 1A. Schematic of the washing system for recycling Fe(III) ion-loaded BMIM-NTf$_2$ with DI water. Two syringe pumps are used to infuse the IL-to-wash and the washing water into the channel. Slug flows are formed in a T-junction. The two phases are separated in a membrane separator (nylon, 0.45 m pore size). The washed product is received by a syringe pump operating in withdrawal mode, while the aqueous waste is discharged. Residual Fe(III) ions in the retentate are monitored by UV-vis spectrophotometry. Incident light is indicated by the yellow cable and transmitted light by the blue cable. Separation performance is sensed by two IR emitter-detector pairs. All devices are controlled by a working computer with the grey lines indicating the connections.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

The term "fluid communication" refers to the ability of fluid to move from one part, element, or component to another; or the state of being connected, such that fluid can move by pressure differences from one portion that is connected to another portion.

Throughout this application, where publications are referenced, the disclosures of these publications in their entireties are hereby incorporated by reference into this application to more fully describe the state of the art to which this invention pertains.

ABBREVIATIONS

"BMIM" means 1-butyl-3-methylimidazolium.

"BMPYRR" means 1-butyl-1-methylpyrrolidinium triflate.

"DI" means deionized (DI) water.

"IL" means ionic liquid.

"NTF" means bis(trifluoromethylsulfonyl)imide.

"PVP" means polyvinylpyrrolidone.

"SD" means standard deviation.

The term "ionic liquid" means a liquid composed of positively charged ions (cations) and negatively charged ions (anions) that are held together by strong electrostatic forces. Examples of ionic liquids include but are not limited to 1-butyl-3-methylimidizolium bis(trifluoromethylsulfonyl)imide, 1-butyl-3-methylimidizolium trifluoromethanesulfonate, 1-butyl-1-methylpyrrolidinium bis(trifluoromethylsulfonyl)imide, 1-butyl-1-methylpyrrolidinium trifluoromethanesulfonate, 1-butyl-2-methylpyridinium bis(trifluoromethylsulfonyl)imide, 1-butyl-2-methylpyridinium trifluoromethanesulfonate, trihexyltetradecylphosphonium bis(trifluoromethanefulonate)imide, trihexyltetradecylphosphonium decanoate, trihexyltetradecylphosphonium dicyanamide, trihexyltetradecylphosphonium bromide, trihexyltetradecylphosphonium bis(2,4,4-trimethylpentyl) phosphinate, 1-butyl-3-methylimidizolium hexafluorophosphate, 1-butyl-3-methylimidizolium tetrafluoroborate, 1-butyl-3-methylimidizolium dicyanamide, 1-butyl-1-methylpyrrolidinium dicyanamide, 1-butyl-2-methylpyridinium tetrafluoroborate, 1-Ethyl-3-methylimidazolium chloride, 1-Butyl-3-methylimidazolium hexafluorophosphate (BMIM PF6), choline-based ionic liquids, ammonium-based ionic liquids, and combinations thereof.

Referring to FIG. 1A, a schematic of a purification system for ionic liquid solvents is provided. Purification system 10 includes an ionic liquid source 12 that includes a first flow controller 14 configured to provide a first flow stream at a first flow rate. The first flow stream includes liquids, such as an ionic liquid, requiring purification. Examples of ionic liquids are set forth above. Extraction liquid source 16 includes a second flow controller 18 configured to provide a second flow stream at a second flow rate. The second flow stream includes an extraction liquid that is typically immiscible with the ionic liquid. In a refinement, the extraction liquid includes or is water, and in particular, acidified water. Therefore, there will be an ionic liquid phase and an extraction liquid phase. Mixing component 20 is configured to mix the first flow stream and the second flow stream and output a mixed flow stream that includes the retentate phase and the permeate phase. Separator assembly 22 includes a housing 24 having a first flow channel assembly 26, a second flow channel assembly 28, an inlet 30, a first outlet 32, and a second outlet 34. Inlet 30 is configured to receive the mixed-flow stream. The first outlet 32 is configured to output a retentate output flow stream. Separator assembly 22 also includes a separation membrane 40 interposed between the first flow channel assembly 26 and the second channel assembly 28. The separation membrane 40 has a first face that contacts ionic liquid in the first flow channel assembly 26 from the mixed flow stream and a second face contacting a permeate waste stream (i.e., the permeate phase) in the second flow channel assembly 28 that is outputted from the second outlet 34. In a refinement, output flow controller 42 is configured to adjust the flow of the retentate output flow stream (i.e., the retentate phase) to a third flow rate. In a refinement, flow detector 46 measures the homogeneity of the retentate output flow after separation (i.e., separation performance). In a refinement, spectrometer system 50 is configured to monitor concentrations of impurities in the retentate output flow stream. In a refinement, computing device 52 is in electrical communication with the first flow controller, the second flow controller, the flow detector, and the spectrometer system. Advantageously, the spectrometer system provides feedback to the computing device about concentrations of impurities in the retentate output flow stream such that the first flow rate, the second flow rate, and the third flow rate are adjustable to increase the purity of the retentate output flow stream.

In a variation, the first flow rate, the second flow rate, and the third flow rate are adjustable to increase the purity of the retentate output flow stream in accordance with optimization of an objective function. In a refinement, the objective function is the following equation:

$$Score = 100 - C_1 \log_{10} \frac{I_0}{I} \text{ "Extraction Term"} -$$
$$C_2 \max(SD_{ret}, SD_{per}) \text{ "Separation Term"} - C_3 \frac{Q_{ES}}{Q_{IL}} \text{ "Separation Term"}$$

where:

$C_1$, $C_2$, and $C_3$ are numberical coefficients;

$I_0$ is transmittance intensity for the ionic liquid requiring purification;

$I$ is transmittance intensity for the retentate output flow stream;

$SD_{ret}$ and $SD_{per}$ are standard deviations for the retentate output flow stream and the permeate waste stream, respectively; and $Q_{IL}$ and $Q_{ES}$ are the first flow rate and the second flow rate ($\mu$L/min), respectively. In a refinement, $C_1$ and $C_2$ are each independently at least 50, 100, 200, 300, or 400 and at most 1000, 900, 800, 700, or 600. In a further refinement, $C_1$ and $C_2$ are each independently from 100 to 900. In a refinement, $C_3$ is at least 1, 2, 3, 4, or 5 and at most 15, 10, 9, 8, or 7. In a further refinement, $C_3$ is from 1 to 10. A specific example of the objective function is:

$$Score = 100 - 200 \log_{10} \frac{I_0}{I} \text{ "Extraction Term"} -$$
$$800 \max(SD_{ret}, SD_{per}) \text{ "Separation Term"} - 5 \frac{Q_{ES}}{Q_{IL}} \text{ "Separation Term"}$$

Figure 1B:
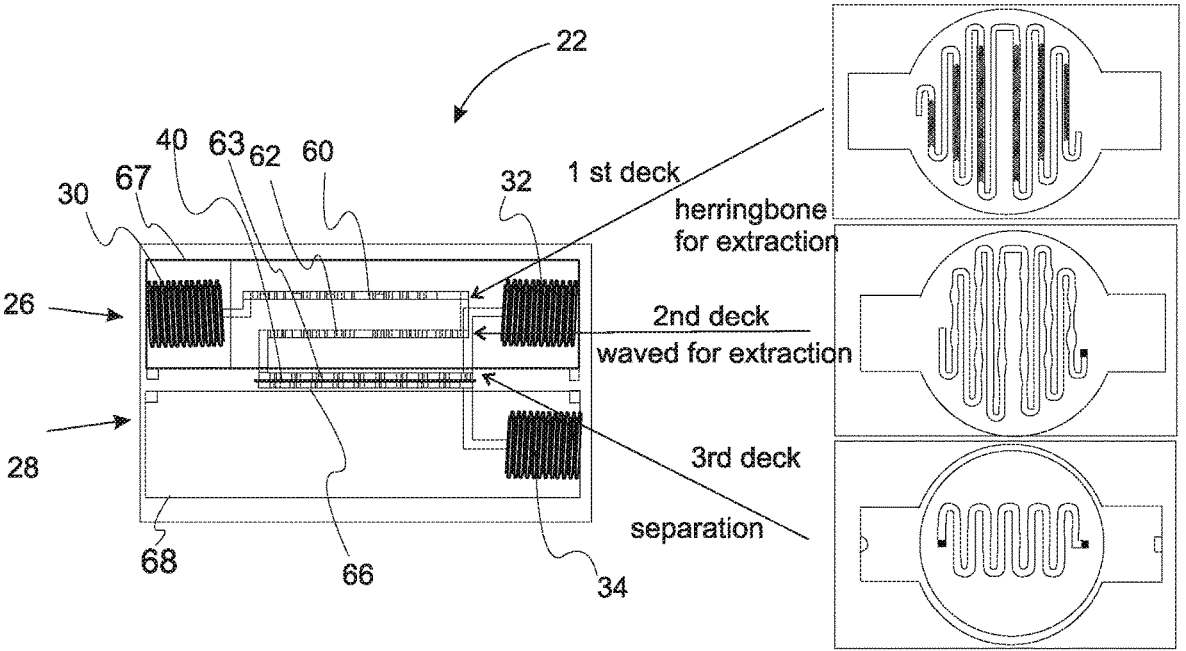
FIG. 1B. Schematic of a separator assembly.
Figure 2A:
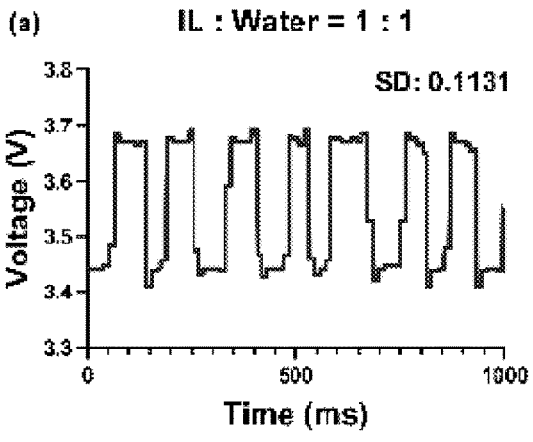
FIGS. 2A, 2B, 2C, and 2D. Output voltage readings over 1 s from the IR detector at different biphasic flow ratios. Flow rates: (A) BMIM-NTf$_2$: 200 μL/min, water: 200 μL/min; (B) BMIM-NTf$_2$: 50 μL/min, water: 350 μL/min; (C) BMIM-NTf$_2$: 400 μL/min; (D) water: 400 μL/min.
Figure 2B:
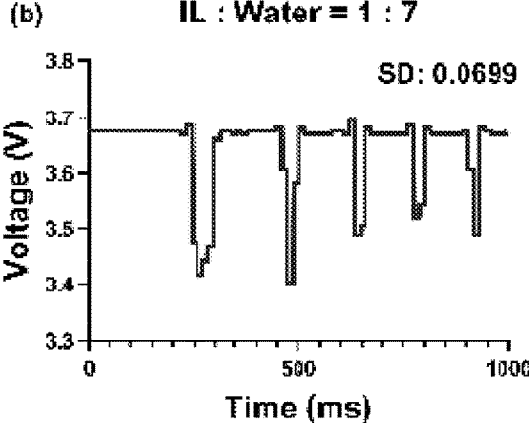
Figure 2C:
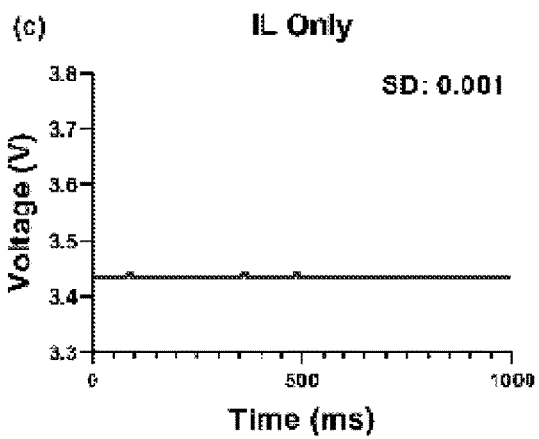
Figure 2D:
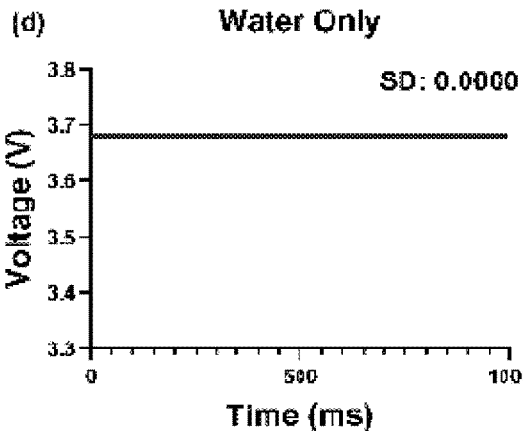

Referring to FIG. 1B, the first flow channel assembly 26 includes a herringbone flow channel 60. In a refinement, the first flow channel assembly 26 includes a waved flow channel 62 downstream of the herringbone flow channel. In a refinement, the first flow channel assembly 26 can include a first separation channel 63 that contacts separation membrane 40. As depicted in FIG. 1B, each of herringbone flow channel 60 and waved flow channel 62 can follow a zigzagging flow path. In a refinement, the second flow channel assembly 28 includes a second separation flow channel 66 that aligns with the first separation channel. In a refinement, both first separation channel 63 and flow channel 66 follow a zigzagging path. In a further refinement, the herringbone flow channel 60, the waved flow channel 62, and the zigzagging flow channel 66 independently have a height from about 300 microns to 1000 microns and a width from about 300 microns to 1000 microns.

In a variation, the herringbone flow channel 60, the waved flow channel 62, the inlet 30, optional first separation channel 63, and the first outlet 32 are least partially defined by and embedded in a first single material block 67. Similarly, zigzagging flow channel 66 and the second outlet 34 are at least partially defined by and embedded in a second single material block 68. In a refinement, the first single material block and the first single material block are independently composed of a polymer or resin. In a further refinement, the first flow channel assembly and the second flow channel assembly are at least partially formed by 3D printing.

In another aspect, the herringbone flow channel 60, the waved flow channel 62, and the zigzagging flow channel 66 independently have a height from about 300 microns to 700 microns and a width from about 300 microns to 700 microns.

Referring to FIG. 1A, in a variation, an ionic liquid source 12 that includes a first flow controller 14 configured to provide a first flow stream at a first flow rate is used, while an extraction liquid source 16 is not used. Purification system 10 includes an ionic liquid source 12 includes a first flow controller configured to provide a first flow stream at a first flow rate. The first flow stream includes liquids, such as an ionic liquid, requiring purification. Separator assembly 22 includes a housing 24 having a first flow channel assembly 26, a second flow channel assembly 28, an inlet 30, a first outlet 32, and a second outlet 34. Inlet 30 is configured to receive the first flow stream. The first outlet 32 is configured to output a retentate output flow stream. Separator assembly 22 also includes a separation membrane 40 interposed between the first flow channel assembly 26 and the second channel assembly 28. The separation membrane 40 has a first face that contacts ionic liquid in the first flow channel assembly 26 from the first flow stream and a second face contacting a permeate waste stream (i.e., the permeate phase) in the second flow channel assembly 28 that is outputted from the second outlet 34. In a refinement, output flow controller 42 is configured to adjust the flow of the retentate output flow stream (i.e., the retentate phase) to a second flow rate. In a refinement, flow detector 46 measures the homogeneity of the retentate output flow after separation (i.e., separation performance). In a refinement, spectrometer system 50 is configured to monitor concentrations of impurities in the retentate output flow stream. In a refinement, computing device 52 is in electrical communication with the first flow controller, the second flow controller, the flow detector, and the spectrometer system. Advantageously, the spectrometer system provides feedback to the computing device about concentrations of impurities in the retentate output flow stream such that the first flow rate, the second flow rate, and the third flow rate are adjustable to increase the purity of the retentate output flow stream.

In another aspect, separation membrane 40 can be composed of polymers, ceramics, or composites thereof. In a refinement, the separation membranes include micropores. In a further refinement, the micropores have a diameter from about 0.01 to 1 $\mu$m. Depending on the application, separation membrane 40 can be composed of a hydrophilic material or a hydrophilic material. Examples of hydrophilic materials include but are not limited to polyimide (e.g., Nylon) (depending on the surface treatment), cellulose-based membranes, polyvinyl alcohol, polyethylene glycol, polysulfone ((depending on the surface treatment), polyethersulfone (depending on the surface treatment), and the like. Examples of hydrophobic materials include but are not limited to polytetrafluoroethylene, polypropylene, polycarbonate, polyethylene, polyvinylidene fluoride (depending on the surface treatment), silicone rubber, polyimide (depending on the surface treatment) ceramic and the like.

In another aspect, when separation membrane 40 is hydrophilic, the ionic liquid phase is the retentate phase, and the aqueous phase is the permeate phase. Alternatively, when separation membrane 40 is hydrophilic, the ionic liquid phase is the permeate phase, and the aqueous phase is the retentate phase.

In another aspect, the ionic liquid can be a reaction solvent used in colloidal inorganic nanoparticle synthesis as set forth below in more detail.

Additional details of the methods and system set forth above are found in Karadaghi et al., A techno-economic approach to guide the selection of flow recyclable ionic liquids for nanoparticle synthesis, RSC Sustain., 2023, 1, 1861-1873, 10.1039/D3SU00182B and its supplemental information;

B. Pan et al. Purification of Ionic Liquid Solvents in a Self-Optimizing, Continuous Microfluidic Process via Extraction of Metal Ions and Phase Separation; ACS Sustainable Chem. Eng. 2023, 11, 1, 228-237; Dec. 28, 2022; https://doi.org/10.1021/acssuschemeng.2c05285 an its supplemental information; the entire disclosures of which is hereby incorporated by reference.

The following examples illustrate the various embodiments of the present invention. Those skilled in the art will recognize many variations that are within the spirit of the present invention and scope of the claims.

1. Purification of Ionic Liquid Solvents in a Self-Optimizing, Continuous Microfluidic Process Via Extraction of Metal Ions and Phase Separation 1.1 Introduction A continuous microfluidic process where extraction to wash a metal ion-loaded TL and subsequent phase separation are implemented. In this example, deionized (DI) water was used to extract Fe(III) ions from BMIM-NTf$_2$. The post-extraction biphasic slug flow was separated via an in-house, 3D-printed membrane separator to produce a purified TL in a model recycling process. Design of experiments, self-optimization (Nelder-Mead simplex) and feedback control were introduced to control the recycling process, enabled by inline spectrophotometric monitoring. We also performed Nd(III) ion extraction from the TL trihexyl(tetradecyl)phosphonium bis(2,4,4-trimethyl-pentyl)phosphinate (Cyphos 104) by a two-step wash with an acidified aqueous solution, further demonstrating that the extraction and separation processes can be generalized for systems using different TLs and metal ions.

1.2 Results and Discussion

The apparatus for extracting Fe(III) ions from BMIM-NTf$_2$ is shown in FIGS. 1A and 1B. Two syringe pumps operating in infusion mode were used to drive the TL feed and the aqueous extraction stream. The streams met at a T-junction, where they formed a biphasic slug flow. Biphasic slug flow was selected among different flow patterns of two immiscible fluids (e.g., parallel flow and droplet flow), because mass transfer efficiency is enhanced by the internal circulations in each slug and high interfacial area for diffusion between two neighboring slugs.[38] In general, biphasic flow patterns are controlled by the linear velocity (flow rate), the physical properties of the fluids (viscosity and interfacial tension), the volumetric ratio of the phases, the mixer and channel geometries, and the device materials.[41] After passing through a length of tubing in which mass transfer of the Fe(III) ions from the feed to the aqueous phase occurred, the slug flow entered a membrane separator for separation of the two liquid phases. Process monitoring was accomplished by monitoring both outlet streams with IR emitter-detector pairs to detect the presence of slugs.[42] The raffinate (i.e., IL-rich) stream was further monitored with an in-line UV-vis spectrophotometer to record the transmittance intensity at 310 nm to reflect the concentration of Fe(III) ions (310 nm was selected as the optimal wavelength for quantifying Fe(III) in preliminary experiments). A syringe pump operating in withdrawal mode was attached to this stream to ensure flow stability.

Separation performance was quantified using an objective based on the signals from the IR pairs and the spectrophotometer. The IR detectors took 1000 consecutive voltage readings in the time that 3 µL of fluid passed through the IR block. The standard deviation (SD) of these measurements was used to quantify the degree to which immiscible slugs remained even after membrane separation. A high SD represents a significant presence of slugs while a low SD indicates a relatively homogenous stream (FIG. 2). An SD below 0.003 can be regarded as single phase flow resulting from perfect separation, based on preliminary tests in which pure reagents were flowed through the IR blocks. Transmittance at 310 nm was used to quantify the amount of Fe(III) in the product stream. The objective function that allows for simultaneous optimization of Fe(III) extraction and slug separation is given in eq 1.

$$Score = 100 - 200\log_{10}\frac{I_0}{I} \text{ "Extraction Term" } - \qquad (1)$$
$$800\max(SD_{ret}, SD_{per}) \text{ "Separation Term" } - 5\frac{Q_{ES}}{Q_{IL}} \text{ "Separation Term"}$$

where $I_0$ is the transmittance intensity for as-received BMIM-NTf$_2$; I is the transmittance intensity for the inline retentate flow; $SD_{ret}$ and $SD_{per}$ are the standard deviations for the retentate and permeate flows, respectively; and $Q_{aq}$ and $Q_{IL}$ are the aqueous and IL inlet flow rates (µL/min), respectively.

In the objective function, the extraction term uses the logarithm of the ratio of the blank transmittance (measurement on the pure IL prior to each run) to the transmittance of the processed IL from the outlet, which corresponds to the effect of the Beer-Lambert law.[43] The value of 0.009 (indicating good extraction according to preliminary experiments) was set to regulate the logarithm result; any logarithm result lower than this number was from detection noise and therefore normalized to 0.009. The separation term picks the larger SD between the retentate stream and the permeate stream. SD below 0.003 will be normalized to 0.003, the perfect separation threshold, to minimize the effect of signal noise on the output of the objective function. The scores of the process were therefore co-determined by the performance of extraction and separation, with low SD or high transmittance both giving high scores. Coefficients in the objective function were tuned not only to fit the resulting scores in a reasonable range (0-100) but also to prioritize separation over-extraction because incomplete extraction can be compensated by multi-stage washing, while imperfect separation can cause irreversible product loss. A "penalty" term was included only when the flow rate ratio of IL to aqueous phase fell below 0.8. This punishes configurations when the process infuses so much of the aqueous stream that the product throughput is negligible.

The three tunable variables that govern the entire process are the flow rates of the two infusion pumps and the withdrawal pump. Extraction performance is controlled by the two infusion flow rates that regulate the slug morphologies, the slug ratio, and the residence time for mass transfer. Separation performance is controlled by the pressure difference across the two sides of the membrane. With fixed apparatus parameters (channel diameters, lengths, and the height of outlets), three operating regimes (retention, complete separation, and breakthrough) are determined by flow rates of the retentate and permeate phases according to the Hagen-Poiseuille equation.[34] To retain the operating pressure difference across the membrane between the retention limit and the breakthrough threshold and achieve complete separation, flow rates of all three pumps must be controlled. Since the withdrawal pump cannot withdraw at a rate greater than the total infusion rate, two linear constraints were introduced (eq 2 and eq 3):

$$Q_{wd} \leq 0.8(Q_{IL} + Q_{aq}) \tag{2}$$

$$Q_{wd} \geq 0.7 Q_{IL} \tag{3}$$

where $Q_{wd}$ is the withdrawal volumetric flow rate and $Q_{aq}$ and $Q_{IL}$ are the aqueous and IL inlet flow rates ($\mu$L/min), respectively.

The safety factor of 0.8 was added to ensure some flow continuously passing into permeate channel. The withdrawal flow rate cannot be smaller than 70% of the IL infusion flow rate to avoid backflow to the aqueous inlet channel caused by the large viscosity difference between the IL and aqueous phase.

Figure 3:
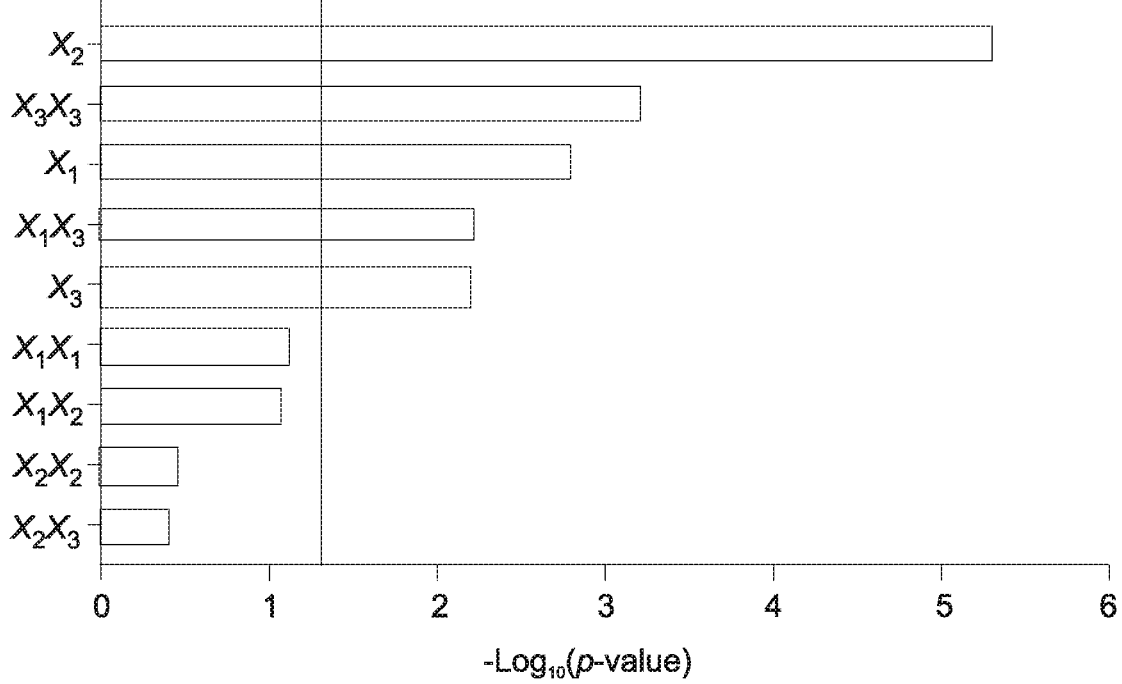
FIG. 3. Pareto chart for score from DoE results. X1, X2, X3 are defined as BMIM-NTf$_2$ infusion flow rate, DI water infusion flow rate, and retentate withdrawal flow rate, respectively. The vertical line represents $-\log 10$(p-value=0.05).

To screen the entire experimental space efficiently and effectively and explore the combined performance of extraction and separation under different flow rate combinations, we carried out a statistical design of experiments (DoE). Given the asymmetric, constrained experimental space, we used a D-optimal experimental design. The experimental design was generated using JMP Pro 16, with flow rates as three continuous factors (X1, X2, X3) in the experimental range, scores from the objective function as response (y), and the two linear constraints (eq 2 and eq 3) regulating the flow rates. The design matrix identified 22 experiments to fit a response surface (details in the SI), including replicates of some chosen points to increase statistical significance and enhance the fitting. The effects of each term on the response were screened using the forward selection as an estimation method and the Akaike information criterion with a correction (AICc) as a validation method. The Pareto chart in FIG. 3 presents the statistical results of the polynomial fitting. The infusion flow rate of the aqueous phase had the most significant effect on the score, with a p-value far smaller than the 0.05 significance level. This can be attributed to the presence of the penalty term and the aqueous phase being the membrane-wetting phase, which significantly impacts the separation workload. The two least significant terms, (the interaction term between water infusion flow rate and withdrawal flow rate and the quadratic term of water infusion flow rate) were removed to carry out response surface methodology (RSM).

$$\text{Score} = 29.67 + 43.21X_1 - 32.72X_2 - 44.94X_3 + 12.17X_1X_2 - 52.95X_1X_3 + 15.47X_1^2 + 57.44X_3^2 \tag{4}$$

Figure 4:
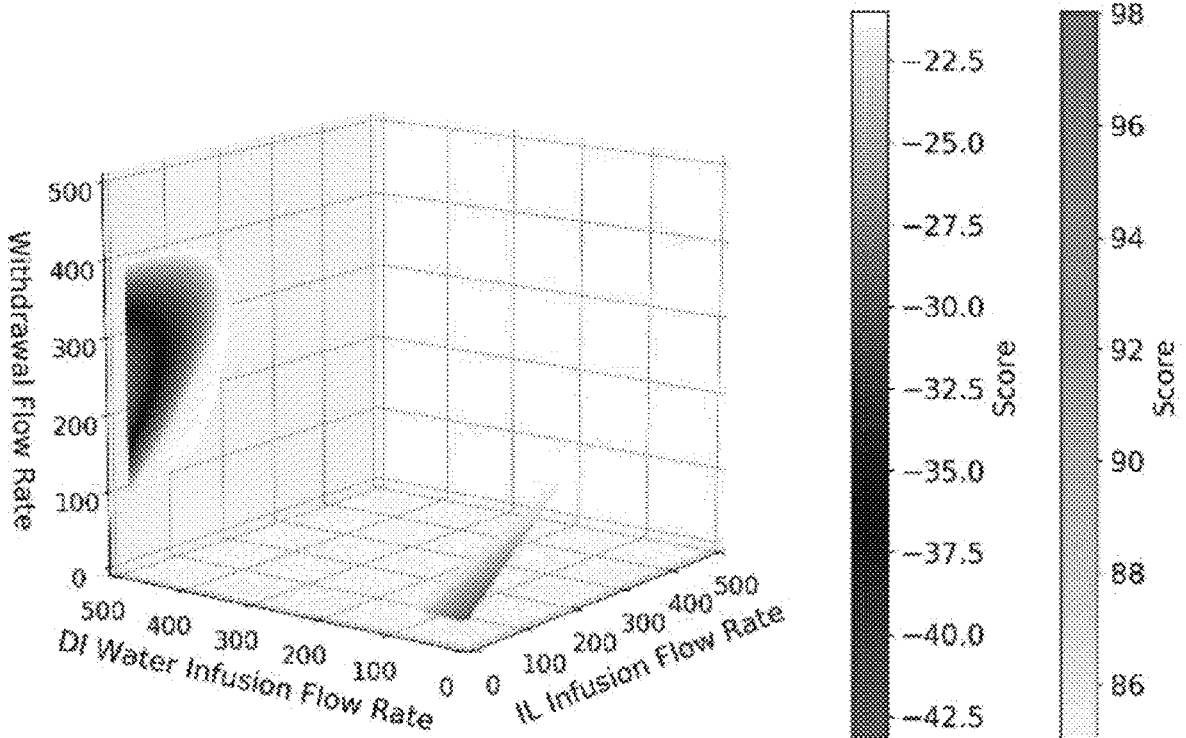
FIG. 4. Predictive high- and low-score regions in 3D space, with warm colors showing scores >85 and cool colors showing scores <−20.

Eq 4 shows a polynomial function to fit a three-dimensional second-order response surface model, providing predictive output scores for all feasible flow rate combinations across the entire constrained experimental space. The input variables in the fitted function were normalized and coded to values in the range of the low level (−1) to the high level (+1), corresponding to the lower bound (20 $\mu$L/min) and the upper bound (500 $\mu$L/min). The corresponding R2 and the adjusted R2 were 0.93 and 0.89, respectively. A three-dimensional representation of the experimental space with parts of the predicted scores plotted in different colors is shown in FIG. 4. The high-score region (>85) and low-score region (<−22.5) are depicted in warm colors and cool colors, respectively. The existence of negative scores results from the impact of the penalty term. The highest scores reside on the corner of the space in the low-flow-rate region, suggesting that low flow rates favor both Fe(III) ion extraction and IL-water separation.

Figure 5A:
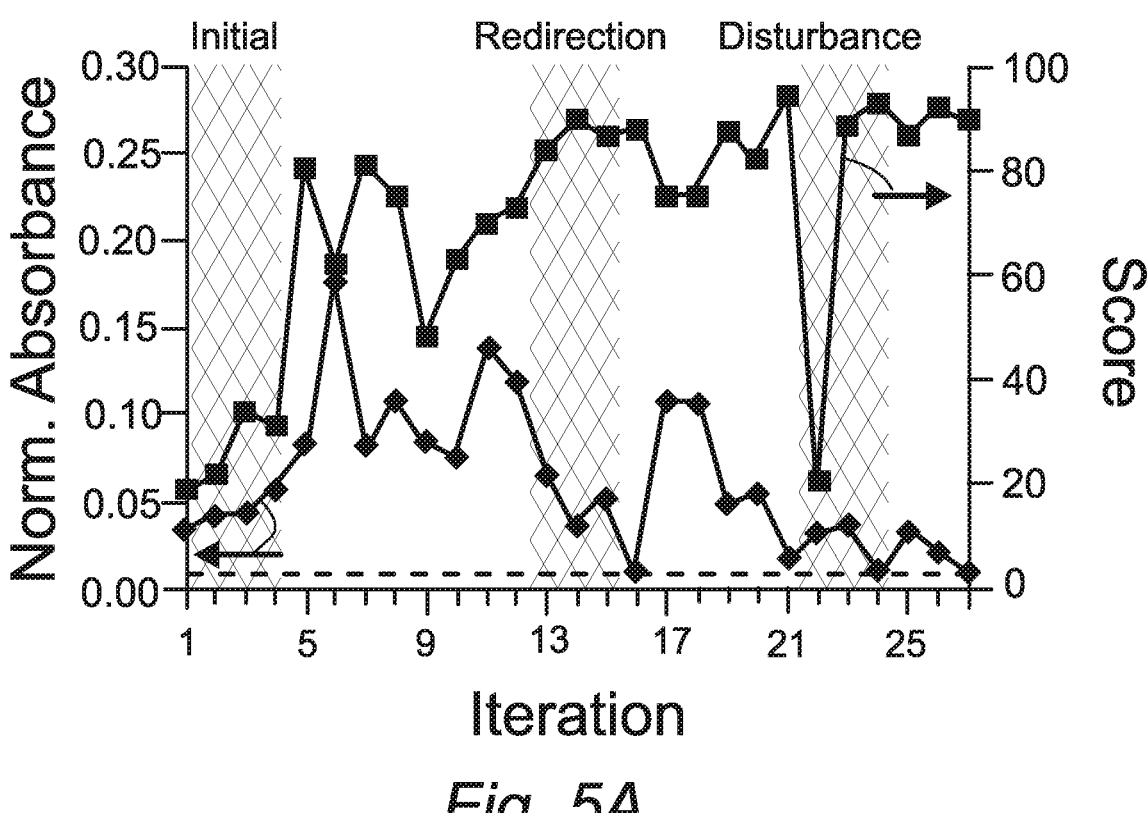
FIGS. 5A and 5B. Optimization results over 27 iterations. (A) normalized absorbance (log 10I0/I) and score vs iteration, with the horizontal dashed line marking the detection limit. (B) SD from the max(SDret, SDper) and score vs iteration, with the horizontal dashed line marking the perfect separation. Three grey boxes depict the execution of initial iterations, redirection and disturbance, respectively.
Figure 5B:
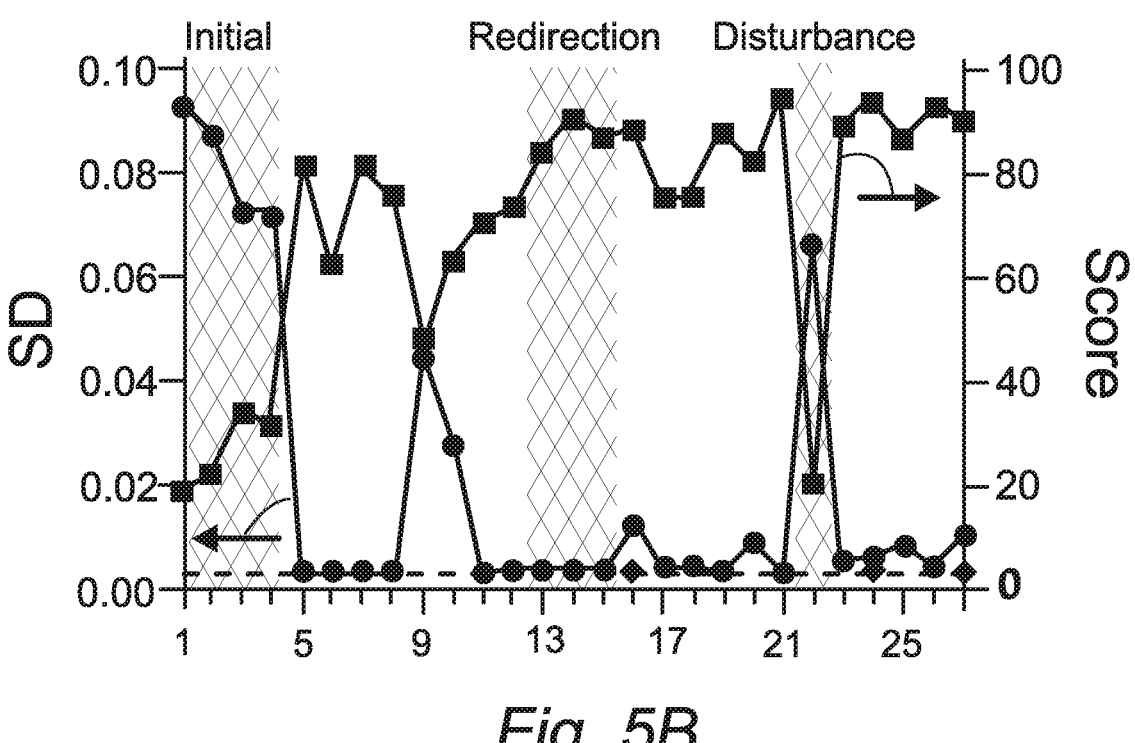
Figure 6:
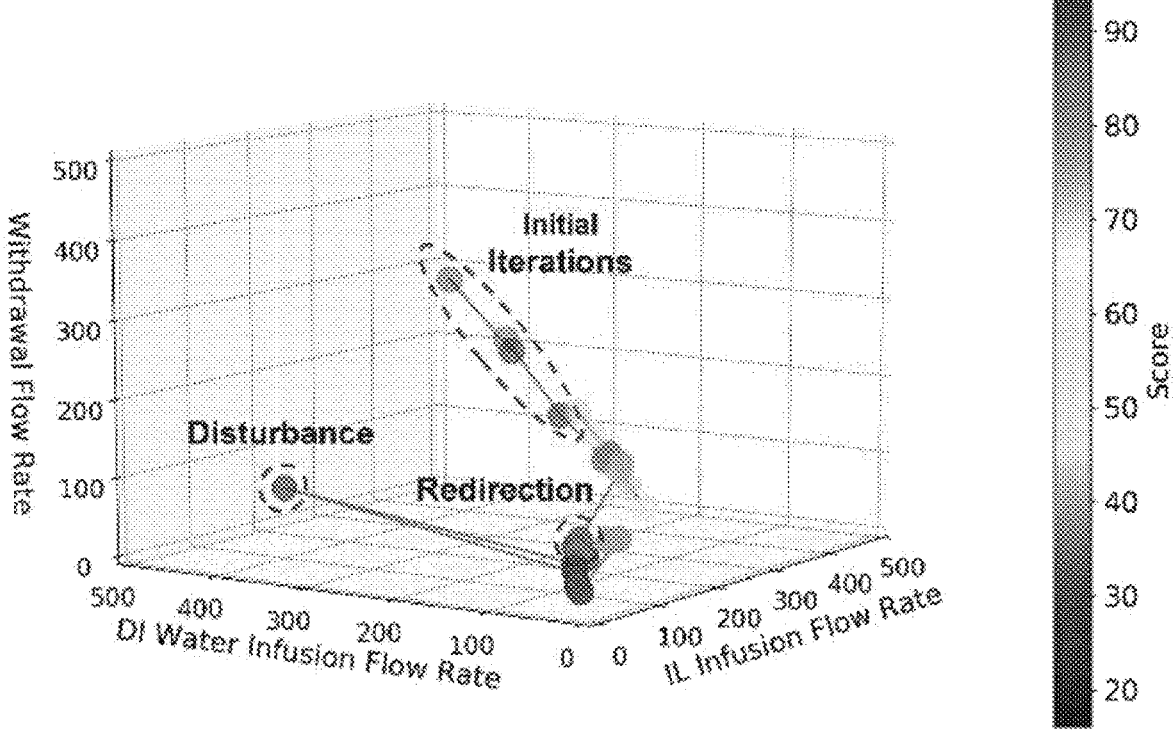
FIG. 6. 3D representation of the optimization search path. The dashed circles point out the points of initial iterations, redirection and disturbance.

In addition to the predictive experimental screening over the entire flow rate space via DoE, a custom feedback-control, self-optimizing algorithm based on the Nelder-Mead simplex model was implemented to validate the DoE results.[44] The modified simplex receives real-time responses (i.e., transmittance intensity and SD from the IR detectors) and searches for the observed maximum of the objective function. Four initial flow rate combinations are required to initialize the optimization process for a three-variable (i.e., three flow rates) system, and the selection of the initial conditions (guided by the DoE experimental screening and preliminary tests) is based on points in the center region of the operating space and accommodates different flow rate scenarios: center point (260, 260, 260 $\mu$L/min in IL infusion, DI infusion, withdrawal, respectively); large IL flow rate (200, 160, 185 $\mu$L/min in IL infusion, DI infusion, withdrawal, respectively); large DI flow rate (300, 350, 320 $\mu$L/min in IL infusion, DI infusion, withdrawal, respectively); large withdrawal flow rate (240, 240, 250 $\mu$L/min in IL infusion, DI infusion, withdrawal, respectively). After four initial scores are evaluated, a score pool with a size of 4 is formed. The simplex calculates a new set of flow rates for the fifth run using actions consisting of reflection, extension, retraction, and shrinkage. The score pool is updated by comparing the initial scores with the new score, and a new action is taken again at the next iteration until the optimum of the objective function is found or human intervention is made. For this application, the optimum-searching process is to be terminated if the scores are not improved (difference >8) in five consecutive runs. FIG. 5A,B shows results of the optimization in terms of absorbance and standard deviation. In FIG. 5A, the values of normalized absorbance and the scores versus iterations/runs are plotted in the same space, with the dashed line representing the detection limit of the spectrophotometer. The change of standard deviation of the IR detector output voltage over 27 iterations is shown in FIG. 5B with the dashed line indicating perfect separation (SD=0.003). As shown, after the first 4 initial iterations the process converged to the score of ca. 80 within 12 iterations. The SD was able to drop down to 0.003 at iteration 12 (FIG. 5B), indicating that the separation between washed BMIM-NTf$_2$ and the aqueous waste was complete; however, at the end of iteration 12 the normalized absorbance was not seen to approach the perfect extraction line (FIG. 5A), indicating insufficient extraction of Fe(III) ions from the IL phase. This was due to our selection of coefficients for the extraction term (200) and the separation term (800) to prioritize the optimization of the separation process. As seen in the mapping of predictive scores in DoE, scores as high as 90 can be achieved, meaning that scores around 80 found by the simplex algorithm represent a local optimum, in line with the fact that the black-box Nelder-Mead simplex process is designed to seek the local optimum instead of the global one.[45] FIG. 6 plots the simplex search path and the score for each iteration. The score for each iteration is indicated by colors; the axes correspond to the inputs (BMIM-NTf$_2$ infusion flow rate, DI water infusion flow rate and retentate phase withdrawal flow rate). This figure shows the search was trapped in a local optimum around the flow rate combination of 160, 70, 130 μL/min. To move the search out of the local optimum, three flow rate combinations were executed intentionally as human intervention to redirect the path (iterations 13, 14, 15, also shown in FIG. 6), as three new points are required to generate a new reference plane for a new reflection of the previous best score point in the experimental space for a three-variable process. The redirection served to guide the optimization path to the low-flow-rate region around the corner of the experimental space for the potential global optimum based on the prediction of the DoE results. The scores after redirection reached a plateau with scores as high as 90 in 6 iterations. Perfect separation (SD<0.003) and good extraction with absorbance detected close to the detection limit of the spectrometer was observed in iteration 21. To test the ability of the simplex process to recover from a perturbation after locating the optimum, an intentional disturbance (flow rates: 100, 400, 80 L/min) was introduced at iteration 22. The disturbance point was selected to explore the experimental region far from the high score corner. A low score of −20 was achieved at the disturbance, attributed to: (1) the high retention or poor separation in terms of high SD detected and (2) punishment by the penalty term for the low IL/water ratio (0.25); this result was also aligned with the DoE prediction. The simplex algorithm was able to redirect to the high-score region within one iteration and maintain the scores at a high level delivering perfect separation and good extraction. The optimization process was terminated after five additional iterations without significantly improving the score and stopped at iteration 27. Complete absorbance and SD data for each iteration are available in the SI.

For verifying the extraction effectiveness, aliquots of the as-received BMIM-NTf$_2$, the pre-washed Fe(III)-loaded BMIM-NTf$_2$ and recycled IL product from iteration 21 were analyzed by inductively coupled plasma optical emission spectrometry (ICP-OES). The detected amount of iron in the as-received IL was <0.0119 mg/mL (the limit of detection). The Fe(III)-loaded precursor was analyzed as 0.812 mg/mL. The final product was again below the limit of detection, indicating complete Fe(III) ion removal.

Figure 7:
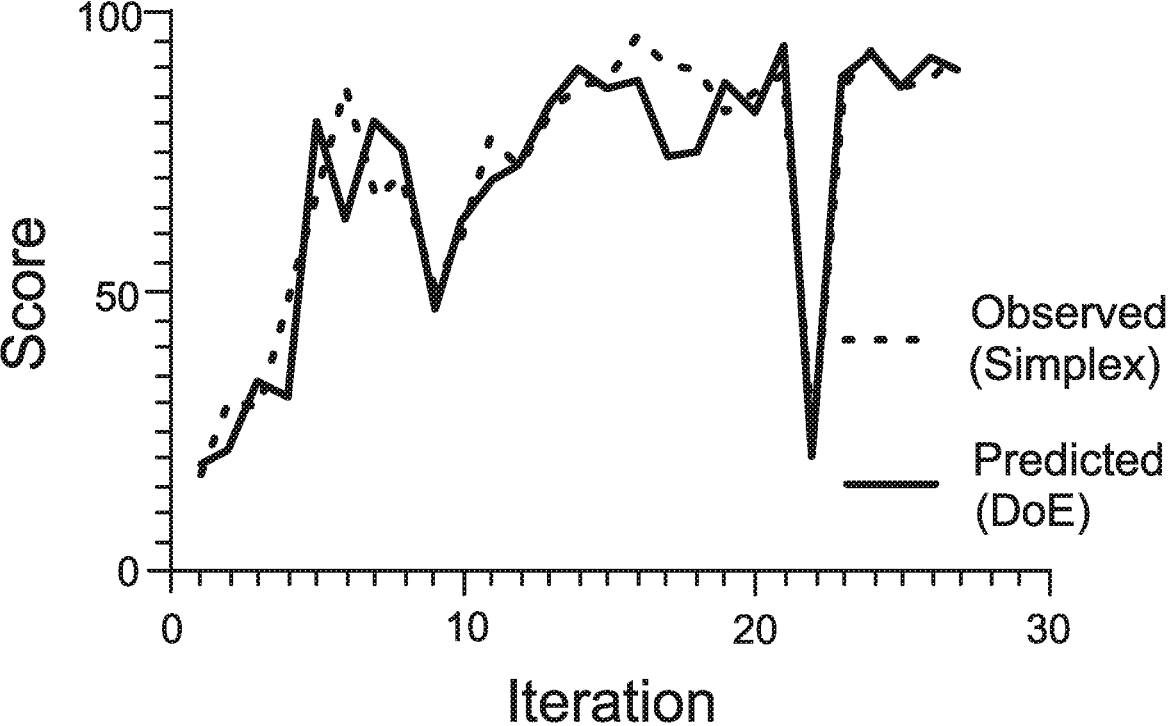
FIG. 7. Comparison between scores per iteration in simplex process and the corresponding predicted scores from DoE.

Scores for the entire simplex optimization process (purple line) are graphed along with the corresponding predicted scores from the DoE polynomial RSM function for each iteration (blue line) in FIG. 7. The agreement illustrates the accuracy of the prediction by the DoE model and confirms the optimum delivered by the real-time self-optimization process.

Figure 8A:
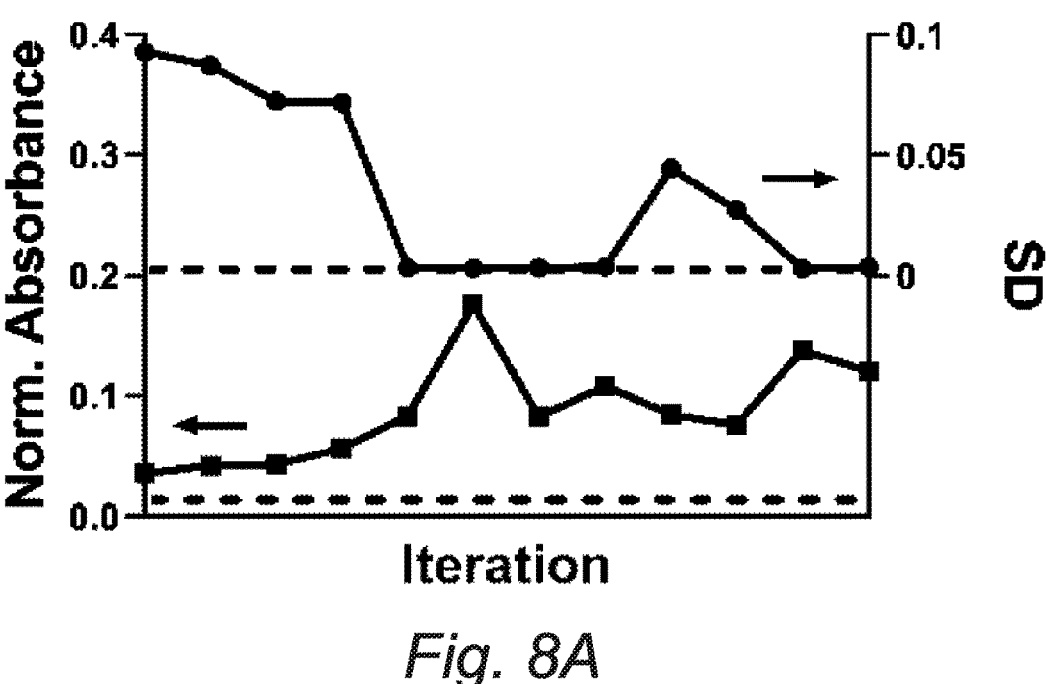
FIGS. 8A and 8B. Normalized absorbance and SD over iterations without human intervention. Blue dashed lines mark the perfect separation and green dashed lines mark the detection limit. (A) separation-prioritized process; (B) extraction-prioritized.
Figure 8B:
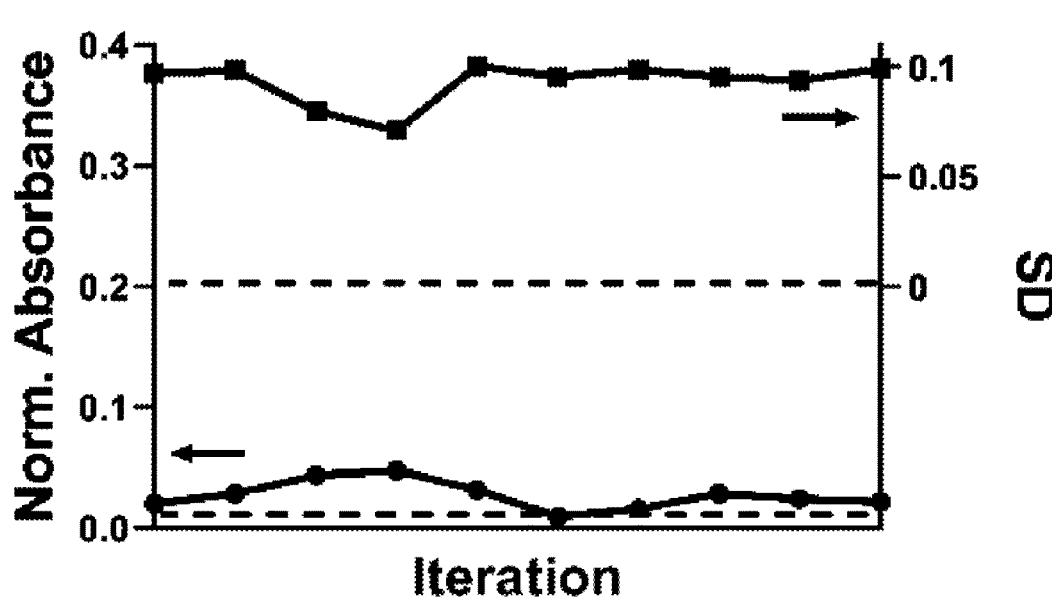

It should be noted that flow rate combinations leading to good separation do not always lead to maximal extraction; a tradeoff may occur requiring researchers to lean on either process. As described above, the objective function (eq 1) was designed to prioritize high-fidelity separation over complete extraction by setting the coefficient for the separation term to 800 and the coefficient for the extraction term to 200. To study the impact of coefficients on the optimization path and result, the coefficients for separation and extraction were swapped (800 for the extraction term and 200 for the separation term). In FIG. 8A, the SD and the normalized absorbance from iterations 1 to 12 and the corresponding scores (the local optimum found) are excerpted from FIG. 5A,B, to reflect the machine-only behavior of the separation-prioritized process before/without any human intervention (i.e., redirection and disturbance). Results from the modified, extraction-prioritized process are shown in FIG. 8B. In the separation-prioritized process, the algorithm optimized the score by minimizing the SD with no significant improvement on the normalized absorbance at the endpoint, while in the extraction-prioritized process, the normalized absorbance was maintained at low level, reflecting the low residual concentration of Fe(III) ions in the IL product and satisfactory extraction. It is clear that the two sets of coefficients led to two different optimization search paths, with the separation-prioritized process moving towards the low-DI-water-flow-rate region to alleviate the separation workload and the extraction-prioritized one settling in the high-water-flow-rate region for thorough extraction from the IL phase.

Figure 9A:
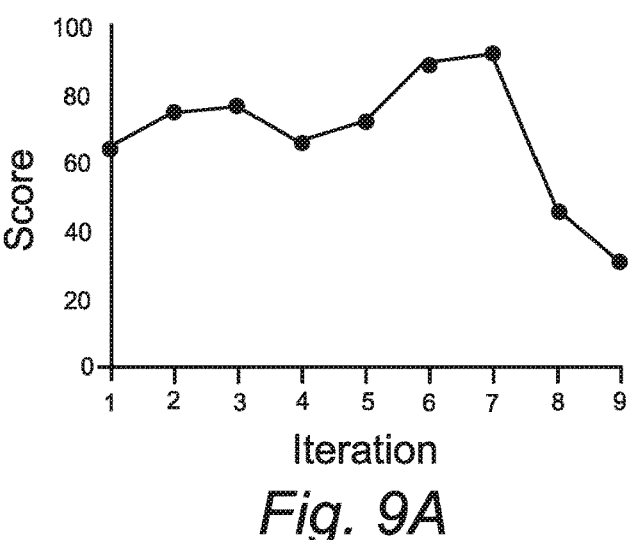
FIGS. 9A, 9B, and 9C. (A) Simplex optimization results for the first wash on Cyphos 104. The dashed lines in (B) and (C) depict the perfect separation and good extraction. Two grey boxes in (b) mark the occurrence of retention and breakthrough.
Figure 9B:
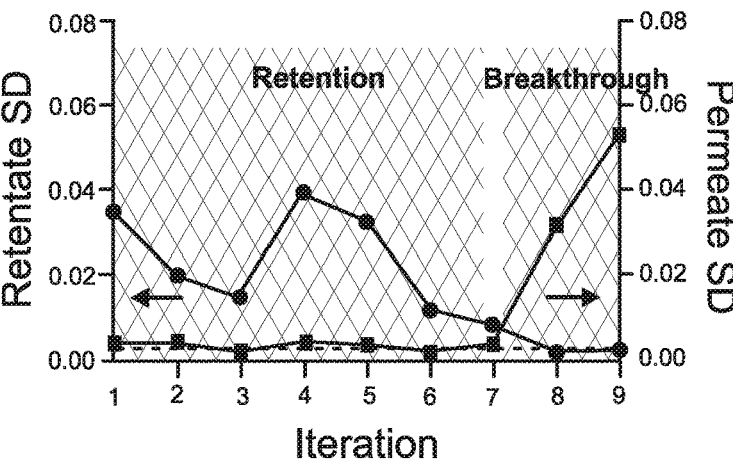
Figure 9C:
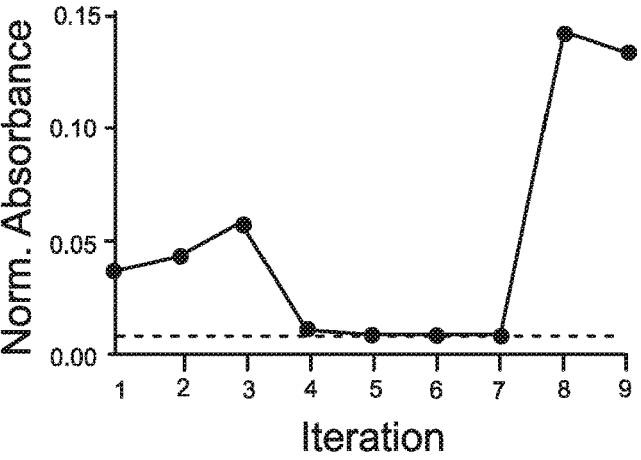

We applied the techniques developed for the Fe(III) extraction process to an industrially relevant IL purification application; that is, the extraction of Nd(III) from the IL Cyphos 104.13 Here, a 1 M nitric acid solution was used as the washing agent to extract Nd(III) ions from the IL phase. The interfacial tension between Cyphos 104 and nitric acid solution is lower than that between BMIM-NTf$_2$ and water (illustrated in the SI), making it more challenging to separate Cyphos 104 and the acidic solution with a membrane. The 0.45 m-pore hydrophilic nylon membrane was replaced with a 0.1 m-pore hydrophobic PTFE membrane. This modification made the IL phase the permeate phase and the aqueous phase the retentate phase, and the UV-vis detection block was moved to the lower separator outlet for the permeate phase to monitor the absorbance of Nd(III) ions at 580 nm.[13] Flow rate constraints for all three syringe pumps were also modified corresponding to the change of the two resulting phases and the more likely backflow to the aqueous phase inlet caused by high back pressure resulting from the high viscosity of the Cyphos IL (806 cP at 25° C.).46 Two washes are required to extract the Nd(III) ions, according to our preliminary batch tests and the procedure described by Rout and coworkers.13 In an apparatus similar to that shown in FIG. 1, the self-optimization simplex algorithm was used to locate the optimal flow rate combination in the first wash. The Cyphos 104 product from this optimized first wash is then fed as the IL precursor into a second wash, and the flow rate combination for the second wash simply follows the optimum from the first wash. The results are presented in FIG. 9. The best score is discovered at iteration 7, with minimal normalized absorbance from Nd(III) and low SD detected for both outlet channels. The SD for the permeate phase was around the 0.003 single phase mark, while the SD for the retentate phase was 0.007, slightly above the threshold, indicating that mild retention still occurred in optimal conditions. The IL loss to the aqueous waste was acceptable in this case considering the high affinity between Cyphos 104 and the acidified washing agent. The score dropped down dramatically after iteration 7 due to an increase of SD for the permeate phase representing severe breakthrough. The process was terminated purposedly at iteration 9 since the optimum at iteration 7 met the need of the purification process. The flow rate combination at the optimum (39, 190, 191 μL/min in IL inlet, HNO3 inlet, withdrawal, respectively) was employed in the second wash directly.

Aliquots of the as-received Cyphos 104, the pre-washed Nd(III)-loaded IL, 1st washed IL product under the flow rate combination of iteration 7 and 2nd washed IL product under the same condition were analyzed by ICP-OES. The concentration of Nd in the as-provided IL was <0.0694 mM (the limit of detection). The analyzed concentration in the feed was 38.5 mM; after the first wash was 8.89 mM; and after the second wash was 1.21 mM. The concentration of Nd was reduced 30-fold after the second wash.

1.3 Conclusion

The work presented here demonstrates the application of statistical and inline optimization approaches to optimize a continuous-flow liquid-liquid extraction process for ILs. This represents an important innovation for continuous-flow optimization in that it expands tools that have been used for synthesis to separation and recycling of a set of prototypical sustainable solvents. By combining a statistical DoE approach with active optimization informed by inline analytics, we were able to locate a global optimum for the separation parameters. This approach was shown to be applicable to multiple IL systems with varying viscosity and water solubility. Using a tunable objective function for the inline optimization, we were able to bias the process towards either mass transfer of the metal ions or physical separation of the biphasic mixture. This approach opens the possibility to recycle the sustainable yet relatively expensive IL solvent from metal ion-involved processes. As with other millifluidic processes, parallelization can also be potentially implemented to scale up the recycling and increase the throughput geometrically.[47]

1.4 Experimental Procedures

Materials. 1-Butyl-3-methylimidazolium bis(trifluoromethylsulfonyl)imide 99% (BMIM-NTf$_2$) was purchased from IoLiTec and used as received. Fe(NP3)3·9H2O 98% was purchased from Sigma-Aldrich and used as received. Trihexyl(tetradecyl)phosphonium bis(2,4,4-trimethylpentyl) phosphinate ≥95% (Cyphos 104) was purchased from STREM chemicals and used as received. NdCl3·6H2O 99.9%, trace metal basis was purchased from Sigma-Aldrich and used as received.

BMIM-NTf$_2$-Fe(III) preparation. In a typical procedure, Fe(NO3)3·9H2O was added to BMIM-NTf$_2$ in a 15 ml centrifuge tube. The mixture was then placed in a 95° C. water bath for 2 min and vortex mixed to allow complete dissolution of the iron salt. Upon cooling, this solution was diluted in BMIM-NTf$_2$ to 0.8 mg/mL Fe(III) for later use.

Cyphos 104-Nd(III) preparation. In atypical procedure, a 5 M solution of NdCl3·6H2O in DI H2O was prepared by dissolving the salt through brief vortex mixing. Once fully dissolved, an equal volume of Cyphos 104 was added. The solution was then heated to 60° C. while rapidly stirring and held at this temperature for 30 min. Upon cooling, the solution was transferred to a 50 mL centrifuge tube and the two layers (H2O layer and Cyphos 104 layer) were separated via centrifugation (6,000 rpm, 5 min).

Fabrication of 3D-printed microfluidic parts. 3D-printed devices were designed in Autodesk Inventor Professional 2022. Parts were printed on a stereolithographic (SLA) 3D printer (Asiga, model MAX X UV385) with a clear, light-curing, methacrylate-based resin (GR-10, Pro3dure Medical). Parts taken from the printer were immediately submerged and washed in three consecutive isopropanol (Supelco) baths for 10 min to remove residual resin. The parts were then thoroughly air dried prior to use. The upper and lower half of the separator were printed separately with microchannels, and either a hydrophilic nylon membrane (0.45 m, Tisch Scientific) or a hydrophobic PTFE membrane (0.1 μm, Sterlitech) was placed between to provide the separation area (2.3×1.2 cm2). Quick-cure epoxy (Bob Smith Industries) was applied to tightly combine the two halves and prevent leakage. The 1×1×2.4 cm3 block with slots across the inner channel (rectangular cross-section: 800×800 μm2) to accommodate the IR emitter and detector was printed as described above. The UV-vis detection block was printed as described above, with inner channel (rectangular cross-section: 800×800 μm) and side holes (circular cross-section: 3.5 mm in diameter) for light source and spectrophotometer cables. All inline components have ¼-28 UNF thread holes (7 mm in depth) for connecting tubing. The UV-vis detection block has ¼-36 UNF thread holes for connecting fiber optics. Annotated schematics are available in the SI for all parts.

In-flow IL recycling process. The two feed streams of IL and aqueous wash were introduced into the process by syringe pumps (Legato OED syringe pump, KD Scientific). Biphasic slug flow was formed in a T-shaped junction (PEEK, IDEX Health & Science), and passed through 50 cm of fluorinated ethylene propylene (FEP) tubing (I.D. 1/32 in, Cole-Parmer). The slug flow then entered the above-mentioned 3D-printed printed separator. The presence of slugs was monitored by infrared emitters and detectors (940 nm, SparkFun Electronics) communicating with the working computer via an Arduino board (Arduino Mega 2560). The IL-rich stream flowed through a UV-vis detection component integrated with a spectrophotometer (Flame-S-UV-VIS-ES, Ocean Insight) and an LED light source (Thorlabs) for metal ion detection. The pumps, IR components and spectrophotometer were controlled using Python scripts with Numpy, Serial, Pyfirmata and Seabreeze packages (codes available in the SI). Every run was followed by a cleanup with water by 1.5× the volume of the entire channel to flush the tubing and components.

ICP-OES analysis. Samples for the ICP-OES analysis were collected directly from the IL outlet of the process, and were placed in a vacuum chamber for 30 min to remove any potential water residue and air. Samples were then sent to an external laboratory for the ICP-OES test (Galbraith Laboratories). The sample amount used in the iron detection was 500 μL and that in the neodymium detection was 250 μL. The method used was GLI Procedure ME-70.

2. A Techno-Economic Approach to Guide the Selection of Flow Recyclable Ionic Liquids for Nanoparticle Synthesis 2.1 Introduction This section provides a combined experimental-economic approach utilizing a model colloidal Pt nanoparticle synthesis with a matrix of six IL solvents, where the ILs are purified, separated, and recovered using an automatic, continuous flow process. Micro- and millifluidic continuous flow processes offer various mixing-enhanced configurations for aqueous IL extraction via mass transfer (e.g., zigzag channels[50,51] and staggered herringbone ridges[52-54]). The extraction process is serially coupled with membrane-based IL-water separation, which harnesses the differential wettability of polymeric membranes to process various liquid-liquid mixtures.[55,56] This comprehensive experimentally driven cost analysis gives vital information about how various factors affect the overall synthesis cost to best guide the choice of task-specific IL. The cost influence of synthetic outcomes that arise when varying the IL solvent (e.g., isolated Pt nanoparticle yield, solvent cost, and solvent recyclability based on water miscibility) is evaluated and unlocks the identification of a process-cost assessment, which is imperative for adapting this sustainable class of solvent alternatives at scale.

2.2 Results and Discussion

2.2.1 Pt Nanoparticle Synthesis

The colloidal Pt nanoparticle synthesis, modified from previously reported methods,[48,49] is based on the polyol reduction of $K_2PtCl4$ with ethylene glycol in an IL solvent with a supporting polyvinylpyrrolidone (PVP) surfactant. Briefly, a solution of $K_2PtCl_4$ dissolved in ethylene glycol was quickly injected into a hot solution of PVP dissolved in IL at 150° C. The resulting single-phase solution was allowed to react for 30 min before being removed from the heat source and thermally quenched in an ice bath. The reaction conditions were not specifically optimized for any of the ILs but rather held constant so a direct comparison could be made between the different IL solvents. The following IL solvents resulted in phase-pure Pt nanoparticles: 1-butyl-3-methylimidizolium bis(trifluoromethylsulfonyl)imide (BMIM-NTf₂), 1-butyl-3-methylimidizolium trifluoromethanesulfonate (BMIM-OTf), 1-butyl-1-methylpyrrolidinium bis(trifluoromethylsulfonyl)imide (BMPYRR-NTf₂), 1-butyl-1-methylpyrrolidinium trifluoromethanesulfonate (BMPYRR-OTf), 1-butyl-2-methylpyridinium bis(trifluoromethylsulfonyl)imide (BMPY-NTf₂), and 1-butyl-2-methylpyridinium trifluoromethanesulfonate (BMPY-OTf). Ten other IL solvents were evaluated for this reaction but did not yield isolable, phase pure Pt nanoparticles. These ILs consisted of various other combinations of phosphonium, imidazolium, pyrrolidinium, and pyridinium cations with decanoate, dicyanamide, bis(trifluoromethanesulfonate)imide, hexafluorophosphate, tetrafluoroborate, bromide, and phosphinate anions.

The separation of the Pt nanoparticles from the IL solvent is dependent on the room temperature miscibility of the IL with the ethylene glycol reducing agent. For this matrix of six ILs, the room temperature miscibility is governed by the anion, regardless of the cation. The three ILs with the NTf₂⁻ anion are immiscible with ethylene glycol, while the three ILs with the OTf⁻ anion are miscible with ethylene glycol. Differences in IL miscibility with polar solvents (e.g., ethylene glycol and water) are predominantly influenced by the anion of a given L.[57] It was recently demonstrated that the size of the IL anion plays a role in miscibility. For example, water interactions are stronger with smaller ions (OTf) compared to larger ions (NTf₂⁻).[58] For the Pt nanoparticle syntheses in BMIM-NTf₂, BMPYRR-NTf₂, and BMPY-NTf₂ solvents, the IL phase cleanly separates from the ethylene glycol layer that contains the dispersion of Pt nanoparticles. For Pt nanoparticle syntheses in BMIM-OTf, BMPYRR-OTf, and BMPY-OTf solvents, there is no phase separation between the IL and ethylene glycol, requiring the Pt nanoparticles to be isolated from these ILs through precipitation with an antisolvent (i.e., acetone). The nanoparticles were then separated from the solvent mixture by centrifugation followed by recovery of the ILs by removing the VOCs in vacuo. In all cases, the Pt nanoparticles were worked up identically after appropriate separation from the ILs.

2.2.2 Ionic Liquid Purification and Recovery

Once isolated, the IL solvents may contain reaction byproducts, such as unreacted Pt salts and ethylene glycol, excess PVP, and/or oxidation products of ethylene glycol. To purify the recovered IL solvents, they were passed through an automated continuous flow recycler that first contacts the IL with an acidified aqueous phase for extraction, followed by separation of the IL phase from the aqueous phase using a membrane separator (FIG. 10). It has been demonstrated that $Pt^{2+}$ can be stripped from ILs under acidic conditions.[59-61] For this reason, we used 0.1 M $HNO_3$ to wash the used ILs in the continuous flow recycler, integrating extraction (via mixing) and separation, adapted from a previous study.[62] All six ILs were serially washed 3× in flow with identical flow rates to complete a purification cycle, corresponding to a typical 3× wash in a by-hand batch workup.

To recycle the three water-immiscible IL solvents with NTf₂⁻ anions, a two-phase slug flow configuration was formed from the used IL and acidified water in a T-shaped junction (FIG. 10A). The liquid-liquid slug flow passed through a length of the herringbone-patterned channel to promote mass transport and a length of a wavy channel where extraction of multiple reaction byproducts occurs. In microchannels, passive interfacial diffusion of the extractants at low Reynolds numbers (i.e., laminar flows) is slow. The staggered herringbone pattern on the channel introduces chaotic mixing with the existence of different boundary conditions between the ridges (non-slip) and the grooves (some-slip).[12] Channels with wavy walls introduce a velocity profile in the y-direction (perpendicular to the flow direction), which is absent from the flow in straight channels where only the velocity in the x-direction (the flow direction) exists. The convective mixing can also be enhanced by the "widening" and "narrowing" effects of the wavy pattern on the liquid-liquid biphasic flow.[63] After extraction, the slug flow entered the separation section where a hydrophobic PTFE membrane selectively allowed the IL phase to permeate and be collected. The acidified aqueous stream carrying the impurities was retained in the upper channel. Offline, batch vacuum drying was used to remove residual water in the recovered IL recycled, since even upon perfect separation and low miscibility, trace amounts of water can still be dissolved in the IL.[64,65] Using this continuous flow purification technique, up to 94 vol % of the starting IL solvent used in the prior Pt nanoparticle reaction is recovered. The dissolved water content prior to vacuum drying is <2 wt % through each recycle, as determined thermogravimetrically before and after drying.

Figures 11A, 11B, 11C, 11D, 11E, 11F:
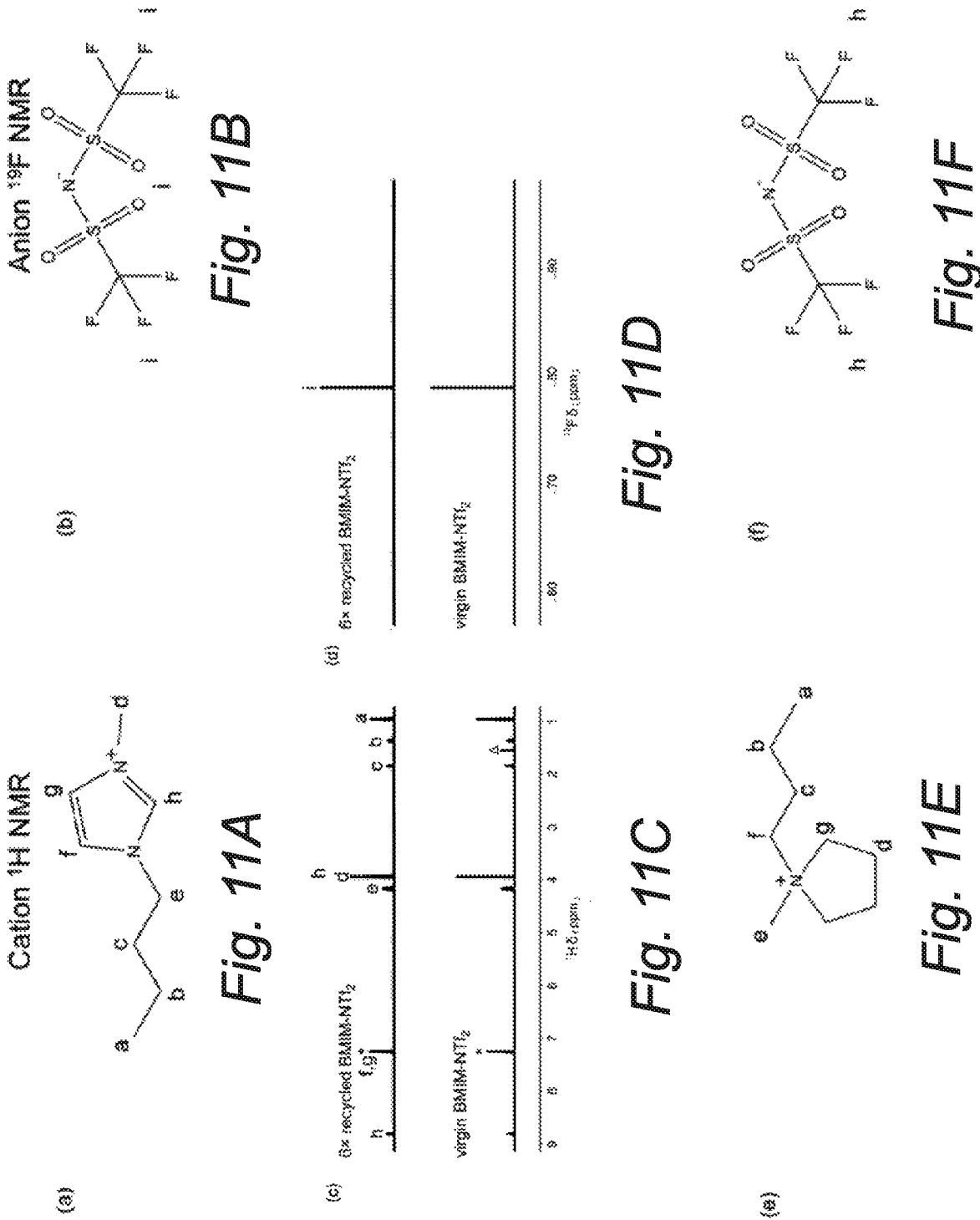
FIGS. 11A, 11B 11C 11D, 11E, 11F, 11G, 11H, 11I, 11J, 11K, and 11L. Structures of the (A) $BMIM^+$ cation and the (B) $NTf_2^-$ anion with labeled (C) solution $^1H$ NMR and (D) $^{19}F$ NMR spectra of virgin and 6× recycled $BMIM-NTf_2$. Structures of the (E) $BMPYRR^+$ cation and the (F) $NTf_2^-$ anion with labeled (G) solution $^1H$ NMR and (H) $^{19}F$ NMR spectra of virgin and 6× recycled $BMPYRR-NTf_2$. Structures of (i) $BMPY^+$ cation and the (J) $NTf_2^-$ anion with labeled (K) solution $^1H$ NMR and (L) $^{19}F$ NMR spectra of virgin and 6× recycled $BMPY-NTf_2$. The open triangle (A) denotes water at 1.56 ppm, as these spectra were taken before the vacuum drying step. The water content in all cases is no more than that in the as-received virgin ILs (before drying). Asterisks (*) represent the residual nondeuterated solvent peak of chloroform.
Figures 11G, 11H, 11I, 11J, 11K, 11L:
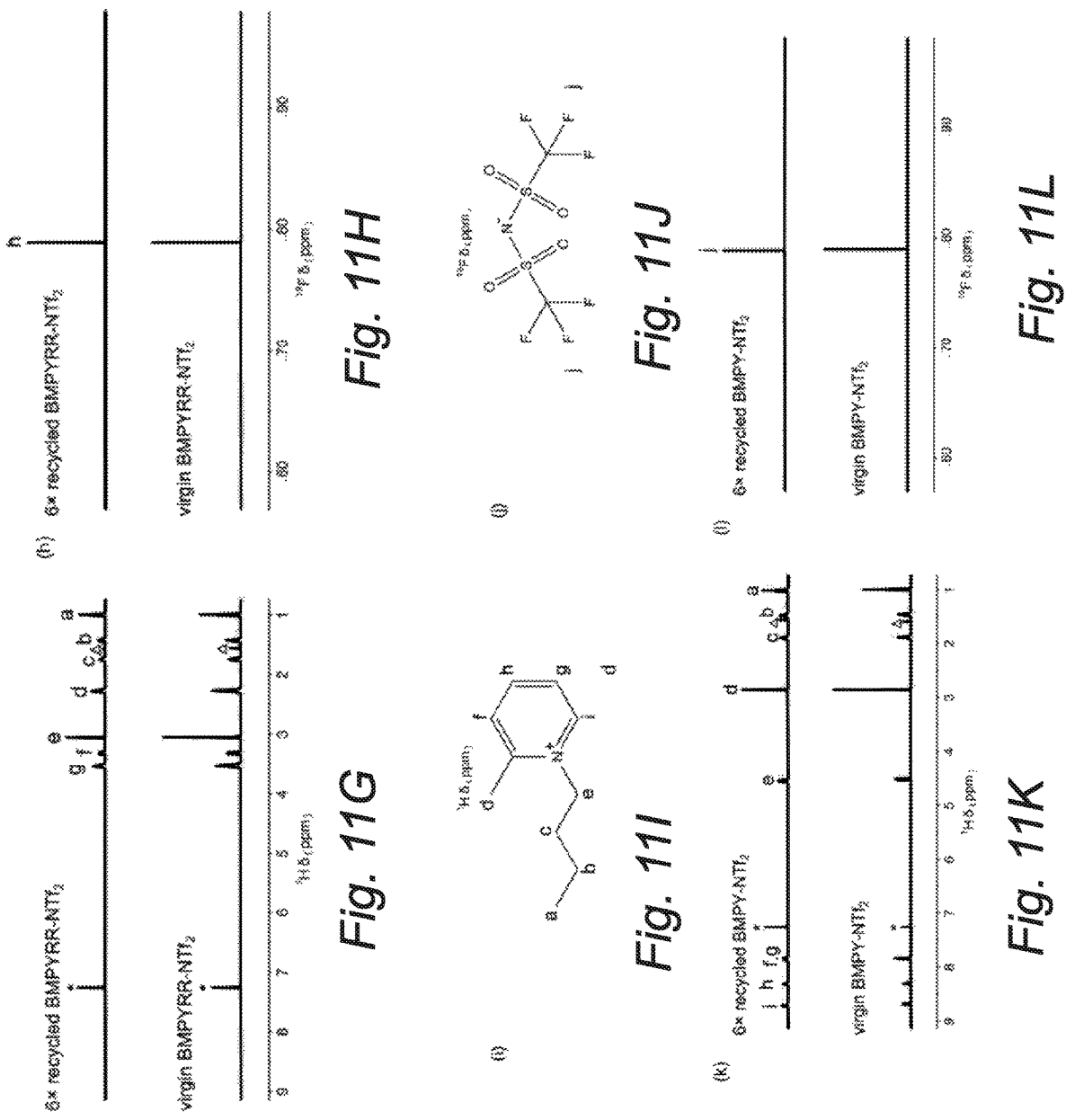

Using this approach, we recycled and reused the same BMIM-NTf₂, BMPYRR-NTf₂, and BMPY-NTf₂ solvents for up to six Pt nanoparticle syntheses. The solution ¹H and ¹⁹F NMR spectra comparing the unused, virgin ILs to the 6× recycled ILs (recovered from the last Pt nanoparticle reaction using 5× recycled IL) demonstrate that no chemical changes or degradation arise from continuous recycling and subsequent reuse of the TLs as reaction solvents (FIG. 11). The resonances spanning from δ 0.95-8.81 ppm for the BMIM+ cation, δ 0.99-3.53 ppm for the BMPYRR⁺ cation, and δ 1.01-8.69 ppm for the BMPY+ cation do not change upon recycling the IL six consecutive times. The presence of a single resonance in the ¹⁹F NMR spectra confirms the NTf₂⁻ and OTf⁻ anions also remain unchanged throughout the recycling process. Additionally, there are no reaction byproduct impurities observed by NMR spectroscopy after purification and recovery. Table 1 summarizes the isolated yields of Pt nanoparticles, average nanoparticle sizes, and standard deviation about the mean diameter for the Pt nanoparticles synthesized in BMIM-NTf₂, BMPYRR-NTf₂, and BMPY-NTf₂ solvents.

TABLE 1

Summary of the isolated yield, average nanoparticle
size,a and dispersity of the Pt nanoparticles synthesized
in IL solvents with $NTf_2^-$ anions

| Ionic liquid | Isolated yield (%) | Size (nm) | σ/d (%) |
|---|---|---|---|
| Virgin $BMIM-NTf_2$ | 36 | 3.3 | 18 |
| 1 × recycled $BMIM-NTf_2$ | 44 | 3.4 | 14 |
| 5 × recycled $BMIM-NTf_2$ | 38 | 3.9 | 16 |
| Virgin $BMPYRR-NTf_2$ | 98 | 3.9 | 13 |
| 1 × recycled $BMPYRR-NTf_2$ | 96 | 4.0 | 14 |
| 5 × recycled $BMPYRR-NTf_2$ | 98 | 3.7 | 13 |
| Virgin $BMPY-NTf_2$ | 24 | 1.9 | 15 |
| 1 × recycled $BMPY-NTf_2$ | 30 | 2.2 | 16 |
| 5 × recycled $BMPY-NTf_2$ | 31 | 2.3 | 18 |

$^a$Average size was determined by measuring nanoparticle diameters from TEM images using ImageJ, a pixel-counting software (N = 300).

Figures 12A, 12B, 12C:
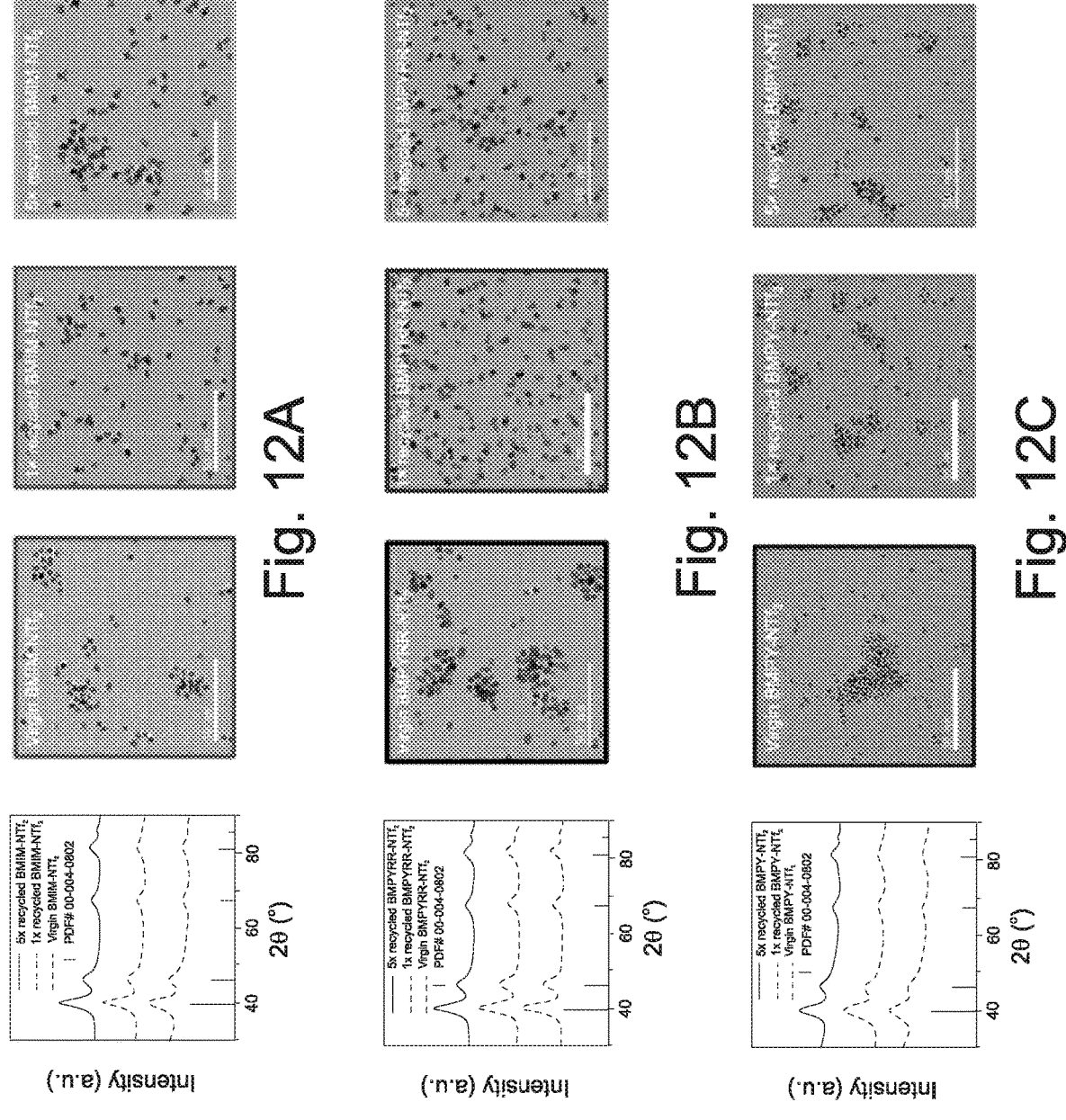
FIGS. 12A, 12B, and 12C. Powder XRD patterns and TEM images of Pt nanoparticles synthesizing in virgin, 1× and 5× recycled (a) $BMIM-NTf_2$, (b) $BMPYRR-NTf_2$, and (c) $BMPY-NTf_2$.
Figure 13A:
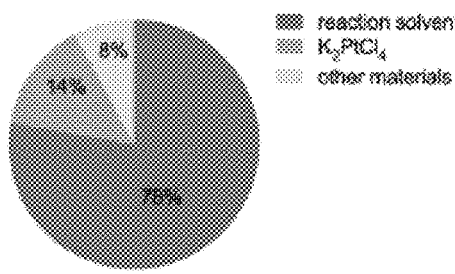
FIGS. 13A, 13B, 13C, 13D, 13E, and 13F. Contribution of major cost drivers resulting from Pt nanoparticle syntheses using virgin and recycled (A and B) $BMIM-NTf_2$, (C and D) $BMPYRR-NTf_2$, and (E and F) $BMPY-NTf_2$, respectively.
Figure 13B:
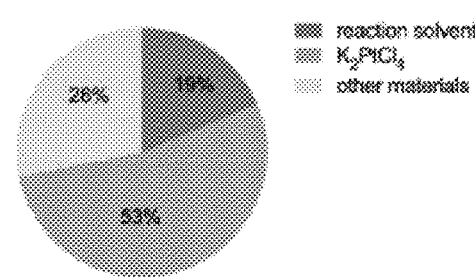
Figure 13C:
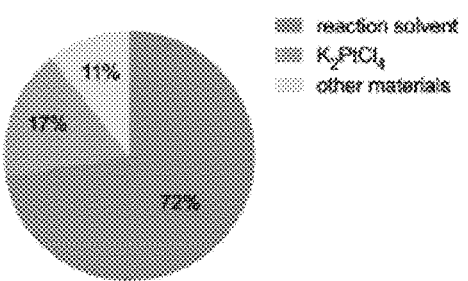
Figure 13D:
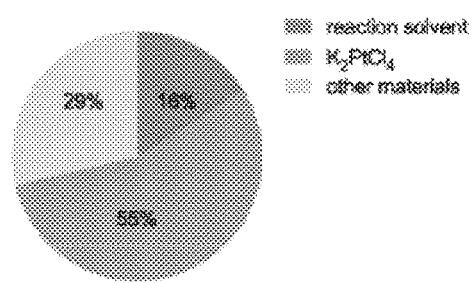
Figure 13E:
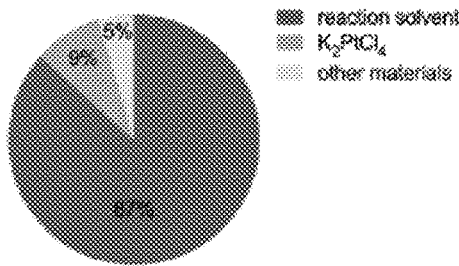
Figure 13F:
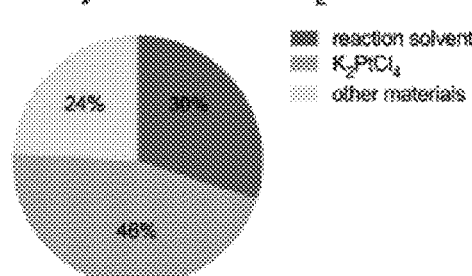

A total of six Pt nanoparticle syntheses were performed with each IL, one with the virgin IL and then five subsequent reactions with recycled IL. Using the recycled IL solvents with $NTf_2^-$ anions does not affect the Pt nanoparticle crystallinity, size, or quality, as demonstrated by the powder X-ray diffraction (XRD) patterns and the transmission electron microscopy (TEM) images (FIG. 12). The XRD patterns and TEM images for the Pt nanoparticles synthesized in virgin, 1× recycled, and 5× recycled $BMIM-NTf_2$, $BMPYRR-NTf_2$, and $BMPY-NTf_2$ are given in FIG. 12A-C, respectively. The XRD patterns confirm the synthesis of phase pure, face-centered cubic Pt nanoparticles throughout all experiments with recycled ILs. The average calculated lattice parameter of each product is a=3.89 Å, which is in agreement with bulk Pt metal (PDF #00-004-0802). Scherrer analysis indicates a grain size of 3.8-4.1 nm for Pt nanoparticles synthesized in virgin, 1× recycled, and 5× recycled $BMIM-NTf_2$, 4.0-4.5 nm for Pt nanoparticles synthesized in virgin, 1× recycled, and 5× recycled $BMPYRR-NTf_2$, and 1.8-2.1 nm for Pt nanoparticles synthesized in virgin, 1× recycled, and 5× recycled $BMPY-NTf_2$. The average sizes and size dispersities are reported in Table 1, which were determined by analyzing TEM images using at least 300 nanoparticles. The TEM images of Pt nanoparticles synthesized in each virgin, 1× recycled, and 5× recycled IL show no significant size or morphology changes, as the average sizes for all the nanoparticle ensembles are well within a standard deviation of each other for each respective IL. Moreover, the sizes calculated by TEM analysis are in agreement with the grain sizes calculated by Scherrer analysis, suggesting single crystalline nanoparticles. The main difference between these three IL solvents is the isolated Pt nanoparticle yield. $BMIM-NTf_2$ results in an isolated Pt nanoparticle yield of 36%, $BMPYRR-NTf_2$ results in an isolated yield of 98%, and $BMPY-NTf_2$ results in an isolated yield of 24%. The isolated yield remains consistent after using 1× and 5× recycled TLs with the $NTf_2^-$ anion, as reported in Table 1. This consistency can be attributed to the successful purification of these ILs in the continuous flow membrane separator, with no obvious carryover of Pt-containing species (vide infra). The successful purification of the TL solvents with the $NTf_2^-$ anion in the continuous flow membrane separator is a direct result of their immiscibility with water.

In contrast, the IL solvents with OTf– anions are miscible with water, making it impossible to accomplish the purification and recovery of these ILs using the legacy by-hand batch methods that rely on phase separation.[48] Distillation is a well-established approach to separate miscible liquid-liquid mixtures via different boiling points; however, it is not applicable to this process because unwanted, non-volatile byproducts will all remain in the IL phase. One feasible pathway to separate the miscible liquid-liquid mixture is the use of IL membrane separators.[66-68] In an IL membrane separator, a polymeric membrane is pre-wetted by a hydrophobic IL that preferably allows organic molecules to enter, while water and water-soluble impurities are partially excluded from permeation.

We employed the same extraction and separation configuration used to recycle the three IL solvents with $NTf_2^-$ anions for recycling the water-miscible IL solvents with $OTf^-$ anions, with the addition of a pre-treatment step to wet the membrane in the continuous flow recycler with a hydrophobic $NTf_2$ IL. In each case, the IL with $NTf_2^-$ anions used to pre-wet the membrane had the same cation as the IL with $OTf^-$ anions to be purified to minimize any effects of mixed cations on the subsequent Pt nanoparticle syntheses. The IL infusion flow rate was kept the same as that in the $NTf_2^-$ IL cases, while the acidified water infusion flow rate was reduced here for the $OTf^-$ IL cases, for the purpose of alleviating the workload of downstream separation and maximizing the IL recovery rates. In the flow process, while no slug flow with two distinct phases was formed after the T-junction, the two as-described mixing configurations still served to provide a thorough mixing of the water and IL (FIG. 10B). The resulting single-phase mixture was then separated by the IL-pre-wetted membrane. This resulted in an anion impurity that was difficult to separate. Consequently, the fraction of the $NTf_2^-$ IL that was carried over to the recovered $OTf^-$ IL resulted in the presence of two resonances in the solution $^{19}F$ NMR spectra of the ILs after purification and separation. Through integration of the two peaks in $^{19}F$ NMR,[69,70] the resulting IL contains ca. 2% of the $NTf_2^-$ anion. Separation of the IL solvents with $OTf^-$ anions and water was less efficient in this case, with subsequent vacuum drying being required to remove ca. 30 wt % water that remained with the permeate stream (cf. <2 wt % for the IL solvents with $NTf_2^-$ anions). Using this IL-membrane purification technique, up to 70 vol % of the starting IL solvent used in the prior Pt nanoparticle reaction is recovered.

The difficulty in separating the IL solvents with the $OTf^-$ anions from water also resulted in poorer purification of these ILs after each recovery and recycle. These spectra demonstrate that the ILs remain chemically stable throughout the continuous recycling and subsequent reuse, as all the resonances corresponding to the organic IL cations remain intact. However, the appearance of a resonance at δ 3.70 ppm in the $^1H$ NMR spectra of the recycled ILs corresponds to unreacted ethylene glycol, illustrating that the washing step does perfectly purify the IL. $^1H$ NMR spectra were taken before and after washing the miscible ILs in the continuous flow recycler, which show that ca. 50-80% of the starting ethylene glycol is removed after purification for all three $OTf^-$ ILs. This demonstrates that while the continuous flow purification is not quantitative, it does have some success in removing polar reaction impurities. The XRD patterns confirm the synthesis of phase pure, face-centered cubic Pt nanoparticles from each of the experiments with virgin ILs. However, a significant decrease in nanoparticle crystallinity is observed as recycled IL is used through multiple syntheses. Again, as a result of the less efficient purification, the Pt nanoparticle sizes and polydispersity increase upon multiple reuses of the ILs with the OTf⁻ anion.

BMIM-OTf results in an isolated Pt nanoparticle yield of 14%, BMPYRR-OTf results in an isolated yield of 94%, and BMPY-OTf results in an isolated yield of 10%. Interestingly, porous carbon at 0.5 wt % (0.5 wt % NP-Pt/C), as an approximation for a commercial application of the Pt nanoparticles. All the cost estimates for this analysis are reported in USD with 2016 as the pricing basis year. Table 2 summarizes the results for all the TLs used in this study. The TL, recovery yield was determined experimentally as the average recovery yield of all five recycles for a given IL.

TABLE 2

Estimated costs for 0.5 wt % Pt/C nanoparticles prepared with various reaction solvents including virgin ILs and 5 × recycled ILs[a]

| | Inputs | | Costs (2016 $ per kg NP-Pt/C) | | | | | |
|---|---|---|---|---|---|---|---|---|
| Reaction solvent | Reaction yield | IL recovery | Reaction solvent | $K_2PtCl_4$ | Other materials | Processing | Margin | Total |
| Virgin BMIM-NTf$_2$ | 36 | | 1912 | 356 | 192 | 10 600 | 101 | 13 161 |
| Recycled BMIM-NTf$_2$ | 38 | 91% | 118 | 337 | 179 | 10 583 | 104 | 11 321 |
| Virgin BMPYRR-NTf$_2$ | 98 | | 559 | 131 | 83 | 3863 | 37 | 4673 |
| Recycled BMPYRR-NTf$_2$ | 98 | 94% | 38 | 131 | 68 | 4094 | 40 | 4371 |
| Virgin BMPY-NTf$_2$ | 24 | | 5271 | 533 | 278 | 16 268 | 152 | 22 502 |
| Recycled BMPY-NTf$_2$ | 31 | 90% | 269 | 413 | 216 | 12 995 | 127 | 14 020 |
| Virgin BMIM-OTf | 14 | | 5630 | 915 | 462 | 27 386 | 260 | 34 653 |
| Recycled BMIM-OTf | 70 | 65% | 366 | 183 | 96 | 5784 | 56 | 6485 |
| Virgin BMPYRR-OTf | 94 | | 1070 | 136 | 85 | 4102 | 38 | 5431 |
| Recycled BMPYRR-OTf | 160 | 70% | 204 | 80 | 42 | 2529 | 25 | 2880 |
| Virgin BMPY-OTf | 10 | | 11 957 | 1280 | 640 | 38 958 | 364 | 53 199 |
| Recycled BMPY-OTf | 68 | 63% | 571 | 188 | 98 | 5984 | 57 | 6898 |

[a]The processing column includes all non-materials costs, such as utilities, operating expenditures, and capital expenditures. Most of the processing costs for these syntheses is contributed by labor and related operating costs.

the IL solvents with the BMPYRR⁺ cation give the highest isolated yields of Pt nanoparticles for both NTf$_2$ and OTf⁻ anions. However, unlike the ILs with the NTf$_2$⁻ anion, the isolated yields for the IL solvents with the OTf⁻ anion do not remain constant through recycling. After five recycles, the isolated yield achieved with BMIM-OTf increases to 70%, the isolated yield achieved with BMPYRR-OTf increases to 160%, and the isolated yield achieved with BMPY-OTf increases to 68%. This increase in yield can be attributed to ineffective stripping of Pt from the used IL, resulting in carryover of Pt-containing species in the ILs. Such increases in apparent Pt nanoparticle yields caused by Pt carryover resulting from ineffective extraction and purification have been reported previously.[48] These results further illustrate the importance of efficient liquid-liquid extraction for the recyclability and employment of these IL solvents.

2.2.3 Techno-Economic Analysis

We performed an early-stage economic assessment of the synthesis of Pt nanoparticles using the six IL solvents described above with CatCost, a free cost estimation tool,[70,71] to assess the impact of IL recycling on the overall synthesis costs. Estimates were made for the cost of a model catalyst material consisting of Pt nanoparticles supported on The starting point for this analysis was calculating the total cost of each NP-Pt/C system using virgin ILs. The NP-Pt/C costs using these six virgin TLs differ dramatically (i.e., from $11 957 per kg NP-Pt/C for BMPY-OTf to $559 per kg NP-Pt/C for BMPYRR-NTf$_2$) because of the large range of IL bulk prices (i.e., from $441 per kg NP-Pt/C for BMPY-OTf to $187 per kg NP-Pt/C for BMPYRR-NTf$_2$) and significant differences in the isolated Pt nanoparticle yield (i.e., from 10% for BMPY-OTf to 98% for BMPYRR-NTf$_2$). Given this large range of nanoparticle yields, it is perhaps unsurprising that the virgin IL with the highest yield (BMPYRR-NTf$_2$) has the lowest catalyst cost ($4673/kg), while the virgin IL with the lowest yield (BMPY-OTf) has the highest ($53 199/kg). This highlights the significant differences that arise and must be considered when adapting a synthetic process to a different solvent system. Without recycling, in all cases the cost of the virgin IL solvent contribute more to the catalyst cost than even $K_2PtCl_4$, with the most extreme cases being closer to 10× greater (e.g., BMPY-OTf). While perhaps counterintuitive, this result underscores the challenge in the commercialization of processes that utilize TLs in a once-through synthesis and highlights the importance of early-stage economic assessment to identify the greatest cost drivers instead of assuming it is the platinum-group metal being used.

This techno-economic analysis gives insight into the cost savings that can be achieved with recycling. With implementation of solvent recycling using our continuous flow recycler, the solvent costs of the TLs per kg NP-Pt/C are all substantially reduced relative to the virgin IL analogues. For example, using virgin BMPY-NTf$_2$ results in the third highest reaction solvent cost ($5271 per kg NP-Pt/C) as well as the third highest total cost reported ($22 502 per kg NP-Pt/C). These costs are in part driven by a modest Pt nanoparticle yield (24%). Recycling this IL with a solvent recovery yield of 94% results in a reaction solvent cost that is 20× cheaper ($269) and a total cost that is close to half of that using the virgin IL. Using recycled IL results in >90% savings of the reaction solvent cost for almost all ILs, with the exception of BMPYRR-OTf having an 81% solvent cost reduction per kg NP-Pt/C. However, because of the differences in water miscibility, the driving factor of the solvent cost reduction differs between ILs with NTf$_2$ and OTf$^-$ anions. Because the ILs with the NTf$_2^-$ anion are water-immiscible, the separation and purification process in the continuous flow recycler is quite successful in removing reaction byproducts. This is validated by the absence of impurities in the solution NMR spectra, the fact that the isolated Pt nanoparticle yield does not increase upon using recycled IL, and the relatively high solvent recovery yield of ≥90%. From this, we can conclude that the solvent cost reduction is predominantly driven by recycling. In contrast, the IL solvents with the OTf$^-$ anion are miscible with water, making the purification and separation in the continuous flow recycler less efficient. This is demonstrated by the presence of ethylene glycol in the solution NMR spectra of the recycled ILs, an increase of the Pt nanoparticle yield upon using recycled IL, and a relatively low solvent recovery yield of 63-70%. From this, we conclude that the solvent cost reduction for the ILs with the OTf$^-$ anion is mainly driven by an increase in Pt nanoparticle yield upon successive recycles, as this means less IL is needed to produce the same amount of catalyst.

Another significant detail realized from the techno-economic analysis is that the solvent costs per kg NP-Pt/C using recycled IL solvents with the NTf$_2^-$ anion (i.e., recycled BMIM-NTf$_2$, BMPYRR-NTf$_2$, and BMPY-NTf$_2$) become cheaper than the K$_2$PtCl$_4$ precursor price per kg NP-Pt/C. However, the experimental-economic approach performed using the virgin ILs demonstrates that the reaction solvent cost is higher than the cost of the K$_2$PtCl$_4$ precursor per kg NP-Pt/C. This illustrates how costly and untenable it can be to employ once-through virgin IL solvents. To further highlight the impact of solvent recycling, FIG. 13 shows the relative cost contributions from the reaction solvent, the K$_2$PtCl$_4$ precursor per kg NP-Pt/C, and other materials used in the Pt nanoparticle synthesis (e.g., PVP, ethylene glycol, work-up solvents, etc.) for both virgin and recycled ILs. Upon recycling, the K$_2$PtCl$_4$ precursor per kg NP-Pt/C becomes the largest cost contributor out of the three components. This is driven by a significant reduction in IL solvent cost. That is, for BMIM-NTf$_2$, the reaction solvent cost is reduced from 78% to 19%, for BMPYRR-NTf$_2$, the reaction solvent cost is reduced from 72% to 16%, and for BMPY-NTf$_2$ the reaction solvent cost is reduced from 87% to 30% per kg NP-Pt/C.

The sensitivity of the catalyst synthesis cost to the cost factors specific to each IL is illustrated by a sensitivity analysis evaluating how isolated Pt nanoparticle yield, IL recovery yield, and bulk price of the IL can affect the final NP-Pt/C cost. FIG. 14 shows this sensitivity analysis for all six of the IL solvents, using the recycled IL as the baseline scenario in each case. The analysis illustrates the percent change to the NP-Pt/C cost relative to the baseline case. Across all six IL solvents, the isolated yield of Pt nanoparticles has the largest effect on NP-Pt/C cost, ranging from ca. −15% to +25%. A higher Pt nanoparticle yield means less Pt precursor is required to make the same amount of catalyst and the overall cost of the NP-Pt/C catalyst will decrease. The effect of nanoparticle yield on catalyst cost has also been reported previously.[48,72] Furthermore, the relative importance of the other two factors (i.e., IL recovery yield and bulk IL price) is heavily dependent on the particular anion. The ILs with the NTf$_2^-$ anion follow a similar trend in that the IL recovery yield has a greater effect than the bulk IL price, whereas for the ILs with the OTf$^-$ anion, the bulk IL price has a greater effect than the IL recovery yield. The IL solvents with the OTf$^-$ anion are recovered at significantly lower rates than the ILs with the NTf$_2^-$ anion, meaning that the bulk price of the IL has a larger effect on the overall purchase costs because more virgin IL is needed to replenish the solvent volume in each subsequent reaction. Again, this difference highlights the fact that IL miscibility plays a very important role in the overall NP-Pt/C costs.

2.3 Conclusions

This study demonstrates a method for identifying a process-cost idealized IL solvent for a colloidal nanoparticle synthesis based on solvent cost, reaction yield, and capacity for solvent recycling. We established a matrix of six ILs as solvents for the model colloidal synthesis of Pt nanoparticles. These ILs were recovered and purified in a continuous flow recycler with acidified water and reused in subsequent nanoparticle syntheses without any chemical degradation to the IL structure. An early-stage techno-economic analysis illustrates that IL recycling can eliminate the economic barrier to unlocking the sustainability advantages of using IL solvents over traditional VOC solvents. A sensitivity analysis was performed to examine the influence of different input parameters (i.e., isolated yield of Pt nanoparticles, IL recovery yield, and bulk IL price) on an overall NP-Pt/C catalyst cost. This analysis revealed that the main cost contributor across all six ILs is the nanoparticle isolated yield, which can change the cost on the order of ca. −15 to +25% relative to the baseline scenario. The order of the other two cost contributors is directly dependent on the IL anion, which further highlights the fact that the miscibility of ILs is imperative to efficient separation and purification.

Performing this early-stage techno-economic analysis on the factors that affect the cost of employing and recycling ILs gives important information about specific choices that should be made when scaling up. For example, the bulk price of ILs is not the only factor that should be considered. ILs have different abilities to be recycled and reused in subsequent reactions. Their miscibility with polar solvents plays a large role in the success of purification when attempting to use water as a washing agent. IL solvents also affect the reaction chemistry to differing degrees, stemming from their dual properties of acting as a solvent and interacting with the nanoparticles as surface stabilizers, which in turn affects the isolated yields and quality of the nanoparticles. For example, using recycled BMPYRR-OTf results in the lowest overall cost of NP-Pt/C ($2880), but the quality of the resulting Pt nanoparticles is significantly compromised relative to using virgin BMPYRR-OTf. By combining techno-economic and materials characterization data, the best task specific IL can be chosen. In this case, recycled BMPYRR-NTf$_2$ would be chosen because of its relatively low cost and superior quality of the resulting Pt nanoparticles. This highlights the importance of using cost information in a combined experimental-economic approach to assist in minimizing the overall synthesis cost and provide the context in which task specific ILs can be identified and adapted at scale, bridging the gap to implement ILs industrially and benefit from their sustainability advantages.

2.4 Experimental Procedures 2.4.1 Platinum Nanoparticle Synthesis $K_2PtCl_4$ (99.9%; Sigma-Aldrich), polyvinylpyrrolidone (PVP) (MW=55 000; Aldrich), and ethylene glycol (99.8%; Sigma-Aldrich) were all used as received. 1-Butyl-3-methylimidizolium bis(trifluoromethylsulfonyl)imide (BMIM-NTf$_2$, 99%, Lot #W006×106.2.1), 1-butyl-3-methylimidazolium triflate (BMIM-OTf, 99%, Lot #T009×88.7), 1-butyl-1-methylpyrrolidinium bis(trifluoromethylsulfonyl)imide (BMPYRR-NTf$_2$, 99%, Lot #T009×88.1), 1-butyl-1-methylpyrrolidinium triflate (BMPYRR-OTf, 99%, Lot #P00364.1), 1-butyl-2-methylpyridinium bis(trifluoromethylsulfonyl)imide (BMPY-NTf$_2$, 99%, Lot #F00113.1), and 1-butyl-2-methylpyridinium triflate (BMPY-OTf, 99%, Lot #Q00188.1) were all purchased from IoLiTec and dried under vacuum at 120° C. for 2 h prior to use. In a standard procedure, 42.1 mg (0.100 mmol) of $K_2PtCl_4$ was dissolved in 2.7 mL of ethylene glycol. Separately, 227.2 mg of PVP was added to 8.0 mL of the IL in a two-neck round bottom flask equipped with a condenser and septum. The PVP was dissolved in the IL by heating it in a thermostatically controlled oil bath at 150° C. for 10 min, giving a clear solution. The solution of $K_2PtCl_4$ in ethylene glycol was then hot injected into the IL solution of PVP and the reaction solution was maintained at 150° C. for 30 min. The solution was thermally quenched in an ice bath. For the three IL solvents with NTf$_2^-$ anions, the reaction mixture was transferred to a 30 mL separatory funnel. After complete phase separation, the IL layer (bottom) was separated from the black Pt nanoparticle suspension in ethylene glycol (top) and subsequently washed with acidified water in the continuous flow recycler (vide infra). The black Pt nanoparticle suspension (2.7 mL) was equally split between two 50 mL centrifuge tubes and precipitated with 30 mL of acetone in each tube followed by centrifugation (6000 rpm or 3820×g, 5 min). The clear supernatant was decanted, and the solid product was redispersed in 10 mL of ethanol and precipitated with 30 mL of hexanes followed by centrifugation (6000 rpm or 3820×g, 5 min). Dispersion in ethanol and precipitation with hexanes was performed two more times. The final Pt nanoparticle product was redispersed in ethanol to give a stable colloidal suspension or dried under nitrogen for further characterization. For the three IL solvents with the OTf$^-$ anions, the reaction mixture was transferred to a 50 mL centrifuge tube and 30 mL of acetone was added to precipitate the Pt nanoparticles. The supernatant containing the IL was saved, and the acetone and other volatiles were removed in vacuo. The IL was then washed with acidified water in the continuous flow recycler with an IL membrane separator. The Pt nanoparticles were then purified three times with 10 mL of ethanol and 30 mL of hexanes via centrifugation (6000 rpm or 3820×g, 5 min). The isolated Pt nanoparticle yield was calculated from the residual Pt mass determined by thermogravimetric analysis (TGA). The experimental error of calculating isolated yield from TGA is ±2 wt %.

2.4.2 Fabrication of Continuous Flow Microfluidic Recycler

The continuous flow recycler was designed in Autodesk Inventor Profession 2022 and fabricated via stereolithography (SLA) by a 3D printer (model MAX X UV 385; Asiga) with a transparent methacrylate-based resin (GR-10; Pro3dure Medical). The as-printed device was washed in three sequential isopropanol (Supelco) baths to flush away excess uncured resin right after being removed from the print bed. Isopropanol was also injected inside the device by hand to flush the micro-channel. The device was air dried for 5 min before using. A hydrophobic PTFE membrane (pore-size 100 nm; Sterlitech) was placed in between the two parts of the recycler that were then combined by a quick-cure epoxy (Bob Smith Industries). After 2 h of epoxy curing, 200 μL of NTf$_2$ ILs were infused into the recycler to pre-wet the membranes. The cation of the pre-wetting ILs corresponded to the cation of the IL-to-purify (e.g., BMIM-NTf$_2$ to pre-wet recyclers for purifying BMIM-NTf$_2$ and BMIM-OTf).

2.4.3 Washing of Water-Immiscible Ionic Liquids in Continuous-Flow Recycler

Nitric acid (70%) was diluted in deionized water to give a 0.1 M acidified aqueous solution. The water-immiscible NTf$_2^-$ IL feed stream and acidified water feed stream were loaded in two separate 20 mL syringes (Luer-lok; BD). Two syringe pumps (Fusion 200; Chemyx) in infusion mode were used to inject the two streams into the recycler (IL flow rate=100 μL min; acidified water flow rate=130 μL min$^{-1}$). The stream formed biphasic slug flow and passed through 41 cm-long channel (herringbone and wavy) where extraction occurred. The slug flow then passed through a separation section where membrane separation occurred. The permeate IL phase was collected from the lower outlet of the recycler, while the retentate aqueous phase was collected to a 20 mL syringe loaded on a third syringe pump in withdrawal mode (flow rate=129 μL min$^{-1}$). PTFE tubing (I.D. 1/32 in; Cole-Parmer) was used to connect all syringes and the recycler (length from IL syringe to recycler port=10 cm; from acidified water syringe to recycler port=10 cm; from recycler upper outlet to waste aqueous syringe=15 cm; from recycler lower port to IL product outlet=5 cm). Nuts and ferrules selected in appropriate sizes for all connections were purchased from IDEX Health & Science. The IL phase going into the withdrawal syringe due to retention before steady state was also collected to minimize loss. The one-time washed IL product was then reloaded into a new 20 mL syringe for the second wash to proceed following the same procedure described above. A third wash was carried out after the same workup procedure after the second wash. The three-time purified, recycled IL product was dried under vacuum at 120° C. for 2 h to remove any bulk residual water. An appropriate amount of fresh IL was added to each synthesis to ensure the reaction volume remained consistent.

2.4.4 Washing of Water-Miscible Ionic Liquids in Continuous-Flow Recycler

The experimental setups for the three water-miscible IL solvents with OTf$^-$ anions followed the same procedure as that for the NTf$_2$ ILs. The OTf$^-$ IL stream and 0.1 M acidified aqueous stream were infused into the recycler with flow rates of 100 μL min$^{-1}$ and 11 μL min$^{-1}$, respectively. The retentate aqueous waste was collected by the syringe pump in withdrawal mode at flow rate of 11 μL min$^{-1}$. The IL product from the lower outlet of the recycler was then reloaded to the infusion pump to conduct the second and third washes. The three-time washed and recycled IL product was dried under vacuum at 120° C. for 2 h to get rid of any residual water and other volatiles. An appropriate amount of fresh IL was added to ensure the reaction volume remains consistent.

2.4.5 Supported Nanoparticle Cost Estimation

Cost estimates were compiled in Microsoft Excel v16 using the spreadsheet version of CatCost v1.0.4.[70] All prices were adjusted to 2016 USD by use of the U.S. Bureau of Labor Statistics Chemical Producer Price Index (ChemPPI)

or, for equipment costs, the Chemical Engineering Plant Cost Index. Raw materials prices at 1000 kg order size or greater were estimated through a combination of vendor quotations, freely available and proprietary price databases, and estimates from industry experts. Generally, several sources were consulted to develop an average and/or verify each assumed price. A factor of 3% was added to the raw materials costs to account for waste and spoilage. Processing costs were estimated using the CapEx & OpEx factors method. The remainder of the capital costs-including direct capital costs like installation, piping, instrumentation, and buildings; indirect costs like engineering, legal, and contingencies; and working capital—were estimated as fixed factors (multipliers) of the total purchased equipment cost using the modified Lang factors[73,74] of Peters and Timmerhaus.[75] A similar calculation approach and factors were taken from the same source[75] to determine operating costs such as supervisory labor and maintenance supplies, fixed/indirect costs such as insurance and overhead, and general expenses such as distribution and marketing. Direct labor was calculated by summing the labor factors of all the equipment items after scaling to the specified production rate, then rounding up to the nearest whole number to determine number of operators. Year-round operation (8760 h) with full staffing during maintenance downtime was assumed. A labor rate including benefits of $48/h for US Gulf Coast production was used. The value of the spent catalyst, which was estimated at $111.34/kg for all the catalysts, was not included in the analysis; all cost estimates reflect the purchase cost. The supporting procedures to generate 0.5 wt % NP-Pt/C (i.e., addition of as-synthesized Pt nanoparticles to a carbon support by dropcasting) are included in the cost estimates. Targeting a specific metal loading from Pt nanoparticle suspensions (e.g., 0.5 wt % Pt/C) can be done through a ligand weight-correction via thermogravimetric analysis to obtain the Pt metal content in each sample. This procedure has been previously reported for successfully targeting a specific metal loading for a given supported catalyst.[76,77]

2.5 Characterization

2.5.1 Powder X-Ray Diffraction (XRD)

XRD patterns were collected on a Rigaku Ultima IV diffractometer operating with a Cu Kα X-ray source (λ=1.5406 Å) at 40 mA and 44 kV.

2.5.2 Transmission Electron Microscopy (TEM)

TEM images were acquired with a JEOL JEM2100F (JEOL Ltd.) microscope operating at 200 kV. Each sample was drop-cast on 400 mesh Cu grids coated with a lacey carbon film (Ted Pella, Inc.) and dried overnight under vacuum at room temperature. The average sizes of the Pt nanoparticles were determined using ImageJ, a pixel-counting software (N=300).

2.5.3 Thermogravimetric Analysis (TGA)

Thermogravimetric analysis of the Pt nanoparticles was performed on a TGA Q50 instrument. The organic-corrected, isolated yield of Pt nanoparticles from each reaction was gravimetrically calculated via TGA. To determine the organic ligand content, ca. 10 mg of Pt nanoparticle powder isolated after workup was heated to 700° C. under flowing air at a heating rate of 10° C. min$^{-1}$.

2.5.4 Nuclear Magnetic Resonance (NMR) Spectroscopy

Solution $^1$H and $^{19}$F NMR spectra were collected on a Varian 600 MHz VNMRS spectrometer using 16 scans. CDCl$_3$ was used as the deuterated solvent. All the sample concentrations in the NMR tubes were kept constant with the addition of 5 μL of IL into 800 μL of CDCl3.

3. A Multistep, Multicomponent Extraction and Separation Microfluidic Route to Recycle Water-Miscible Ionic Liquid Solvents

3.1 Introduction

In this section, we describe a solvent recycling route for water-miscible ILs that consists of a step of extraction of contaminants followed by recovery of target ILs. Here, water-miscible ILs with the triflate anion (OTf) were the targets to be recycled. Hydrophobic ILs with bis(trifluoromethylsulfonyl)imide anion (NTf$_2^-$) were introduced as "accommodating agents", and acidified water was the washing agent. This recycling route is abbreviated as "AAA" (accommodating agent-aided). The AAA strategy was implemented in a continuous-flow microfluidic process coupled with micro-mixing and membrane separation. A preliminary mixing and miscibility test among the three species (OTf$^-$ IL, NTf$_2^-$ IL, and water) was conducted to study the pH-dependent partition behavior of OTf$^-$ ILs between the NTf$_2^-$ IL and water phases. As proof of concept, several factors (e.g., IL recovery rates, amounts of the residual impurities) were evaluated in the washing of 1-butyl-3-methylimidazolium triflate (BMIM-OTf) with water and 1-butyl-3-methylimidazolium bis(trifluoromethylsulfonyl)imide (BMIM-NTf$_2$). Later, we performed recycling of an IL solvent, 1-butyl-1-methylpyrrolidinium triflate (BMPYRR-OTf), from the actual reaction mixture of a Pt nanoparticle synthesis, demonstrating that the application of the prototypical route was practical in a realistic chemical process.

3.2 Results and Discussion

Figure 15A:
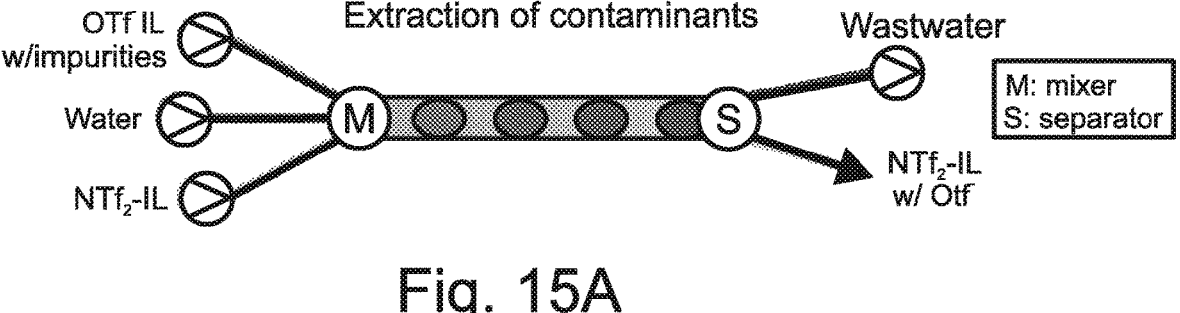
FIGS. 15A and 15B. Schematics of the IL recycling process in the continuous flow with two steps (A) extraction of contaminants and (B) recovery of $OTf^-$ ILs. Colors of the streams are based on the kinds of components involved and their according mixtures. In the biphasic flow, the aqueous phase is the dispersed phase representing by oval-like slugs, while the IL phase is the continuous phase.
Figure 15B:
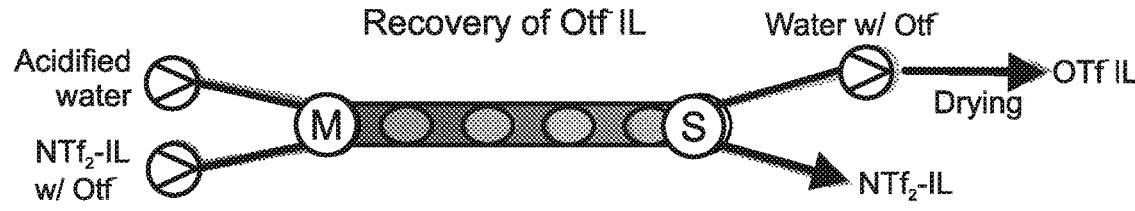

The continuous-flow AAA IL purifying process contains two steps: (a) extraction of contaminants with water in the presence of NTf$_2^-$ (FIG. 15A) and (b) recovery of OTf$^-$ ILs from the NTf$_2^-$ accommodating agent using acidified water (FIG. 15B). In the first step, a stream of hydrophilic (OTf$^-$-based) IL to be recycled, a stream of hydrophobic (NTf$_2^-$-based) IL, and a stream of water are introduced to the flow process. Here, the NTf$_2^-$ IL phase and the aqueous phase form a biphasic slug flow in a micro-mixer with the OTf$^-$ IL distributed at some partitioning ratio between the two phases. The pH of the water is selected based on the miscibility study described below to minimize the loss of OTf$^-$ IL to the wastewater. The two phases are separated after extraction in a membrane separator. In the second step, acidified water at a relatively low pH value is used to strip the OTf$^-$ IL from the washed IL product from the first step. The aqueous product carrying the target OTf$^-$ IL from membrane separation is dried offline to remove water and complete the recovery step.

In designing the pH of water used in the AAA process, we studied the partitioning behavior between water, OTf$^-$ ILs (miscible with water), and NTf$_2^-$ ILs (immiscible with water). The miscibility study was carried out in batch. Equal amounts of OTf$^-$ IL, NTf$_2^-$ IL, and water at various pH were mixed and then phase-separated via centrifugation. A second wash was performed by decanting the upper (water-rich) layer and adding fresh water to be in contact with the remaining lower IL phase followed by another cycle of mixing and separation. The retention factors of OTf$^-$ IL in NTf$_2^-$ IL phase were calculated using eq 1. We assumed that the solubility of NTf$_2^-$ ILs in water is negligible.[81]

$$\text{Retention of } OTf^- IL = \frac{m_{IL} - m_{NTf2}}{m_{OTf}} \qquad 1$$

where $m_{IL}$ is the total mass of the IL phase, $m_{NTf2}$ is the mass of $NTf_2^-$ IL added, and $m_{OTf}$ is the mass of $OTf^-$ IL added initially. A retention factor of one would indicate complete failure of the aqueous phase to separate the $OTf^-$ IL from the $NTf_2^-$ IL; a retention factor of zero means all $OTf^-$ IL partitioned to the aqueous phase.

Figure 16A:
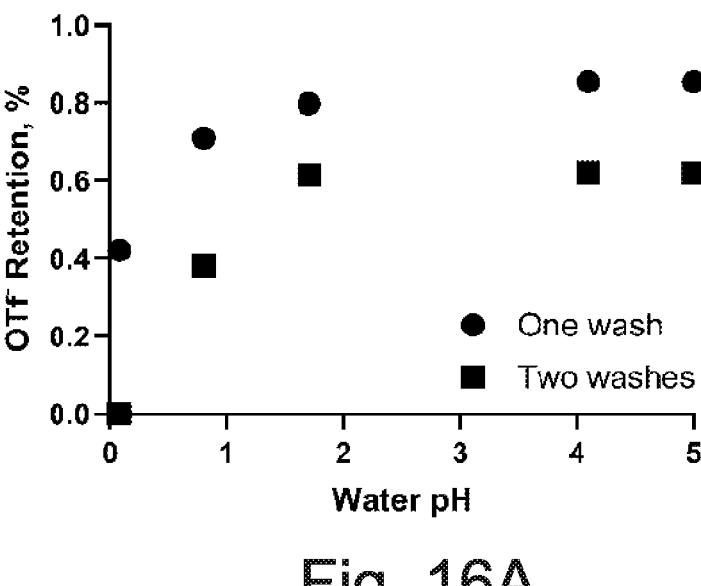
FIGS. 16A and 16B. Retention factors of OTf– ILs in the IL phase. (A) Mixture of BMIM-OTf, $BMIM-NTf_2$ and acidified water at different pH values. (B) Mixture of BMPYR-OTf, BMPYRR-NTf2 and acidified water at different pH values.

FIG. 16 shows that for both IL-water systems the retention factors of $OTf^-$ ILs decrease with decreasing water pH, meaning that more of the $OTf^-$ ILs partition to water at lower pH. Retention factors of the $OTf^-$ IL with BMPYRR$^+$ as cation are lower than those with BMIM$^+$ as cation at a given pH value. Note that the retention factor does not reach 100% even with DI water that gives a pH value of ca. 5. Also note that the second wash can remove more $OTf^-$ IL from the IL phase, and the retention factors are nearly zero using two washes with water at pH=0, indicating that no $OTf^-$ IL is left in the $NTf_2^-$ IL. This pH dependent distribution observation can guide the design of the aqueous phase used in the microfluidic implementation of IL recycling.

Figure 17:
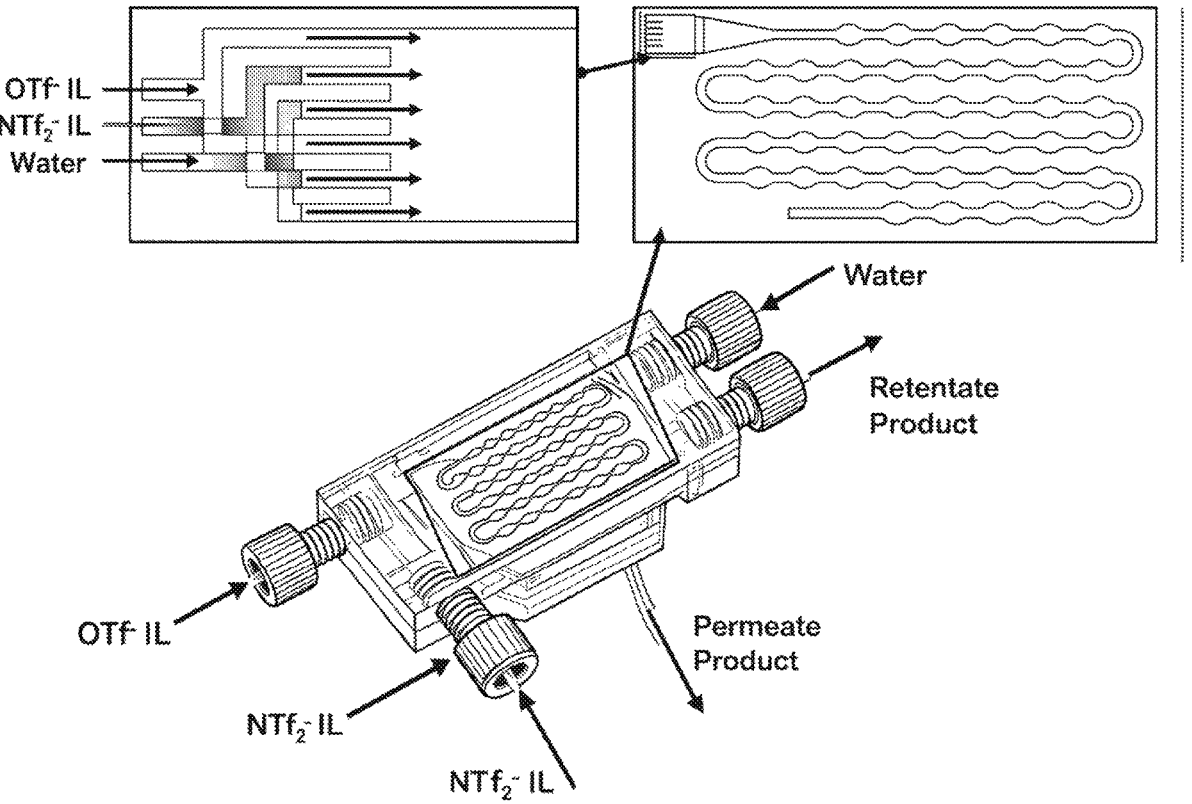
FIG. 17. Picture of the 3D-printed recycler, specifying three input streams of OTf-IL, $NTf_2^-$ IL, and water, and two output streams of the retentate and permeate phases after membrane separation. A diagram of the wavy channel for extraction is shown in the purple box. The six sub-streams after splitting of manifolds into the funnel-like merging mixer are depicted in the dark green box.

The two-step continuous-flow AAA process was executed in a 3D-printed micro-recycler (FIG. 17). After the infusion of the three streams, each of them was equally split into two branches in a manifold in the recycler. In a sequence as shown in FIG. 17, all six sub-streams (channel crosssection=200 μm×200 μm) met in a funnel-like inlet that constricted from 2.2 mm to 0.6 mm. Here, a biphasic flow was established, with the aqueous phase dispersing into the $NTf_2^-$ IL phase and the $OTf^-$ IL partitioning between the two. A video showing this flow pattern is available in the Supporting Information. A stable slug flow was formed at the end of the entry constriction. This flow entered a length of channel with wavy walls and round turns designed to accelerate mass transfer and the extraction of contaminants. Diffusional mass transfer between the adjacent slugs was improved by the quick internal circulation and convective mixing within a given slug induced by the no-slip boundary condition.[79] Mass transfer between and convective mixing within the slugs were intensified by the wavy walls that created an additional velocity profile in the direction perpendicular to the flow-forward direction, visualized by the "expansion" of the slug in the widening area and the "shrinkage" of the slug in the narrowing area.[78,82] Round turns were also designed to trigger Dean flow, which harnessed a secondary flow field inside the liquid slug to promote the recirculation of the fluid, countering otherwise slow mixing in the stagnant layer near the channel walls.[47] After extraction, the slug flow passed through a phase separation section where a hydrophobic PTFE membrane (pore size =0.1 μm) was employed. The separated phases were collected for next use. Note that in the step of $OTf^-$ IL recovery, streams of $OTf^-$ IL and $NTf_2^-$ IL were both replaced with the steams of mixed IL product from the first step. This system is modular such that the number of stages in each step can be modified according to the need. For example, a two-stage impurity extraction step means the washed IL product will be fed back to the recycler inlet for a second contact with the fresh washing agent.

We initially performed a study in the absence of any impurities to characterize the ability of this system to recover an $OTf^-$ IL and reuse an accommodating IL. We used as-received BMIM-OTf as the $OTf^-$ IL source and as-received BMIM-NTf$_2$ as the accommodating agent. DI water and acidified water at pH=0 were used in the first and second steps, respectively. We used one stage for the first step (impurity extraction) and two for the second step (IL recovery). To demonstrate the reusability of BMIM-NTf$_2$ as an accommodating agent, BMIM-NTf2 from a given run was used directly in the next round of the recycling (i.e., the $NTf_2^-$ IL input in the step of impurity extraction). Table 1 summarizes the recovery rates of $OTf^-$ and $NTf_2^-$ ILs and amounts of $OTf^-$ IL in the $NTf_2^-$ IL product, and vice versa.

TABLE 1

Results of the contaminant-free study. Recovery rates are presented in volumetric ratios. IL content in the other IL is calculated in mole ratios. IL content in the wastewater is measured in weight percentages. 1 × process refers to using as-received BMIM-NTf$_2$, while 2 × and 3 × refer to the times of reuse of BMIMNTf$_2$ from the previous process.

| | BMIM-OTf Recovery Rate (v/v, %) | BMIM-NTf$_2$ Recovery Rate (v/v, %) | BMIM-NTf$_2$ in BMIMOTf Product (mol %) | BMIM-OTf in BMIMNTf$_2$ Product (mol %) | IL in Wastewater (wt %) |
|---|---|---|---|---|---|
| 1 × Process | 83.9 | 90.9 | 13.5 | 0 | 10.8 |
| 2 × Process | 83.0 | 91.5 | 13.0 | 0 | 9.0 |
| 3 × Process | 86.5 | 92.5 | 11.5 | 0 | 10.7 |

The recovery rates of both the target BMIM-OTf and the accommodating agent BMIM-NTf$_2$ were 83-93% by volume and were stable over 3× reuses. The IL content in the other IL product was calculated based on the integration of peaks in the $^{19}$F NMR spectra. It is noted that ca. 12% of BMIM-NTf$_2$ was detected in the recycled BMIM-OTf products that were retrieved from the aqueous phase in the recovery step. In the miscibility study, we first hypothesized that the $NTf_2^-$ ion itself is highly immiscible with the aqueous phase. Here, the non-zero content of BMIM-NTf$_2$ in BMIM-OTf products de facto disclosed a non-zero dissolution of the $NTf_2^-$ ILs in the aqueous phase, which to some extent agreed with the results reported previously that the solubility of an IL in the aqueous phase could change at different concentrations of another hydrophilic IL or salts doped in the mixture.[84,85] In contrast, no detectable $OTf^-$ ions were observed in the BMIM-NTf$_2$, as illustrated by the clean single resonance in the $^{19}$F NMR spectrum, reflecting that the selected water acidity was capable of capturing all BMIM-OTf from the BMIM-NTf$_2$ phase after two recovery stages. The non-100% recovery rates of both ILs indicated a loss of ILs. ILs could be lost during device operation (e.g., in the dead volume of the channel and recycler) and sample handling. Inevitable dissolution of the $OTf^-$ ILs in the wastewater was another source of losing ILs, as shown by the IL content in wastewater quantified in Table 1, and as indicated by the observation in the miscibility study that ca. 20% of $OTf^-$ IL would stay in the aqueous phase even with DI water (high pH). The recovery rates of ILs can be expected to further increase by additional treatments, for example, extra step to recover the IL from the wastewater.

To study the efficiency of extracting impurities from the $OTf^-$ IL with the recycler, Fe(NO3)3 was added to the as-received BMIM-OTf solvent. Fe(III) ions are a good indicator of the water-IL biphasic extraction because they are spectrophotometrically detectable at 310 nm and complete mass transfer from the IL phase to the aqueous phase can occur.50 Fe(III) ion-loaded BMIM-OTf, as-received BMIM-NTf$_2$, and DI water were injected into the recycler for the step of extraction of Fe(III) ions, and acidified water at pH=0 was used to recover the washed BMIM-OTf from the IL phase in two stages for the second step. Interestingly, during membrane separation, the aqueous phase became the permeate phase, passing through the normally hydrophobic PTFE membrane. This is in contrast to what was observed in the preliminary study with no contaminants, in which the hydrophobic IL phase acted as the permeate. This inversion of the retentate and permeate could stem from the introduction of Fe(III) ions; a rust-brown color could be seen on the membrane, indicating that Fe(III) ions were adsorbing on the membrane and altering the wettability. As a result, the retentate IL phase was collected in the first step instead of the permeate. To evaluate the performance of the flow recycling, we compared it with a standard batch recycling. In the batch procedure, the same reagents at the same volumetric ratios were mixed and then phase separated via centrifugation. We also benchmarked this system performance against an ILM separator, as described above and deployed in our previous work.[78,86] This separator utilized an identical 0.1-μm-pore PTFE membrane incubated with BMIM-NTf2 overnight prior to use. The retentate phase was collected as washed IL product, in line with the operation of the two-step flow process. Metrics to compare the three methods are given in Table 2 and FIG. 18.

TABLE 2

Summary of recycling performance on different methods. Recovery rates are presented in volumetric ratios. Water concentrations in the recycled BMIM-NTf2 are presented in weight percentages. Recovery rate and water concentration are unavailable in the ILM method due to process differences.

| | ILM | AAA in Batch | AAA in Flow |
|---|---|---|---|
| BMIM-OTf Recovery Rate (v/v, %) | 50.5 | 87 | 78.6 |
| BMIM-NTf2 Recovery Rate (v/v, %) | N.A. | 90.8 | 87.3 |
| Water Conc. in Re. BMIM-NTf2 (wt %) | N.A. | 4.9 | 2.2 |

Figure 18:
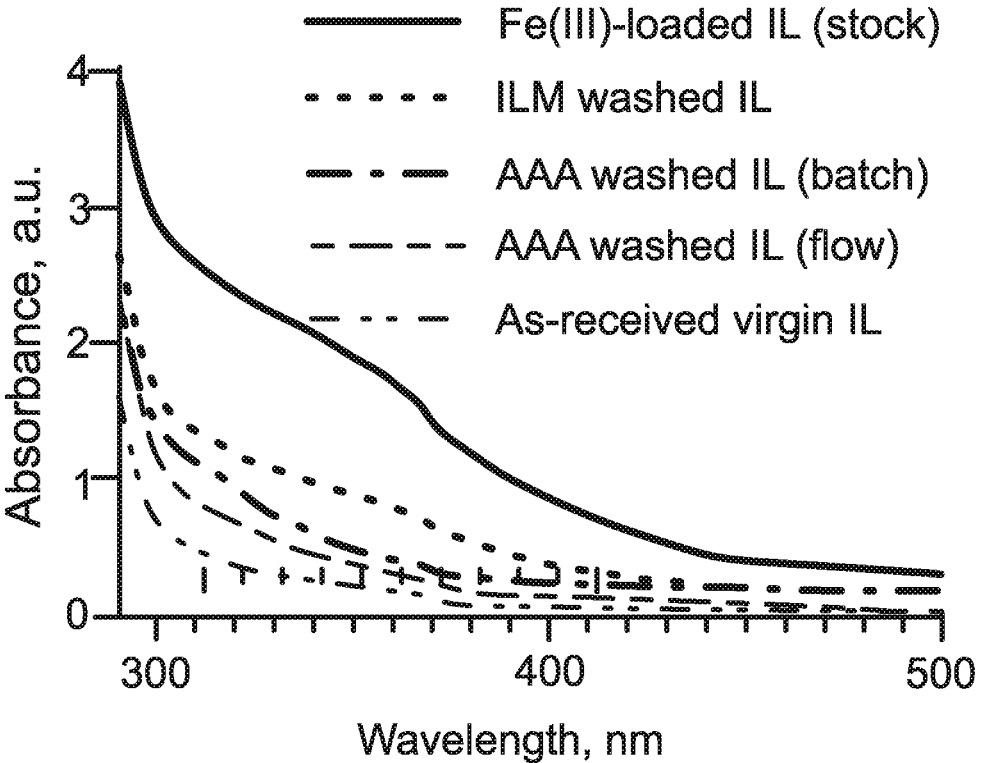
FIG. 18. UV-vis absorbance spectra of varying BMIM-OTf samples.

ILM had the lowest recovery rate of BMIM-OTf of the three approaches procedures (Table 2). This makes it clear that that the separation of homogeneous mixture merely relying on intermolecular interactions between the pre-wet hydrophobic IL and the target hydrophilic IL is of limited utility. Also, the residence time possible in flow is likely insufficient for equilibrium ILM separations, as literature reports of such approaches describe incubation times up to 50 h in batch.[80] Recovery rates using the AAA batch and flow processes slightly varied, due in great part to the material loss in the flow device, as discussed above. The recovery rate deficit can be expected to be alleviated or even inverted when scaling up, since the dead volume of the flow system is constant, and the fraction of liquid lost to this dead volume will approach zero as reagents are continuously processed. Moreover, the flow process produces a BMIM-NTf2 phase with less water present at the end of the process (2.2% versus 4.9%), resulting from the hydrophobic membrane used in the recycler also assisting in filtering water content. FIG. 18 illustrates that all three methods managed to remove Fe(III) ions at certain degrees. The washed IL from the ILMS method still carried the highest concentration of Fe(III) among the three, while the Fe(III) concentration level closest to the as-received virgin IL was found in the IL product purified by the AAA route in flow, reflecting not only the extraction but also the adsorption of Fe(III) on the membrane.

Figure 16B:
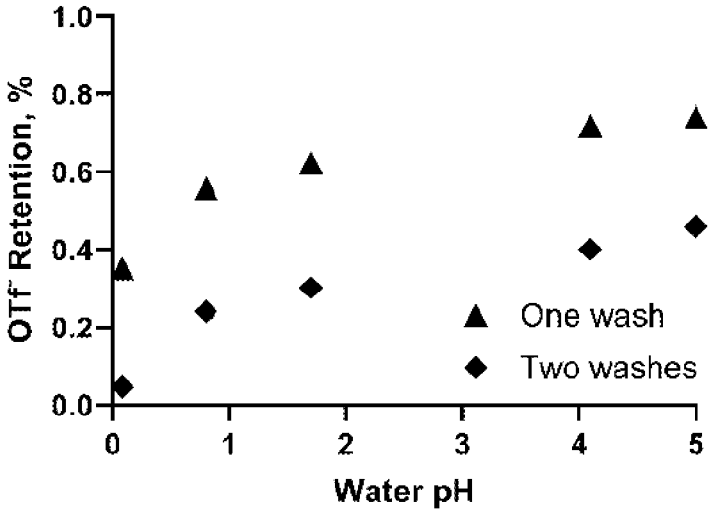
Figure 19A:
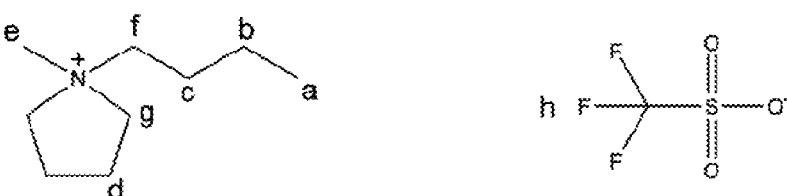
FIGS. 19A, 19B, and 19C. (A) Structure of the BMPYRR+ cation (left) and OTf-anion (right). (B) $^1H$ NMR spectra of virgin, 1× recycled, 2× recycled BMPYRR-OTf, and unwashed BMPYRR-OTf. (C)$^{19}F$ NMR spectra of virgin, 1× recycled, and 2× recycled BMPYRR-OTf. The open circle (o) denotes water at 1.56 ppm. The open triangle (Δ) denotes ethylene glycol. The open square ( ) denotes the $^{19}F$ resonance from the NTf2- anion. Asterisks (*) represent the residual nondeuterated solvent peak of chloroform.
Figure 19B:
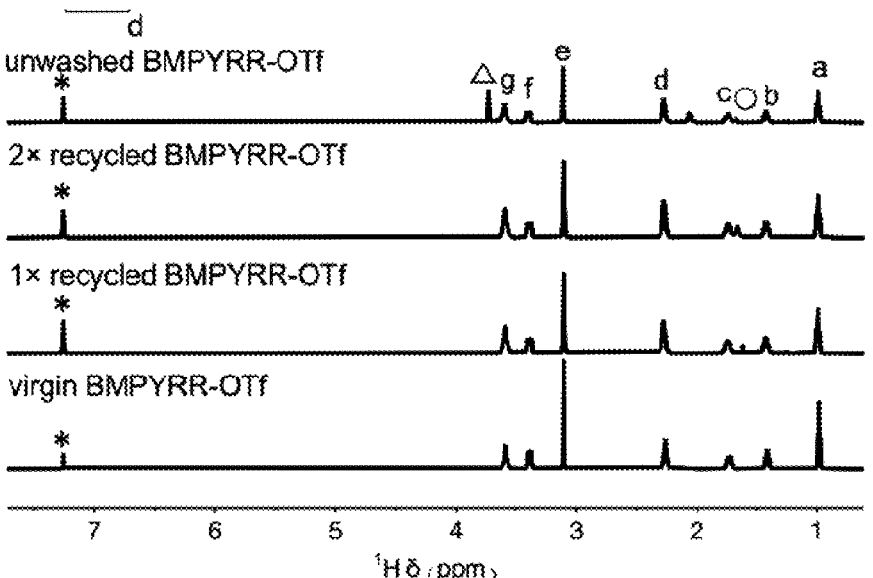
Figure 19C:
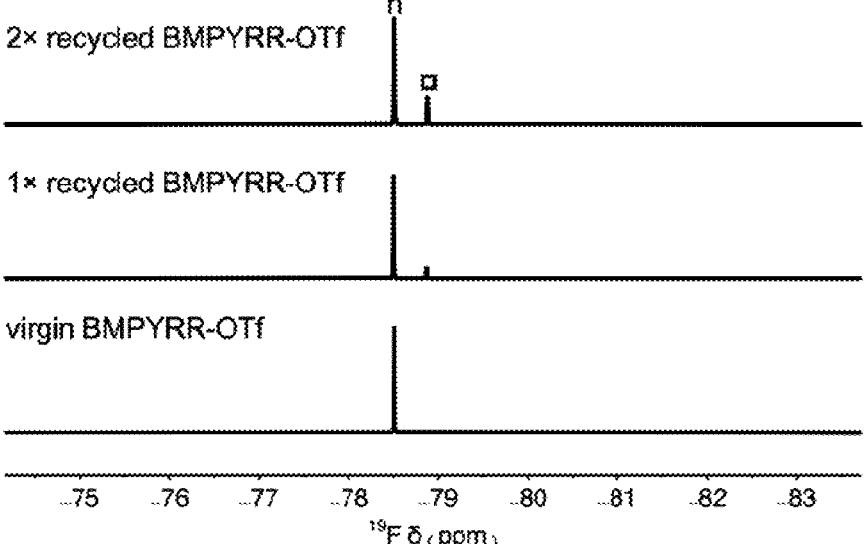

Finally, we applied this water-miscible IL recycling system to a realistic chemical process scenario; that is, the purification of the used IL solvent (BMPYRR-OTf) in a polyol reduction of Pt(II) to synthesize colloidal Pt nanoparticles.[17] The post-reaction mixture after separation of the Pt nanoparticles contained large amounts of impurities—ethylene glycol (unreacted reducing agent), PVP (excess caping agent), K2PtCl4 (unreacted metal salt), some non-isolable nanoparticles, and other reaction byproducts. Here, water is a green washing agent to extract waste from the IL solvent, and recent research unveiled that the removal of Pt can be realized by using acidified water (low pH).[89] The post-reaction mixture was passed through the recycler along with as-received BMPYRR-NTf2 and acidified water at pH=2. The selection of water pH here was based on balancing the recovery rate of the IL and the efficient removal of impurities. Using water at high pH (e.g., DI water) can salvage most of the OTf− IL at the cost of Pt extraction efficiency, while using water at low pH (e.g., pH=0) can maximize the extraction performance at the expense of losing more target IL. In this work, we chose to balance these effects by choosing an intermediate pH. The mixed IL product containing BMPYRR-NTf2 and BMPYRR-OTf was transferred to the recovery step to obtain recycled BMPYRR-OTf. After a two-stage recovery, the 1× recycled BMPYRR-OTf was analyzed and reused for another Pt nanoparticle synthesis reaction. After the reaction, the used IL solvent was washed again to yield 2× recycled IL. FIG. 19 compares the solution $^1$H and $^{19}$F NMR spectra of the as-received virgin IL, 1×, 2× recycled, and unwashed ILs (post-reaction solvent). This demonstrates that the recycled IL solvent is chemically unchanged after the first and second recycling, with no detectable presence of reaction by-products or other impurities, compared to the unwashed IL solvent that contains a significant amount of ethylene glycol. As reference, the post-reaction IL solvent was also purified using the previous ILM method.[78] A significant amount of ethylene glycol still persisted in the ILM recycled. The mole fractions of BMPYRR-NTf2 in the 1× and 2× recycled BMPYRR-OTf products were estimated to be 4.2% and 7%, respectively, based on the integration of the peaks in the $^{19}$F NMR spectra (FIG. 19C), which display the different chemical shifts for the OTf and NTf2− anions. Inorganic impurities of Pt salts and non-isolable Pt nanoparticles were monitored by ICP-OES, and the result reveals that 861 ppm and 518 ppm of Pt (limit of detection=9.7 ppm) were found in the IL samples before and after the wash. Recovery rates of the BMPYRR-NTf2 accommodating agent were 87.8% and 93.6% for the first and second recycle, while the BMPYRR-OTf solvent recoveries were 50.9% and 48.6%, correspondingly. It is unsurprising that the recovery of OTf− solvents only reached moderate numbers, in that ca. 40% of the BMPRYYOTf was likely to be distributed in the acidified water at pH=2 (FIG. 16B). The choice of pH is an engineering parameter that can be tuned to favor extraction efficiency or IL recovery; a pH of 2 represents a compromise between these objectives.

Conclusion

We report a route to recycle ionic liquid solvents miscible with water or other polar solvents by pairing biphasic liquid-liquid extraction with membrane-based separation. Solvent recovery was enabled by taking advantage of pH-dependent partition coefficients of the target hydrophilic IL between the aqueous washing phase and the hydrophobic IL phase. This recycling route was executed in a continuous, microfluidic process using a 3D-printed recycler prototype. Recovery rates >80% were observed for the hydrophilic BMIM-OTf IL in the presence of BMIM-NTf2 and water. Furthermore, purification of metal ion-contaminated IL solvents in the flow process outperformed the analogous batch procedure as well as a previously reported method of IL membrane separation. The accommodating agent-aided route was further applied to a realistic case where the recycling of IL solvents from a Pt nanoparticle synthesis was demonstrated. NMR spectra and ICP-OES data showed a successful removal of organic by-products and impurities and a 40% stripping of inorganic Pt residues from the reaction, in a one-stage-only extraction step over two cycles. This work demonstrates several engineering parameters that can be tuned to optimize recovery of water-miscible ILs in a water-based impurity extraction process: (1) using less acidified water, or even DI water, to extract impurities coupled to more stages of extraction; (2) adding an additional step to recover target ILs from the wastewater; (3) lowering the process temperature such that the water-miscible IL tends to partition more easily to the IL phase. Process engineers must balance the removal efficiency of impurities, the sustainability gains of using recycled ILs, and the operational costs associated with additional process steps. Our previous early stage techno-economic analysis demonstrated that among the IL solvents evaluated, the watermiscible BMPYRR-OTf solvent led to a lowest cost of the Pt-based nanoparticle catalyst produced, but the quality of nanoparticles was heavily compromised because of insufficient removal of impurities during recycling.[78] This work shows that recycling of water-miscible ILs is feasible and provides an industrially realistic route to recycle these ILs.

Experimental Procedures

Materials. 1-Butyl-3-methylimidazolium bis(trifluoromethylsulfonyl)imide (BMIM-NTf$_2$, 99%) and 1-butyl-1-methylpyrrolidinium triflate (BMPYRR-OTf, 99%) were purchased from IoLiTec and used as received. 1-Butyl-3-methylimidazolium trifluoromethanesulfonate (BMIM-OTf, 97%), K$_2$PtCl$_4$ (99.9%), polyvinylpyrrolidone (PVP, MW=55,000), ethylene glycol (99.8%), and Fe(NO3) 3·9H2O (98%) were all purchased from Sigma-Aldrich and used as received. 1-Butyl-1-methylpyrrolidinium bis(trifluoromethanesulfonyl)imide (BMPYRR-NTf$_2$, 98%) was purchased from TCI Chemicals and used as received. Acidified water at different pH levels was prepared by diluting a nitric acid solution (Supelco, 68-70%) with deionized (DI) water. The pH values were verified by a pH meter (Jenway 3510).

Miscibility study on NTf$_2$-IL, OTf‾ IL, and water mixture. In the pH effect study, equal volumes of BMIM-NTf$_2$, BMIM-OTf and acidified water (100 µL, each) were added to a 1.5 mL conical tube. The mass of all three components and the empty tube was measured, respectively. The mixture was vortex mixed for 1 min and then phase separated via centrifugation (1 min, 2,500 rcf). The upper aqueous layer was decanted from the tube, and the lower IL layer was dried at 70° C. for 2 h prior to mass measurement. For a second wash, 100 µL of fresh acidified water was added to the tube again, followed by the same mixing, separation, and weighing procedures. Miscibility tests using BMPYRR-NTf$_2$ and BMPYRR-OTf were carried out with the same procedures. In the OTf-content study, 100 µL of BMIM-NTf$_2$ and acidified water at pH=1, respectively, and BMIMOTf of varying volumes were added to a 1.5 mL conical tube, followed by the mixing, separation, and weighing procedures.

Fabrication of 3D-printed micro-recycler. Designs of the microfluidic recycler device were finished in Autodesk Inventor Professional 2022 (details and measurements are available in the Supporting Information). The device was fabricated by a stereolithographic 3D printer (Asiga, MAX X UV385) with a transparent methacrylate-based resin GR-10 (Pro3dure Medical). The asprinted device was thoroughly washed in three consecutive isopropanol (IPA) baths right after being removed from the printer. IPA was also injected using a 20 mL syringe to flush the internal channel. The device was then immersed in IPA in a glass beaker and placed in an ultrasonic bath (Elma, E15H) at 30° C. for 20 min, and air dried completely prior to next step. A piece of polytetrafluoroethylene (PTFE) membrane with pore size 0.1 m (Sterlitech) was cut to a proper shape and placed on the separation position of the recycler. A quick-cure epoxy (Bob Smith Industries) was applied to combine the two halves of the recycler. The recycler sat for 2 h to allow fully curing of the epoxy. 200 µL of either BMIM-NTf$_2$ or BMPYRR-NTf$_2$ was injected into the recycler to pre-wet the membrane and the excessive IL was withdrawn after the 2 h incubation.

Mixing and separation study in continuous flow. As-received BMIM-NTf$_2$, BMIM-OTf, and DI water were loaded in 10 mL Luer-lok plastic syringes (BD). Three syringe pumps (Harvard Apparatus, 11 Plus) were operated in infusion mode to feed the three streams into the recycler, and a syringe pump (Chemyx, Fusion 200) was operated in withdrawal mode to collect the retentate product coming from the upper outlet of the recycler. Flow rates of all streams were executed as follows: 60 µL/min for BMIM-NTf$_2$ infusion, 30 µL/min for BMIM-OTf infusion, 100 µL/min for DI water infusion, and 105 µL/min for retentate withdrawal. The permeate product coming from the lower outlet was collected by a 15 mL tube. Connection PTFE tubing (1.6 mm OD×0.8 mm ID) and parts in the flow process were purchased from Cole-Parmer and IDEX Health & Science, respectively. The permeate IL product collected and acidified water (pH=0) were transferred to new syringes and reloaded to two syringe pumps, respectively. In the OTf‾ IL stripping step, the IL and acidified water were infused into a new recycler, in which the IL stream was split into two parallel streams by a T-shaped manifold before entering the recycler. A withdrawal syringe pump was also set to the upper outlet of the recycler, while permeate product from the lower outlet was collected by a tube. Flow rates of IL infusion (before splitting), acidified water infusion, and retentate withdrawal were 60 µL/min, 150 µL/min, and 165 µL/min, respectively. The permeate product collected was reloaded to a syringe for a second stripping process with same setup, however, the withdrawal flow rate was modified to 152 µL/min. To calculate the BMIM-NTf$_2$ recovery rate, the volume of the permeate product collected from the second wash was measured by a graduated cylinder. To calculate the BMIM-OTf recovery rate, retentate products from both two stripping steps were joined and transferred to a glass beaker and placed in an oven at 70° C. to remove water. Drying was considered complete when the mass of the liquid remained constant for 30 min. The volume of the dried product was then measured by a graduated cylinder. The IL content in the other IL product was calculated through the integration of peaks in the $^{19}$F NMR spectra that report on the mole fractions of the fluorine atoms in the two anions.

In-batch purification of Fe(III)-loaded BMIM-OTf in AAA route. In a standard procedure, a 1.93 mg/mL solution of Fe(NO3)3 in BMIM-OTf was prepared by thoroughly dissolving the salt in the IL in an ultrasonic bath. 600 µL of as-received BMIM-NTf$_2$, 300 µL of Fe(III)-loaded BMIM-OTf, and 300 µL of DI water were added to a 5 mL centrifuge tube. Upon vortex mixing for 2 min, the tube was centrifuged (1 min, 2,500 rcf) to result in clear phase separation. The supernatant was removed and 2,000 µL of acidified water (pH=0) was added. The liquid mixture was vortex mixed for 2 min and phase separated through centrifugation (1 min, 2,500 rcf). The upper layer was transferred to a 30 mL glass beaker, and 2000 µL of fresh acidified water (pH=0) was then added again to the tube for a second wash with the same mixing and separation procedure. The upper layer was also transferred to the beaker which was later placed in the oven for drying.

In-flow purification of Fe(III)-loaded BMIM-OTf in AAA route. Three infusion pumps (as received BMIM-NTf$_2$, Fe(III)-loaded BMIM-OTf from the stock solution prepared above, and DI water) and a withdrawal pump were set up using flow rates of 60 μL/min, 30 μL/min, 30 μL/min, and 90 μL/min, respectively. The continuous-flow process followed the as-mentioned procedures of mixing and separation study. The retentate IL product in the withdrawal syringe was prepared for two consecutive BMIM-OTf stripping steps (procedures referred below), where flow rates were entered as: IL infusion in 60 μL/min, acidified water infusion in 150 μL/min and withdrawal in 165 μL/min (first step), and 152 μL/min (second step). The retentate products from two steps were collected and dried completely in the oven prior to analysis.

In-flow purification of Fe(III)-loaded BMIM-OTf in ILM separation. A membrane separator was designed as previously reported,[86] and fabricated using the above-described 3D-printing technique. The separator was pre-wet thoroughly with BMIM-NTf$_2$. Fe(III)-loaded BMIM-OTf from the stock solution and DI water were pre-mixed at the volumetric ratio of 1:1 in batch. The single phase mixture was fed into the separator in 100 μL/min and the retentate phase was withdrawn in 50 μL/min. After separation, the permeate phase was put in the oven to remove all the water.

Absorbance spectrophotometry. 80 μL aliquots of the samples were added by a pipettor to a 96-well plate (Celltreat Scientific Products, non-treated). Spectral scanning from 290 to 500 nm was conducted by a micro-plate reader (BioTex, Synergy H1), where steps of 2 nm in normal speed at 20.8° C. were set.

Synthesis of Pt nanoparticles. In a standard procedure, 42.1 mg (0.100 mmol) of K$_2$PtCl$_4$ was dissolved in 2.7 mL of ethylene glycol. Separately, 227.2 mg of PVP was added to 8.0 mL of the BMPYRR-OTf in a two-neck round bottom flask equipped with a condenser and septum. The PVP was dissolved in BMPYRR-OTf by heating it in a thermostatically controlled oil bath at 150° C. for 10 min, giving a clear solution. The solution of K$_2$PtCl$_4$ in ethylene glycol was then hot injected into the BMPYRR-OTf and PVP solution and maintained at 150° C. for 30 min. The solution was thermally quenched in an ice bath. The reaction mixture was transferred to a 50 mL centrifuge tube and 30 mL of acetone was added to precipitate the Pt nanoparticles. The supernatant containing the BMPYRR-OTf was saved, and the acetone and other volatiles were removed in vacuo. The resulting solution was further purified with acidified water using the continuous flow recycler.

In-flow purification of BMPYRR-OTf from Pt nanoparticle synthesis. The post-reaction mixture from Pt nanoparticle separation, as-received BMPYRR-NTf$_2$, and acidified water (pH=2) were injected into the recycler by three syringe pumps in 60 μL/min, 30 μL/min, and 100 μL/min, respectively. A corresponding syringe pump running simultaneously in 110 μL/min was used to withdraw the retentate. The resulting IL permeate was taken to perform a two-time BMPYRR-OTf stripping process in which infusion of IL stream and acidified water (pH=0) stream for both steps followed 80 μL/min and 130 μL/min, respectively. The withdrawal flow rates were modified from 135 μL/min (the first step) to 130 μL/min (the second step). Flow process parameters and drying details followed the procedures mentioned above.

Nuclear magnetic resonance (NMR) Spectroscopy. NMR spectra ($^1$H and $^{19}$F) were collected on a Varian 500 MHz VNMRS spectrometer with 16 scans. CDCl3 was used as the deuterated solvent. The concentration of each sample in the NMR tube was kept constant with the addition of 5 μL of sample into 800 μL of CDCl$_3$.

Supporting Information

Additional partition coefficient plots, NMR spectra, and drawings of the 3D-printed device included as Supporting Information.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCE

1. Lei Z, Chen B, Koo Y M, MacFarlane D R. Introduction: ionic liquids. Chemical Reviews. 2017 May 24; 117(10): 6633-5.
2. Rogers R D, Seddon K R. Ionic liquids-solvents of the future? Science. 2003 Oct. 31; 302(5646):792-3.
3. Miao W, Chan T H. Ionic-liquid-supported peptide synthesis demonstrated by the synthesis of Leu5-enkephalin. The Journal of organic chemistry. 2005 Apr. 15; 70(8): 3251-5.
4. Valizadeh H. Efficient combination of task-specific ionic liquid and microwave dielectric heating applied to synthesis of a large variety of nitrones. Heteroatom Chemistry: An International Journal of Main Group Elements. 2010; 21(2):78-83.
5. Chen J, Su W, Wu H, Liu M, Jin C. Eco-friendly synthesis of 2, 3-dihydroquinazolin-4 (1H)-ones in ionic liquids or ionic liquid-water without additional catalyst. Green Chemistry. 2007; 9(9):972-5.
6. Obregón-Zúñiga A, Milan M, Juaristi E. Improving the catalytic performance of (S)-proline as organocatalyst in asymmetric aldol reactions in the presence of solvate ionic liquids: Involvement of a supramolecular aggregate. Organic letters. 2017 Mar. 3; 19(5):1108-11.
7. Lombardo M, Pasi F, Easwar S, Trombini C. An improved protocol for the direct asymmetric aldol reaction in ionic liquids, catalysed by onium ion-tagged prolines. Advanced Synthesis & Catalysis. 2007 Aug. 6; 349(11-12):2061-5.
8. Riche C T, Roberts E J, Gupta M, Brutchey R L, Malmstadt N. Flow invariant droplet formation for stable parallel microreactors. Nature communications. 2016 Feb. 23; 7(1):1-7.
9. Mohan B, Woo H, Jang S, Lee S, Park S, Park K H. Synthesis of monodisperse Cu nanoparticles in Ionic Liquids: A synthetic and catalytic approach of in situ nanoparticles. Solid state sciences. 2013 Aug. 1; 22:16-20.
10. Krämer J, Redel E, Thomann R, Janiak C. Use of ionic liquids for the synthesis of iron, ruthenium, and osmium nanoparticles from their metal carbonyl precursors. Organometallics. 2008 May 12; 27(9):1976-8.
11. Yuan B, Egner T K, Venditti V, Cademartiri L. Sustainable scalable synthesis of sulfide nanocrystals at low cost with an ionic liquid sulfur precursor. Nature communications. 2018 Oct. 4; 9(1):1-7.

12. Keller D, Henninen T R, Erni R. Atomic mechanisms of gold nanoparticle growth in ionic liquids studied by in situ scanning transmission electron microscopy. Nanoscale. 2020; 12(44):22511-7.

13. Rout A, Wellens S, Binnemans K. Separation of rare earths and nickel by solvent extraction with two mutually immiscible ionic liquids. RSC Advances. 2014; 4(11): 5753-8.

14. Katsuta S, Yoshimoto Y, Okai M, Takeda Y, Bessho K. Selective extraction of palladium and platinum from hydrochloric acid solutions by trioctylammonium-based mixed ionic liquids. Industrial & engineering chemistry research. 2011 Nov. 16; 50(22):12735-40.

15. Micheau C, Arrachart G, Turgis R, Lejeune M, Draye M, Michel S, Legeai S, Pellet-Rostaing S. Ionic liquids as extraction media in a two-step eco-friendly process for selective tantalum recovery. ACS Sustainable Chemistry & Engineering. 2020 Jan. 2; 8(4):1954-63.

16. Wellens S, Vander Hoogerstraete T, Möller C, Thijs B, Luyten J, Binnemans K. Dissolution of metal oxides in an acid-saturated ionic liquid solution and investigation of the back-extraction behaviour to the aqueous phase. Hydrometallurgy. 2014 Apr. 1; 144:27-33.

17. Firmansyah M L, Kubota F, Goto M. Solvent extraction of Pt (IV), Pd (II), and Rh (III) with the ionic liquid trioctyl(dodecyl) phosphonium chloride. Journal of Chemical Technology & Biotechnology. 2018 June; 93(6):1714-21.

18. Tullo, A. H. The Time is Now for Ionic Liquids. Chemical & Engineering News. 2020, 98, 5

19. Oliveira F C, Effenberger F B, Sousa M H, Jardim R F, Kiyohara P K, Dupont J, Rubim J C, Rossi L M. Ionic liquids as recycling solvents for the synthesis of magnetic nanoparticles. Physical Chemistry Chemical Physics. 2011; 13(30):13558-64.

20. Karadaghi L R, Malmstadt N, Van Allsburg K M, Brutchey R L. Techno-Economic Analysis of Recycled Ionic Liquid Solvent Used in a Model Colloidal Platinum Nanoparticle Synthesis. ACS Sustainable Chemistry & Engineering. 2020 Dec. 23; 9(1):246-53.

21. Roberts E J, Karadaghi L R, Wang L, Malmstadt N, Brutchey R L. Continuous flow methods of fabricating catalytically active metal nanoparticles. ACS applied materials & interfaces. 2019 Jul. 9; 11(31):27479-502.

22. Fitzpatrick D E, Battilocchio C, Ley S V. A novel internet-based reaction monitoring, control and autonomous self-optimization platform for chemical synthesis. Organic Process Research & Development. 2016 Feb. 19; 20(2):386-94.

23. Zhou Z, Li X, Zare R N. Optimizing chemical reactions with deep reinforcement learning. ACS central science. 2017 Dec. 27; 3(12):1337-44.

24. Cortés-Borda D, Kutonova K V, Jamet C, Trusova M E, Zammattio F, Truchet C, Rodriguez-Zubiri M, Felpin F X. Optimizing the Heck-Matsuda reaction in flow with a constraint-adapted direct search algorithm. Organic Process Research & Development. 2016 Nov. 18; 20(11): 1979-87.

25. Clayton A D, Schweidtmann A M, Clemens G, Manson J A, Taylor C J, Niño C G, Chamberlain T W, Kapur N, Blacker A J, Lapkin A A, Bourne R A. Automated self-optimisation of multi-step reaction and separation processes using machine learning. Chemical Engineering Journal. 2020 Mar. 15; 384:123340.

26. Amara Z, Streng E S, Skilton R A, Jin J, George M W, Poliakoff M. Automated Serendipity with Self-Optimizing Continuous-Flow Reactors. European Journal of Organic Chemistry. 2015 October; 2015(28):6141-5.

27. Ingham R J, Battilocchio C, Fitzpatrick D E, Sliwinski E, Hawkins J M, Ley S V. A systems approach towards an intelligent and self-controlling platform for integrated continuous reaction sequences. Angewandte Chemie. 2015 Jan. 2; 127(1):146-50.

28. Novak U, Pohar A, Plazl I, Žnidaršič-Plazl P. Ionic liquid-based aqueous two-phase extraction within a microchannel system. Separation and purification technology. 2012 Sep. 3; 97:172-8.

29. Qi L, Wang Y, Li Y, Zheng G, Li C, Su H. Microfluidic aqueous two-phase extraction of bisphenol A using ionic liquid for high-performance liquid chromatography analysis. Analytical and Bioanalytical Chemistry. 2015 May; 407(13):3617-25.

30. Scheiff F, Mendorf M, Agar D, Reis N, Mackley M. The separation of immiscible liquid slugs within plastic microchannels using a metallic hydrophilic sidestream. Lab on a Chip. 2011; 11(6):1022-9.

31. Mendorf M, Nachtrodt H, Mescher A, Ghaini A, Agar D W. Design and control techniques for the numbering-up of capillary microreactors with uniform multiphase flow distribution. Industrial & engineering chemistry research. 2010 Nov. 3; 49(21):10908-16.

32. Angelescu D E, Mercier B, Siess D, Schroeder R. Microfluidic capillary separation and real-time spectroscopic analysis of specific components from multiphase mixtures. Analytical chemistry. 2010 Mar. 15; 82(6): 2412-20.

33. Ladosz A, Rudolf von Rohr P. Design rules for microscale capillary phase separators. Microfluidics and Nanofluidics. 2017 September; 21(9):1-6.

34. Kralj J G, Sahoo H R, Jensen K F. Integrated continuous microfluidic liquid-liquid extraction. Lab on a Chip. 2007; 7(2):256-63.

35. Noel T, Kuhn S, Musacchio A J, Jensen K F, Buchwald S L. Suzuki-Miyaura cross-coupling reactions in flow: multistep synthesis enabled by a microfluidic extraction. Angewandte Chemie International Edition. 2011 Jun. 20; 50(26):5943-6.

36. Cervera-Padrell A E, Morthensen S T, Lewandowski D J, Skovby T, Kiil S, Gernaey K V. Continuous hydrolysis and liquid-liquid phase separation of an active pharmaceutical ingredient intermediate using a miniscale hydrophobic membrane separator. Organic Process Research & Development. 2012 May 18; 16(5):888-900.

37. Yang L, Weeranoppanant N, Jensen K F. Characterization and modeling of the operating curves of membrane microseparators. Industrial & Engineering Chemistry Research. 2017 Oct. 25; 56(42):12184-91.

38. Gürsel I V, Kurt S K, Aalders J, Wang Q, Noël T, Nigam K D, Kockmann N, Hessel V. Utilization of milli-scale coiled flow inverter in combination with phase separator for continuous flow liquid-liquid extraction processes. Chemical Engineering Journal. 2016 Jan. 1; 283:855-68.

39. Li P, Moore J S, Jensen K F. A microfluidic system for the continuous recycling of unmodified homogeneous palladium catalysts through liquid/liquid phase separation. ChemCatChem. 2013 July; 5(7):1729-33.

40. Liu D, Wang K, Wang Y, Wang Y, Luo G. A simple online phase separator for the microfluidic mass transfer studies. Chemical Engineering Journal. 2017 Oct. 1; 325:342-9.

41. Dessimoz A L, Cavin L, Renken A, Kiwi-Minsker L. Liquid-liquid two-phase flow patterns and mass transfer characteristics in rectangular glass microreactors. Chemical Engineering Science. 2008 Aug. 1; 63(16):4035-44.

42. Bhargava K C, Thompson B, Malmstadt N. Discrete elements for 3D microfluidics. Proceedings of the National Academy of Sciences. 2014 Oct. 21; 111(42): 15013-8.

43. Ingle J D, Crouch S R. The Beer Lambert Law. Spectrochemical Analysis. New Jersey: Prentice Hall. 1988.

44. Nelder J A, Mead R. A simplex method for function minimization. The computer journal. 1965 Jan. 1; 7(4): 308-13.

45. Clayton A D, Manson J A, Taylor C J, Chamberlain T W, Taylor B A, Clemens G, Bourne R A. Algorithms for the self-optimisation of chemical reactions. Reaction Chemistry & Engineering. 2019; 4(9):1545-54.

46. Kumari A, Sinha M K, Sahu S K, Pandey B D. Investigation of a novel ionic liquid, Cyphos IL 104 for the solvent extraction of mineral acids. Hydrometallurgy. 2016 Oct. 1; 165:159-65.

47. Wang L, Karadaghi L R, Brutchey R L, Malmstadt N. Self-optimizing parallel millifluidic reactor for scaling nanoparticle synthesis. Chemical Communications. 2020; 56(26):3745-8

48. L. R. Karadaghi, N. Malmstadt, K. M. Van Allsburg and R. L. Brutchey, *ACS Sustainable Chem. Eng.,* 2021, 9, 246-253

49. C. T. Riche, E. J. Roberts, M. Gupta, R. L. Brutchey and N. Malmstadt, *Nat. Commun.,* 2016, 7, 10780

50. V. Mengeaud, J. Josserand and H. H. Girault, Anal. Chem., 2002, 74, 4279-4286

51. X. Chen and T. Li, Chem. Eng. J., 2017, 313, 1406-1414

52. A. D. Strook, S. K. W. Dertinger, A. Ajdari, I. Mezić, H. A. Stone and G. M. Whitesides, Science, 2002, 295, 647-651.

53. J. Marschewski, S. Jung, P. Ruch, N. Prasad, S. Mazzotti, B. Michel and D. Poulikakos, Lab Chip, 2015, 15, 1923-1933 RSC.

54. W.-Z. Lin, W. K. Bostic and N. Malmstadt, ChemRxiv, 2022, preprint, DOI:10.26434/chemrxiv-2022-kgz7g.

55. J. G. Kralj, H. R. Sahoo and K. F. Jensen, Lab Chip, 2007, 7, 256-263 RSC.

56. N. Weeranoppanant, A. Adamo, G. Saparbaiuly, E. Rose, C. Fleury, B. Schenkel and K. F. Jensen, Ind. Eng. Chem. Res., 2017, 56, 4095-4103

57. J. G. McDaniel and A. Verma, J. Phys. Chem. B, 2019, 123, 5343-5356

58. M. Klahn, C. Stuber, A. Seduraman and P. Wu, J. Phys. Chem. B, 2010, 114, 2856-2868

59. O. Lanaridi, A. R. Sahoo, A. Limbeck, S. Naghdi, D. Eder, E. Eitenberger, Z. Csendes, M. Schnurch and K. Bica-Schröder, ACS Sustainable Chem. Eng., 2021, 9, 375-386

60. Y. Tong, C. Wang, Y. Huang and Y. Yang, Ind. Eng. Chem. Res., 2015, 54, 705-711

61. S. Génand-Pinaz, N. Papaiconomou and J.-M. Leveque, Green Chem., 2013, 15, 2493 RSC.

62. B. Pan, L. R. Karadaghi, R. L. Brutchey and N. Malmstadt, ACS Sustainable Chem. Eng., 2023, 11, 228-237

63. P. Erfle, J. Riewe, S. Cai, H. Bunjes and A. Dietzel, Lab Chip, 2022, 22, 3025-3044 RSC.

64. C. J. Clarke, L. Bui-Le and J. Hallett, Anal. Methods, 2020, 12, 2244-2252 RSC.

65. V. Mazan, M. Y. Boltoeva, E. E. Tereshatov and C. M. Folden I II, RSC Adv., 2016, 6, 56260-56270 RSC.

66. A. Baimoldina, F. Yang, K. Kolla, P. Altemose, B. Wang, C. Clifford, C. Kowall and L. Li, Ind. Eng. Chem. Res., 2022, 61, 747-753

67. M. Kamaz, R. J. Vogler, M. Jebur and A. Sengupta, Sep. Purif Technol., 2020, 236, 116237

68. B. Wang, J. Lin, F. Wu and Y. Peng, Ind. Eng. Chem. Res., 2008, 47, 8355-8360

69. T. H. Rehm, C. Hofmann, D. Reinhard, H.-J. Kost, P. Löb, M. Besold, K. Welzel, J. Barten, A. Didenko, 44. D. V. Sevenard, B. Lix, A. R. Hillson and S. D. Riegel, React. Chem. Eng., 2017, 2, 315-323 RSC.

70. V. L. Rendina and J. S. Kingsbury, J. Org. Chem., 2012, 77, 1181-1185

71.    Home|CatCost,    https://catcost.chemcatbio.org/, accessed Jul. 28, 2022 Search PubMed.

72. K. M. Van Allsburg, E. C. D. Tan, J. D. Super, J. A. Schaidle and F. G. Baddour, Nat. Catal., 2022, 5, 342-353

73. B. E. Petel, K. M. Van Allsburg and F. G. Baddour, Adv. Sustainable Syst., 2023, 230030 Search PubMed.

74. H. J. Lang, Cost Relationships in Preliminary Cost Estimation, Chem. Process Eng., 1947, 54, 117-121 Search PubMed.

75. M. S. Peters and K. D. Timmerhaus, Plant Design and Economics for Chemical Engineers, McGraw-Hill, New York, 5th edn, 2003

76. L. R. Karadaghi, M. S. Madani, E. M. Williamson, A. T. To, S. E. Habas, F. G. Baddour, J. A. Schaidle, D. A. Ruddy, R. L. Brutchey and N. Malmstadt, ACS Appl. Nano Mater., 2022, 5, 1966-1975

77. L. R. Karadaghi, A. T. To, S. E. Habas, F. G. Baddour, D. A. Ruddy and R. L Brutchey, Chem. Mater., 2022, 34, 8849-8857

78. Karadaghi, L. R.; Pan, B.; Malmstadt, N.; Brutchey, R. L. A techno-economic approach to guide the selection of flow recyclable ionic liquids for nanoparticle synthesis. RSC Sustainability 2023, Article ASAP. https://doi.org/ 10.1039/D3SU00182B 79. Gursel, I. V.; Kurt, S. K.; Aalders, J.; Wang, Q.; No81, T.; Nigam, K. D. P.; Kockmann, N.; Hessel, V. Utilization of Milli-Scale Coiled Flow Inverter in Combination with Phase Separator for Continuous Flow Liquid-Liquid Extraction Processes. *Chemical Engineering Journal* 2016, 283, 855-868. https://doi.org/10.1016/ j.cej.2015.08.028

80. Baimoldina, A.; Yang, F.; Kolla, K.; Altemose, P.; Wang, B.-C.; Clifford, C. E.; Kowall, C.; Li, L. Separating Miscible Liquid-Liquid Mixtures Using Supported Ionic Liquid Membranes. Industrial & Engineering Chemistry Research 2021, 61 (1), 747-753. https://doi.org/10.1021/ acs.iecr.1c03938

81. Rodrigues, R.; Freitas, A. A.; Lopes, J. N. C.; Shimizu, K. Ionic Liquids and Water: Hydrophobicity vs. Hydrophilicity. *Molecules* 2021, 26 (23), 7159. https://doi.org/ 10.3390/molecules26237159

82. Stoecklein, D.; Di Carlo, D. Nonlinear Microfluidics. *Analytical Chemistry* 2018, 91 (1), 296-314. https:// doi.org/10.1021/acs.analchem.8b05042

83. Schönfeld, F.; Hardt, S. Simulation of Helical Flows in Microchannels. *Aiche Journal* 2004, 50 (4), 771-778. https://doi.org/10.1002/aic.10071

84. Rocha, M. A.; Zhang, Y.; Maginn, E. J.; Shiflett, M. B. Simulation and Measurement of Water-Induced Liquid-Liquid Phase Separation of Imidazolium Ionic Liquid Mixtures. *Journal of Chemical Physics* 2018, 149 (16). https://doi.org/10.1063/1.5054786

85. Gutowski, K. E.; Broker, G. A.; Willauer, H. D.; Huddleston, J. G.; Swatloski, R. P.; Holbrey, J. D.; Rogers, R. D. Controlling the Aqueous Miscibility of Ionic Liquids: Aqueous Biphasic Systems of Water-Miscible Ionic Liquids and Water-Structuring Salts for Recycle, Metathesis, and Separations. Journal of the American Chemical Society 2003, 125 (22), 6632-6633. https://doi.org/10.1021/ja0351802

86. Pan, B.; Karadaghi, L. R.; Brutchey, R. L.; Malmstadt, N. Purification of Ionic Liquid Solvents in a Self-Optimizing, Continuous Microfluidic Process via Extraction of Metal Ions and Phase Separation. ACS Sustainable Chemistry & Engineering 2022, 11 (1), 228-237. https://doi.org/10.1021/acssuschemeng.2c05285

89. Génand-Pinaz, S.; Papaiconomou, N.; Lévêque, J.-M. Removal of Platinum from Water by Precipitation or Liquid-Liquid Extraction and Separation from Gold Using Ionic Liquids. Green Chemistry 2013, 15 (9), 2493. https://doi.org/10.1039/c3gc40557e

What is claimed is:

1. A purification system for ionic liquid solvents, the purification system comprising:
   an ionic liquid source that includes a first flow controller configured to provide a first flow stream at a first flow rate, the first flow stream including an ionic liquid requiring purification;
   an extraction liquid source that includes a second flow controller configured to provide a second flow stream at a second flow rate, the second flow stream including an extraction liquid that is immiscible with the ionic liquid;
   a mixing component configured to mix the first flow stream and the second flow stream and output a mixed flow stream that includes a retentate phase and a permeate phase;
   a separator assembly including a housing having a first flow channel assembly, a second flow channel assembly, an inlet, a first outlet, and a second outlet, the inlet configured to receive the mixed flow stream, the first outlet configured to output a retentate output flow stream, the separator assembly also including a separation membrane interposed between the first flow channel assembly and the second channel assembly, the separation membrane having a first face that contacts ionic liquid in the first flow channel assembly from the mixed flow stream and a second face contacting a permeate waste stream in the second flow channel assembly that is outputted from the second outlet; and
   an output flow controller configured adjust flow of the retentate output flow stream to a third flow rate.

2. The purification system of claim 1 further comprising:
   a flow detector that measures homogeneity of the retentate output flow after separation;
   a spectrometer system configured to monitor concentrations of impurities in the retentate output flow stream; and
   a computing device in electrical communication with the first flow controller, the second flow controller, the flow detector, and the spectrometer system, the spectrometer system providing feedback to the computing device about concentrations of impurities in the retentate output flow stream such that the first flow rate, the second flow rate, and the third flow rate are adjustable to increase the purity of the retentate output flow stream.

3. The purification system of claim 1, wherein when the extraction liquid includes water or acidified water.

4. The purification system of claim 1, wherein when the separation membrane is hydrophilic, the retentate phase includes the ionic liquid, and the permeate phase includes the extraction liquid.

5. The purification system of claim 1, wherein when the separation membrane is hydrophilic, the retentate phase includes the extraction liquid, and the permeate phase includes the ionic liquid.

6. The purification system of claim 1, wherein the first flow rate, the second flow rate, and the third flow rate are adjustable to increase the purity of the retentate output flow stream in accordance with optimization of an objective function.

7. The purification system of claim 6, wherein the objective function is the following equation:

$$Score = 100 - C_1 \log_{10} \frac{I_0}{I} \text{ "Extraction Term"} -$$

$$C_2 \max(SD_{ret}, SD_{per}) \text{ "Separation Term"} - C_3 \frac{Q_{ES}}{Q_{IL}} \text{ "Separation Term"}$$

where:
   $C_1$, $C_2$, and $C_3$ are numberical coefficients;
   $I_0$ is transmittance intensity for the ionic liquid requiring purification;
   $I$ is transmittance intensity for the retentate output flow stream;
   $SD_{ret}$ and $SD_{per}$ are standard deviations for the retentate output flow stream and the permeate waste stream, respectively; and
   $Q_{IL}$ and $Q_{ES}$ are the first flow rate and the second flow rate (µL/min), respectively.

8. The purification system of claim 1, wherein the first flow channel assembly includes a herringbone flow channel.

9. The purification system of claim 8, wherein the first flow channel assembly includes a waved flow channel downstream of the herringbone flow channel.

10. The purification system of claim 9, wherein the second flow channel assembly includes a zigzagging flow channel.

11. The purification system of claim 10, wherein the herringbone flow channel, the waved flow channel, the inlet and the first outlet are least partially defined by and embedded in a first single material block.

12. The purification system of claim 11, wherein the zigzagging flow channel and the second outlet are at least partially defined by and embedded in a second single material block.

13. The purification system of claim 12, wherein the first single material block and the first single material block are independently composed of a polymer or resin.

14. The purification system of claim 13, wherein the first flow channel assembly and the second flow channel assembly are at least partially formed by 3D printing.

15. The purification system of claim 11, wherein the herringbone flow channel, the waved flow channel, and the zigzagging flow channel independently have a height from about 300 microns to 700 microns and a width from about 300 microns to 700 microns.

16. The purification system of claim 11, wherein the ionic liquid is a reaction solvent used in colloidal inorganic nanoparticle synthesis.

17. A purification system for ionic liquid solvents, the purification system comprising:
   an ionic liquid source that includes a first flow controller configured to provide a first flow stream at a first flow rate, the first flow stream including an ionic liquid requiring purification;
   a separator assembly including a housing having a first flow channel assembly, a second flow channel assembly, an inlet, a first outlet, and a second outlet, the inlet configured to receive the first flow stream, the first outlet configured to output a retentate output flow stream, the separator assembly also including a separation membrane interposed between the first flow channel assembly and the second channel assembly, the separation membrane having a first face that contacts ionic liquid in the first flow channel assembly from the first flow stream and a second face contacting a permeate waste stream in the second flow channel assembly that is outputted from the second outlet; and an output flow controller configured adjust flow of the retentate output flow stream to a second flow rate.

18. The purification system of claim 17 further comprising:

a flow detector that that measures homogeneity of the retentate output flow after separation;

a spectrometer system configured to monitor concentrations of impurities in the retentate output flow stream; and a computing device in electrical communication with the first flow controller, the flow detector, and the spectrometer system, the spectrometer system providing feedback to the computing device about concentrations of impurities in the retentate output flow stream such that the first flow rate, and the second flow rate are adjustable to increase the purity of the retentate output flow stream.

19. The purification system of claim 17, wherein the first flow rate, and the second flow rate are adjustable to increase the purity of the retentate output flow stream in accordance with optimization of an objective function.

20. The purification system of claim 17, wherein the first flow channel assembly includes a herringbone flow channel.

21. The purification system of claim 20, wherein the first flow channel assembly further includes a waved flow channel downstream of the herringbone flow channel.

22. The purification system of claim 17, wherein the second flow channel assembly includes a zigzagging flow channel.

23. A separator assembly comprising:

a first flow channel assembly including herringbone flow channel and a waved flow channel downstream of the herringbone flow channel, the first flow channel assembly also having an inlet and a first outlet, the inlet configured to receive a first flow stream that includes an ionic liquid, the first outlet configured to output a retentate output flow stream;

a second flow channel assembly including a second outlet and a zigzagging flow channel upstream of the second outlet; and a separation membrane positioned between the first flow channel assembly and second flow channel assembly, the separation membrane having a first face that contacts ionic liquid in the first flow channel assembly and a second face contacting a permeate waste stream in the second flow channel assembly that is outputted from the second outlet.

24. The separator assembly of claim 23, wherein the herringbone flow channel, the waved flow channel, the inlet and the first outlet are least partially defined by and embedded in a first single material block.

25. The separator assembly of claim 24, wherein the zigzagging flow channel and the second outlet are at least partially defined by and embedded in a second single material block.

26. The separator assembly of claim 25, wherein the first single material block and the first single material block are independently composed of a polymer or resin.

27. The separator assembly of claim 26, wherein the first flow channel assembly and the second flow channel assembly are at least partially formed by 3D printing.

28. The separator assembly of claim 26, wherein the herringbone flow channel, the waved flow channel, and the zigzagging flow channel independently have a height from about 300 microns to 700 microns and a width from about 300 microns to 700 microns.

* * * * *